United States Patent
Olson et al.

(10) Patent No.: US 8,817,415 B2
(45) Date of Patent: *Aug. 26, 2014

(54) ERASURE OF MAGNETIC STORAGE MEDIA HAVING PERPENDICULAR ANISOTROPY

(75) Inventors: Larold L. Olson, Lindstrom, MN (US); Douglas W. Johnson, Stillwater, MN (US); Michael P. Sharrock, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 348 days.

This patent is subject to a terminal disclaimer.

(21) Appl. No.: 13/159,287

(22) Filed: Jun. 13, 2011

(65) Prior Publication Data

US 2012/0314320 A1 Dec. 13, 2012

(51) Int. Cl.
*G11B 5/584* (2006.01)

(52) U.S. Cl.
USPC .............. 360/77.12; 360/66; 360/71; 360/75; 360/134

(58) Field of Classification Search
None
See application file for complete search history.

(56) References Cited

U.S. PATENT DOCUMENTS

| | | | |
|---|---|---|---|
| 4,493,779 A | | 1/1985 | Kamiyama |
| 4,493,874 A | | 1/1985 | Kubo et al. |
| 4,672,009 A | * | 6/1987 | Takahashi .................. 428/842.5 |
| 4,690,768 A | | 9/1987 | Kamiyama |
| 4,975,791 A | | 12/1990 | Eggebeen |
| 5,132,860 A | | 7/1992 | Von Stein |
| 5,247,397 A | | 9/1993 | Sato et al. |
| 5,293,285 A | | 3/1994 | Leonhardt et al. |
| 5,572,392 A | | 11/1996 | Aboaf et al. |
| 5,689,384 A | | 11/1997 | Albrecht et al. |
| 6,021,013 A | | 2/2000 | Albrecht et al. |
| 6,040,964 A | | 3/2000 | Saliba |
| 6,282,051 B1 | | 8/2001 | Albrecht et al. |
| 6,462,904 B1 | | 10/2002 | Albrecht et al. |
| 6,542,325 B1 | | 4/2003 | Molstad et al. |
| 6,647,613 B2 | | 11/2003 | Beck et al. |

(Continued)

FOREIGN PATENT DOCUMENTS

| | | |
|---|---|---|
| GB | 812023 A | 4/1959 |
| JP | 1208712 A | 8/1989 |
| JP | 20090209403 A | 1/2009 |
| SU | 1631598 A1 | 2/1991 |

OTHER PUBLICATIONS

International Search Report and Written Opinion of international application No. PCT/US2012/042094, dated Aug. 13, 2012, 14 pp.

(Continued)

*Primary Examiner* — Dismery Mercedes
(74) *Attorney, Agent, or Firm* — Dorsey & Whitney LLP

(57) ABSTRACT

Magnetic storage tape and techniques for erasing and writing to magnetic storage tape having a perpendicular squareness greater than 50 percent and a longitudinal squareness less than 50 percent are described. In general, the magnetic tape may be biased with a remanence magnetization, or magnetic orientation, in any direction. One or two head systems may use various magnetic field patterns to create the desired remanence magnetization. Servo marks may have a remanence magnetization in an opposite magnetic orientation than that of the remaining bias on the servo track, e.g., substantially perpendicular to the magnetic tape. In some examples, a write head may alternate the direction of the magnetic field to continuously bias and write servo patterns to the magnetic tape. In addition, a symmetrical servo mark may be created in the magnetic tape with a write head having a gap width approximately equal to the length of the servo mark.

17 Claims, 23 Drawing Sheets

(56) References Cited

U.S. PATENT DOCUMENTS

| | | | |
|---|---|---|---|
| 6,781,778 B1 | 8/2004 | Molstad et al. | |
| 6,807,025 B1 | 10/2004 | Benakli et al. | |
| 6,822,827 B1 | 11/2004 | Heinz et al. | |
| 6,824,817 B2 * | 11/2004 | Araki et al. | 427/131 |
| 6,842,305 B2 | 1/2005 | Molstad et al. | |
| 6,943,987 B1 | 9/2005 | Raymond et al. | |
| 6,950,269 B1 | 9/2005 | Johnson | |
| 6,972,931 B2 | 12/2005 | Rudi et al. | |
| 7,002,763 B2 | 2/2006 | Bui et al. | |
| 7,012,774 B2 | 3/2006 | Nakao et al. | |
| 7,038,873 B2 * | 5/2006 | Shimazaki et al. | 360/59 |
| 7,050,251 B2 | 5/2006 | Lundstrom | |
| 7,054,101 B1 | 5/2006 | Marion et al. | |
| 7,072,133 B1 | 7/2006 | Yip et al. | |
| 7,132,164 B2 | 11/2006 | Yamazaki et al. | |
| 7,180,699 B1 | 2/2007 | Dee | |
| 7,190,551 B2 | 3/2007 | Suda | |
| 7,193,812 B2 | 3/2007 | Eaton | |
| 7,206,167 B2 | 4/2007 | Beck et al. | |
| 7,224,544 B2 | 5/2007 | Takano et al. | |
| 7,381,482 B2 | 6/2008 | Yamazaki et al. | |
| 7,436,622 B2 | 10/2008 | Johnson et al. | |
| 7,515,374 B2 | 4/2009 | Nakao | |
| 7,551,380 B2 | 6/2009 | Watson et al. | |
| 7,623,310 B2 * | 11/2009 | Nakao | 360/48 |
| 7,736,769 B2 | 6/2010 | Ajan | |
| 7,864,487 B2 | 1/2011 | Cherubini et al. | |
| 7,986,485 B2 | 7/2011 | Mckinstry et al. | |
| 8,014,100 B2 | 9/2011 | Biskeborn et al. | |
| 8,228,637 B2 * | 7/2012 | Schaefer et al. | 360/137 |
| 8,254,052 B2 | 8/2012 | Dugas | |
| 8,310,780 B2 | 11/2012 | Imaino et al. | |
| 8,670,203 B2 | 3/2014 | Ohtsu et al. | |
| 2003/0017364 A1 | 1/2003 | Kikitsu et al. | |
| 2003/0095353 A1 | 5/2003 | Nakao | |
| 2003/0099059 A1 | 5/2003 | Nakao | |
| 2004/0080847 A1 * | 4/2004 | Lundstrom | 360/46 |
| 2005/0099718 A1 | 5/2005 | Takano et al. | |
| 2005/0122620 A1 | 6/2005 | Suda | |
| 2005/0254170 A1 | 11/2005 | Dugas et al. | |
| 2006/0126207 A1 * | 6/2006 | Johnson et al. | 360/48 |
| 2006/0177702 A1 * | 8/2006 | Ajan | 428/828.1 |
| 2007/0223126 A1 | 9/2007 | Olson et al. | |
| 2007/0230040 A1 | 10/2007 | Dugas et al. | |
| 2007/0231609 A1 * | 10/2007 | Ajan et al. | 428/828.1 |
| 2008/0024905 A1 | 1/2008 | Johnson et al. | |
| 2008/0030899 A1 | 2/2008 | Norton | |
| 2008/0049356 A1 | 2/2008 | Weber et al. | |
| 2008/0158721 A1 | 7/2008 | Bui et al. | |
| 2008/0304180 A1 | 12/2008 | Schaefer et al. | |
| 2009/0040643 A1 | 2/2009 | Weng et al. | |
| 2009/0046396 A1 * | 2/2009 | Nagata et al. | 360/324 |
| 2009/0080108 A1 | 3/2009 | Watson et al. | |
| 2009/0141393 A1 | 6/2009 | Vanderheyden et al. | |
| 2010/0002335 A1 | 1/2010 | Dugas | |
| 2010/0246057 A1 | 9/2010 | Mckinstry et al. | |
| 2011/0102116 A1 | 5/2011 | Biskeborn et al. | |
| 2011/0102936 A1 | 5/2011 | Sugiyama et al. | |
| 2011/0141604 A1 | 6/2011 | Dugas et al. | |
| 2011/0222187 A1 | 9/2011 | Biskeborn | |
| 2012/0019954 A1 | 1/2012 | Imaino et al. | |
| 2012/0050908 A1 | 3/2012 | Ohtsu et al. | |
| 2012/0050910 A1 | 3/2012 | Ohtsu et al. | |
| 2012/0194941 A1 | 8/2012 | Jubert | |
| 2012/0314318 A1 | 12/2012 | Olson et al. | |
| 2013/0148235 A1 | 6/2013 | Ochi et al. | |
| 2013/0286504 A1 | 10/2013 | Rothermel et al. | |

OTHER PUBLICATIONS

Cherubini et al., "29.5 Gb/in$^2$ Recording Areal Density on Barium Ferrite Tape," IEEE Transactions on Magnetics, vol. 47, No. 1, pp. 137-147, Jan. 2011.

U.S. Appl. No. 13/159,257, by Larold L. Olson, filed Jun. 13, 2011.

U.S. Appl. No. 13/159,277, by Larold L. Olson, filed Jun. 13, 2011.

U.S. Appl. No. 13/159,297, by Larold L. Olson, filed Jun. 13, 2011.

Kryder, Mark H. "An Introduction to Magnetic Recording Heads," in: Hadjipanayis, George C., ed., *Magnetic Storage Systems Beyond 2000*, NATO Science Series, vol. 41, Netherlands, Kluwer Academic Publishers, 2001, pp. 449-466.

International Search Report dated Apr. 25, 2013, for PCT Application No. PCT/US2013/023816 filed Jan. 30, 2013.

U.S. Appl. No. 13/795,482, filed Mar. 12, 2013, entitled "Tapered Pole Heads for Magnetic Media".

U.S. Appl. No. 13/795,668, filed Mar. 12, 2013, entitled "Methods and Systems for Magnetic Media Servo Writing".

U.S. Appl. No. 13/795,421, filed Mar. 12, 2013, entitled "Systems and Methods for Processing Magnetic Media".

U.S. Appl. No. 13/795,590, filed Mar. 12, 2013, entitled "Servo Write Head".

U.S. Appl. No. 13/754,078, filed Jan. 30, 2013, entitled "Perpendicular Pole Head for Servo Writing Magnetic Media".

* cited by examiner

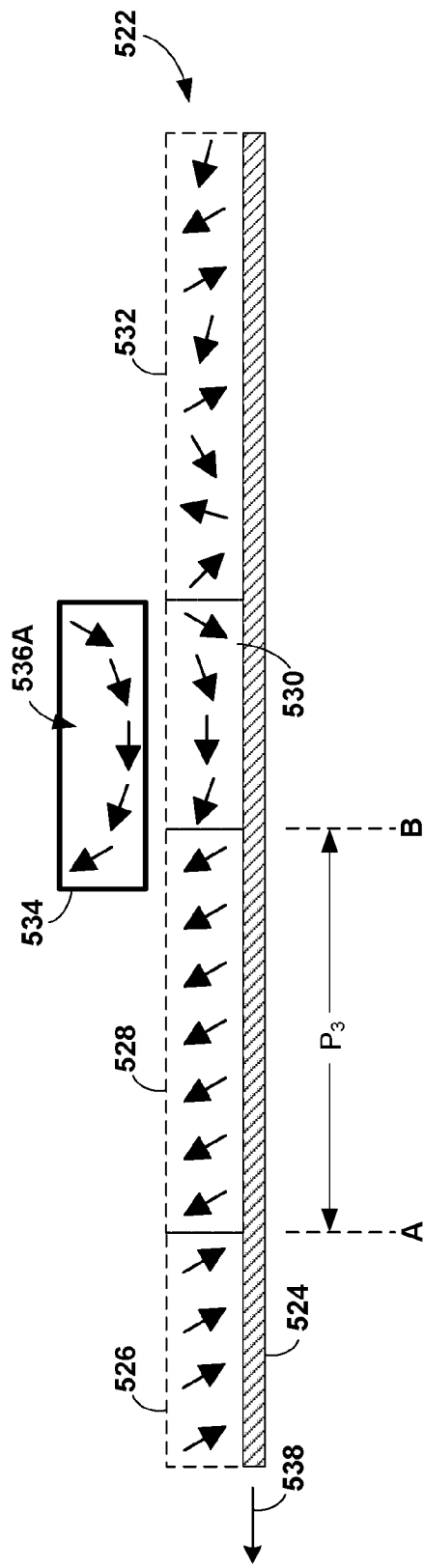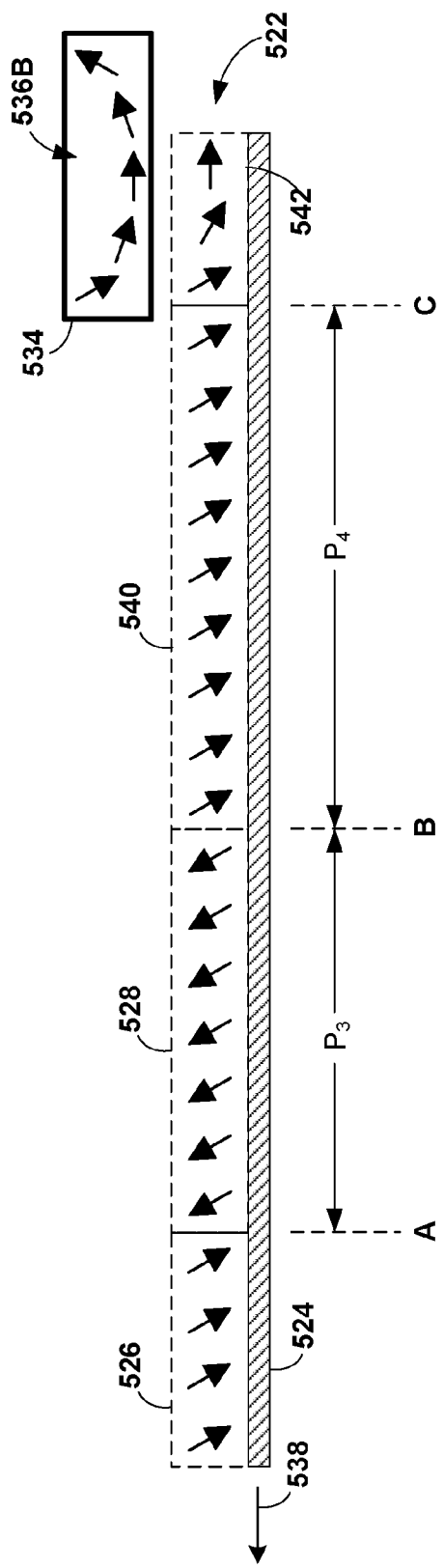

ERASURE OF MAGNETIC STORAGE MEDIA HAVING PERPENDICULAR ANISOTROPY

TECHNICAL FIELD

This disclosure relates to magnetic media and, in particular, to servo patterns on magnetic storage media.

BACKGROUND

Magnetic data storage media, such as magnetic tape and magnetic disks, are commonly used for storage and retrieval of data. Magnetic data storage media can be categorized as longitudinal or perpendicular. Most conventional magnetic media are longitudinal. In longitudinal media, the largest magnetic remanence may be obtained in a direction generally parallel to the plane of the medium. In other words, in longitudinal media, the magnetic preferred-axis orientation of individual magnetic domains is close to parallel to, or in-line with, the surface of the medium and the direction of medium travel. In perpendicular media, on the other hand, the largest remanence magnetization of the magnetic particles is possible perpendicular to the plane of the medium. In other words, in perpendicular media, the magnetic preferred-axis orientation of individual magnetic domains is predominately perpendicular to the medium surface. However, magnetic media may have particles capable of both a significant longitudinal and significant perpendicular components in its orientation. Perpendicular media generally allow for a much higher storage density than can be achieved in longitudinal media.

The magnetic storage media generally have a series of transitions between different magnetized regions. The different magnetized regions may encode a series of bits that represent a value of "0" or "1". The magnetically oriented regions may be aligned on data tracks that divide the magnetic medium. In order to subsequently store data on the magnetic storage medium, a recording head of a magnetic drive, such as a tape drive or disk drive, encodes data by selectively orienting various magnetic regions on the medium. A read head, or transducer head, of a magnetic drive may later be positioned relative to the data tracks to detect the regions, and the drive can interpret the detected regions to retrieve the data.

During data storage and recovery, the head must locate each data track, and follow the path of the data track accurately along the media surface. In order to facilitate precise positioning of the transducer head relative to the data tracks, servo techniques have been developed. Servo patterns refer to signals or other recorded marks on the medium that are used for tracking purposes. In other words, servo patterns are recorded on the medium to provide reference points relative to the data tracks. A servo read head has a fixed displacement relative to the transducer head that reads the data tracks. The servo read head can read the servo patterns, and a servo controller interprets a detected servo pattern and generates a position error signal (PES). The PES is used to adjust the lateral distance of the servo read head relative to the servo pattern and the transducer head relative to the data tracks so that the transducer head is properly positioned along the data tracks for effective reading and/or writing of data to the data tracks.

With some data storage media, such as magnetic tape, the servo patterns are stored in specialized tracks on the medium, called "servo bands." Servo bands serve as references for the servo controller. A plurality of servo patterns may be defined in a servo band. Some magnetic media include a plurality of servo bands, with data tracks being located between the servo bands.

One type of servo pattern is a time-based servo pattern. Time-based servo techniques refer to servo techniques that make use of non-parallel servo marks and time variables or distance variables to identify head position. The time offset between the detection of two or more servo marks can be translated into a PES, which defines a lateral distance of the transducer head relative to a data track. For example, given a constant velocity of magnetic tape formed with servo pattern "/ \", the time between detection of mark "/" and mark "\" becomes longer when the read head is positioned towards the bottom of pattern "/ \" and shorter if the read head positioned towards the top of pattern "/ \". Given a constant velocity of magnetic media, a defined time period between detected servo signals may correspond to a center of pattern "/ \". By locating the center of pattern "/ \", a known distance between the center of the servo band and the data tracks can be identified. Time-based servo patterns are also commonly implemented in magnetic tape media, but may be useful in other media.

SUMMARY

In general, this disclosure relates to magnetic storage media, e.g., magnetic tape, and techniques for erasing and writing to magnetic storage tape that defines, or has, a perpendicular squareness greater than 50 percent and a longitudinal squareness less than 50 percent. Magnetic storage tape that exhibits greater perpendicular squareness, or perpendicular anisotropy, includes magnetic particles capable of being magnetically oriented in any direction. In other words, these magnetic particles may be magnetically oriented perpendicular to the length of the magnetic tape, parallel to the length of the magnetic tape, or oriented with both a perpendicular and longitudinal component to the orientation. This disclosure describes examples of magnetic tape with various magnetic orientations in biasing and servo patterns, in addition to various techniques for creating such orientations.

For example, the magnetic tape may be biased to define a remanence magnetization with an orientation or direction having a perpendicular and a longitudinal component. A bias in either the perpendicular or longitudinal orientation may be created with two heads positioned on opposite sides of the magnetic tape. Servo patterns may be written to the magnetic tape with a remanence magnetization in an opposite magnetic orientation than that of the remaining bias on the servo track, e.g., substantially perpendicular to the magnetic tape. A bias in one of eight directional octants, e.g., non-zero perpendicular and longitudinal components, may also be created with a single head. Servo patterns may be written, or the servo mark remanence magnetization be oriented, in a generally opposite directional octant from the directional octant of the bias magnetization.

Magnetic tape may also include a bias and servo patterns written with other techniques. A single write head may continuously bias the magnetic tape and write servo patterns to the magnetic tape as the tape passes by the write head. In this continuous writing technique, the write head may alternate the direction of the magnetic field such that the trailing edge of the alternating magnetic field either creates a bias in the tape or writes servo marks with a substantially opposing remanence magnetization from the bias.

Magnetic tape with greater perpendicular squareness may also include symmetrical servo marks, and these symmetrical servo marks may collectively define servo patterns. The gap width of the magnetic head may be sized to be approximately equal to the length of the servo mark. As the magnetic tape passes near the magnetic head, a short electrical current pulse can be applied to the magnetic head to generate a brief magnetic field. Since the magnetic field is applied to the magnetic tape for such a short period, the resulting remanence magnetization in the magnetic tape may be reflective of the magnetic field pattern. In other words, the magnetic orientation of the created servo mark may be generally symmetrical from one end of the servo mark to the other end of the servo mark.

In an example, this disclosure describes a data storage tape that includes a substrate and a magnetic layer formed over the substrate. The magnetic layer includes a perpendicular squareness greater than 50 percent and a longitudinal squareness less than 50 percent and a remanence magnetization in a direction one of substantially perpendicular to the substrate.

In another example, this disclosure describes a method that includes passing a magnetic tape through at least one magnetic field, wherein the magnetic tape includes a substrate and a magnetic layer including a perpendicular squareness greater than 50 percent and a longitudinal squareness less than 50 percent, and with the at least one magnetic field, creating a remanence magnetization in the magnetic layer in a direction substantially perpendicular to the substrate.

In a further example, this disclosure describes a system that includes a magnetic tape comprising a perpendicular squareness greater than 50 percent and a longitudinal squareness less than 50 percent, a tape drive configured to move the magnetic tape in a first direction, and at least one magnetic head. The at least one magnetic head is configured to create a remanence magnetization in a direction substantially perpendicular to the magnetic tape.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIGS. 16A and 16B are conceptual diagrams of a single magnetic head that alternates the direction of a magnetic field to write a servo pattern.

DETAILED DESCRIPTION

Figure 1:
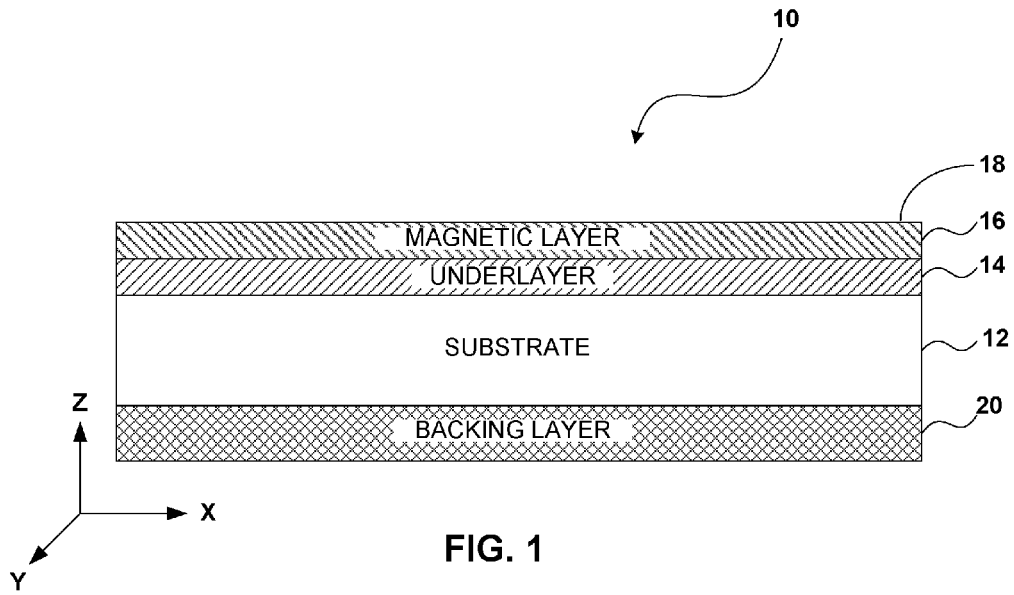
FIG. 1 is a cross-sectional schematic of an exemplary magnetic storage medium.

In general, this disclosure relates to magnetic storage media, e.g., magnetic tape, that has a greater perpendicular squareness than longitudinal squareness. Various techniques for erasing, e.g., biasing, and writing to magnetic storage tape that defines a greater perpendicular squareness are described. As a result of one or more of these techniques, the magnetic storage tape may include patterns of different remnant magnetizations along the length of the magnetic tape, e.g., servo patterns, that allow data to be stored on the magnetic storage tape with various data storage drives.

As used herein, greater perpendicular squareness generally refers to magnetic particles of a magnetic tape that are capable of being magnetically oriented in any three-dimensional direction. The magnetic orientation of these magnetic particles may be described as a vector having a perpendicular component, e.g., perpendicular with the plane of the magnetic tape, and a longitudinal component, e.g., parallel with the plane of the magnetic tape. Although magnetic particles of a magnetic tape that defines a greater perpendicular squareness (i.e., "perpendicular magnetic tape") may have some tendency to orient somewhat perpendicular to the magnetic tape, magnetic particles exhibiting a greater perpendicular squareness may be isotropic in some materials used for magnetic tape. In contrast, traditional magnetic storage tape has magnetic particles that orient substantially, if not completely, parallel to the plane of the magnetic storage tape.

An advantage of magnetic storage tape having a greater perpendicular squareness is a higher data storage capacity. However, a disadvantage to this type of magnetic media is that complex magnetic orientations are possible with the magnetic particles. These complex orientations can cause non-conventional magnetic fields, which can diminish the signal-to-noise ratio associated with the read-out of marks on the magnetic tape, and may lead to loss of data during such read-out. Therefore, precise biasing techniques and writing techniques may be used to achieve greater signal-to-noise ratios for information written on perpendicular magnetic tape. The techniques of this disclosure may be particularly useful for the creation of servo patterns on magnetic tape, which are typically located in a servo band located between data bands.

In one example, the magnetic tape may be biased, i.e., erased, in substantially either the perpendicular or longitudinal direction. This bias may alternatively be described as a remanence magnetization left in the magnetic layer of the tape after applying a magnetic field to the tape. This substantially perpendicular or substantially longitudinal remanence magnetization may be generated with two magnetic heads or one magnetic head. In a two head biasing system, each head is positioned on opposing sides of the magnetic tape. Each head applies a magnetic field directed along the tape in the same direction to create the substantially longitudinal bias. Conversely, each head may apply a magnetic field directed along the tape in opposing directions to create the substantially perpendicular bias. In other words, specific magnetic orientations may be created on perpendicular magnetic tape with different portions of a single magnetic field. In either perpendicular or longitudinal bias, corresponding servo patterns (e.g., a plurality of servo marks) may be written over the bias to create a pattern remanence magnetization that is substantially opposite that of the bias.

In another example, the magnetic tape may include a bias, or remanence magnetization, in one of eight directional octants, e.g., magnetic orientations with non-zero perpendicular and longitudinal components. This type of bias may also be created with a single head, depending on the direction of the magnetic field and which side of the magnetic tape the head is located. Servo patterns may be written in generally opposing directional octants from that of the bias octant in order for a signal to be generated at the interface between the two different directions of the servo pattern remanence magnetization and the non-pattern or bias remanence magnetization.

Although biasing and servo writing, e.g., the method of writing servo patterns into a servo track of a magnetic tape, may be completed with two different magnetic heads and/or in two separate steps, a single write head may be configured to create a bias and servo patterns in one step. A single write head may continuously bias the magnetic tape and write servo patterns to the magnetic tape as the tape passes by the write head. In this continuous writing technique, the write head may alternate the direction of the magnetic field such that the trailing edge of the alternating magnetic field biases the tape and writes the servo patterns. In other words, a bias is created with one direction of the magnetic field and the servo patterns are created with the other direction of the magnetic field. Therefore, biasing and servowriting may be completed with a single pass of the magnetic tape near a write head.

Magnetic fields may also be applied to perpendicular magnetic tape to create symmetrical servo mark, e.g., parts of a servo pattern. The gap width of the magnetic head, or the distance over which the magnetic field travels, may be sized to be approximately equal to the length of the servo mark. As the magnetic tape passes near the magnetic head, a short electrical current pulse is applied to the magnetic head to generate a short-lived magnetic field. This short current pulse may occur during a short period of generally between 10 nanoseconds and 50 nanoseconds. In one example, the short period may be approximately 30 microseconds or less. The short period may be at least partially dependent upon the speed at which the magnetic tape passes by the magnetic head, e.g., faster tape speeds may require shorter current pulses. Since the magnetic field is applied to the magnetic tape for such a short period, the resulting magnetic orientation in the magnetic tape over the length of the servo mark may be substantially equivalent to the magnetic field. In other words, the magnetic orientation of the created servo mark is substantially symmetrical from one end of the servo mark to the other end of the servo mark.

FIG. 1 is a cross-sectional schematic of an exemplary magnetic storage medium 10. By way of example, magnetic tape 10 may be a magnetic recording medium, or magnetic storage tape, capable of storing data. Magnetic tape 10 includes a substrate 12. Substrate 12 defines a first side and a second side opposite the first side. A non-magnetic underlayer 14 is formed over the first side of substrate 12. Underlayer 14 contacts substrate 12 on one surface and defines a coating surface on an opposite surface. A backing layer 20 may be formed over the second side of substrate 12. In addition, magnetic layer 16 is formed over the coating surface defined by underlayer 14. Magnetic layer 16 defines a recording surface 18. Recording surface 18 may be the outward most surface of magnetic recording media 10 and may be the surface that a recording head traverses during a data reading or writing operation. In addition to one or more data tracks, magnetic layer 16 may support one or more servo tracks that allow a read/write head to align with the data tracks.

Substrate 12 functions as a support carrier for magnetic recording media 10 and may be formed from any suitable materials. For example, substrate 12 may include glass, plastics, organic resins, metals, and the like. In some cases, substrate 12 may include a polymeric film. Any suitable polymer or combination of polymers may be used. Polymers may be selected for chemical compatibility, to impart mechanical or electromagnetic characteristics to magnetic recording media 10, or based on other characteristics. Polymers that are flexible, rigid, electrically resistive, electrically conductive, and the like are known in the art. Suitable polymers may include polyesters such as polyethylene terephthalate (PET), polyethylene naphthalate (PEN), blends or copolymers of polyethylene terephthalate and polyethylene naphthalate; polyolefins (e.g., polyethylene, polypropylene, polystyrene); cellulose derivatives; polyamides; polyimides; and combinations thereof. In addition, substrate 12 may include various other polymers, binders, or additives, such as carbon black and silica.

Backing layer 20 may be formed over at least a portion of a backside of substrate 12. Backing layer 20 may have a controlled surface roughness that, for example, influences the winding and unwinding characteristics of certain types of magnetic recording media, such as a magnetic tape. Backing layer 20 may also provide dimensional stability to magnetic tape 10 by, for example, minimizing the cupping and curing of the edges of magnetic tape 10. In some examples, backing layer 20 may include a component that provides electrical resistivity to composite magnetic tape 10. For example, backing layer 20 may include carbon black. An electrically resistive backing layer may improve the electromagnetic characteristics of a magnetic tape 10. In addition, backing layer 20 may include binder components. Any suitable binder components that are chemically compatible and mechanically stable may be used. In some cases, binder components may include polyurethanes and polyolefins, a phenoxy resin, a nitrocellulose, polyvinylchloride, and combinations thereof. Backing layer 20 may include additional polymers, pigments, binders, solvents and additives, as will be appreciated by those skilled in the art.

Magnetic layer 16 is formed over substrate 12. In general, magnetic layer 16 includes a plurality of magnetic particles contained in a binder. Additives such as surfactants, wetting agents, lubricants, abrasives, and the like may be added to the plurality of magnetic particles to improve the quality and performance of magnetic tape 10 in recording and storing data, e.g., creating and retaining magnetic orientations of the magnetic particles within magnetic layer 16. The various components of the magnetic layer 16 composition can be combined and coated onto an article to form magnetic layer 16 that defines a recording surface 18.

In general, magnetic layer 16 includes a plurality of magnetic particles that form a pigment. Different magnetic particles define different shapes, and shape profiles may impact the storage density or storage quality of a formed magnetic tape. As examples, magnetic particles may define an acicular or needle-shape, a platelet-shape, a low aspect ratio shape, or magnetic particles may even define an amorphous shape. Magnetic layer 16 may include magnetic particles of any suitable shape. For example, magnetic layer 16 may include acicular particles. Typical acicular particles include particles of ferromagnetic or ferrimagnetic iron oxides, such as gamma-ferric oxide ($\gamma$-$Fe_2O_3$), complex oxides of iron, cobalt, and nickel, and various ferrites and metallic iron, cobalt, or alloy particles. However, non-acicular shaped particles may exhibit a better packing morphology than acicular shaped particles. For example, platelet-shaped particles may exhibit denser packing morphology than acicular particles when the platelet-shaped particles are oriented perpendicularly instead of longitudinally with the plane of substrate 12. As another example, low aspect ratio particles may not naturally stack on top of one another, resulting in a more uniform magnetic recording surface.

Accordingly, magnetic layer 16 may also include particles such as platelet-shaped particles and low aspect ratio particles. Suitable platelet-shaped or low aspect ratio particles may include various iron, cobalt, and nickel-based particles, including alloys of iron, cobalt and nickel, and compounds of iron, cobalt, and nickel with oxygen and/or nitrogen. In some examples, platelet-shaped or low aspect ratio particles may include particles that comprise a hexagonal lattice structure. For example, some ferrites such as barium ferrite (e.g., hexagonal barium ferrite) comprise a hexagonal lattice structure. Another example of platelet-shape particles suitable for use in a magnetic tape of this disclosure are strontium ferrite particles.

Magnetic tape 10 is merely one example construction of a magnetic tape. Alternatively, other magnetic tapes may include no backing layer 20 or multiple backing layers 20. In some examples, magnetic layer 16 may be bonded directly to substrate 12 without underlayer 14. In other examples, magnetic tape 10 may include multiple magnetic layers 16 that may or may not include a cover layer deposited over the one or more magnetic layers 16. In general, magnetic layer 16 may be described as being formed over substrate 12. The term "formed over" may include examples where there are one or more layers are disposed between magnetic layer 16 and substrate 12 or other examples where magnetic layer 16 is formed directly on or bonded directly to substrate 12. Therefore, the examples described herein that include a magnetic layer formed over a substrate may, or may not, have additional layers disposed between them.

Figure 2A:
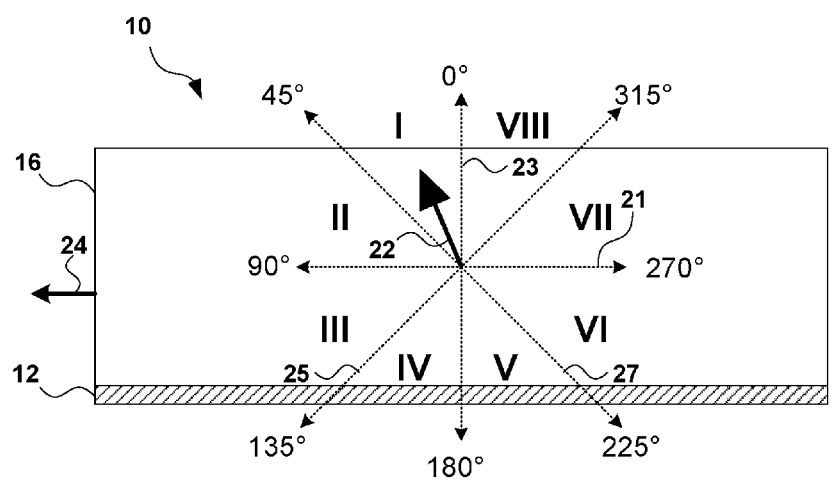
FIG. 2A is a conceptual diagram of an example direction of remanence magnetization in one of eight octants after applying a magnetic field to a magnetic storage tape.

FIG. 2A is a conceptual diagram of an example direction of remanence magnetization 22 after applying a magnetic field to magnetic particles within magnetic layer 16. Magnetic tape 10 includes magnetic layer 16 formed over to substrate 12. Although magnetic tape 10 may include additional backing layers, underlayers or intermediate layers (e.g., between magnetic layer 16 and substrate) as described above with respect to FIG. 1, magnetic tape 10 may be generally be described as including substrate 12 and magnetic layer 16 formed over substrate 12. Each of the magnetic particles within magnetic layer 16 may be described as having a magnetic orientation 22 (i.e., a remanence magnetization resulting from an applied magnetic field). In addition, a plurality of magnetic particles may be generally described in combination has having a remanence magnetization 22. Since some of the magnetic particles may be oriented differently than the general magnetic orientation, a generally described remanence magnetization 22 of the magnetic particles may refer to the magnetic orientation of substantially all of the magnetic particles or the collective orientation of the magnetic particles within magnetic layer 16.

Remanence magnetization 22 may be generally used within this disclosure to describe a vector of the magnetic alignment of the magnetic particles caused by an applied magnetic field to magnetic layer 16. Generally a coordinate system as shown in FIG. 2A may be used to identify the direction of remanence magnetization 22 with respect to substrate 12 of magnetic tape 10. The coordinate system is described in a length-wise cross-section of magnetic tape 10 and in accordance to the direction magnetic tape 10 is moved passed a read/write head, as shown by arrow 24.

As shown in the example of FIG. 2A, remanence magnetization 22 of a portion of magnetic layer 16, i.e., one or more magnetic particles, is aligned at approximately 25 degrees. This alignment, or direction, of remanence magnetization 22 is away from substrate 12 and towards the direction of magnetic tape movement indicated by arrow 24. Remanence magnetization 22 may also be described as having a longitudinal component and a perpendicular component, both of which are non-zero. In fact, at 25 degree remanence magnetization 22 indicates that the longitudinal component is smaller than the perpendicular component of the vector. Therefore, remanence magnetization 22 is also within directional octant I.

Directional octants I, II, III, IV, V, VI, VII, and VIII may be used to describe the direction of remanence magnetization 22. The directional octants describe a vector space in which remanence magnetization 22 may be directed. Each of the octants are separated by planes in space with respect to magnetic tape 10. Longitudinal plane 21 is parallel with substrate 12 and bisects magnetic layer 16. Perpendicular plane 23 is orthogonal to substrate 12 and bisects the cross-section of magnetic layer 16. In other words, perpendicular plane 23 is perpendicular to substrate 12 and the length of substrate 12. In addition, oblique planes 25 and 27 further segment the vector space and create borders for the octants. In this manner, each of planes 21, 23, 25, and 27 intersect at a common line and create the borders for each of the eight octants described herein. In some examples, remanence magnetization 22 lying in one of the planes may be described as being within the two octants bordering that plane.

The directional octants may be equally separated by planes 21, 23, 25, and 27 such that each octant defines an approximate 45 degree angle. However, in other examples, the planes may be oriented differently such that planes 25 and 27 for angles generally between 20 degrees and 70 degrees with longitudinal plane 21. In one example, planes 25 and 27 may each form a 30 degree angle with longitudinal plane 21 such that octants I, IV, V, and VIII border perpendicular plane 23 and form a 60 degree angle with perpendicular plane 23. In another example, planes 25 and 27 may each form a 60 degree angle with longitudinal plane 21 such that octants I, IV, V, and VIII border perpendicular plane 23 and form a 30 degree angle with perpendicular plane 23.

As shown in FIG. 2A, directional octant I may be between 0 degrees and 45 degrees, directional octant II may be between 45 degrees and 90 degrees, directional octant III may be between 90 degrees and 135 degrees, and directional octant IV may be between 135 and 180 degrees. In addition, directional octant V may be between 180 degrees and 225 degrees, directional octant VI may be between 225 degrees and 270 degrees, directional octant VII may be between 270 degrees and 315 degrees, and directional octant VIII may be between approximately 315 degrees and 360 degrees (i.e., 0 degrees). In other words, each directional octant may lie in the areas between planes 21, 23, 25, and 27.

Since the exact degrees of remanence magnetization 22 may be less important than the general direction of orientation with respect to substrate 12, directional octants may be used to describe the remanence magnetization of bias and servo marks in some examples. Although each directional octant may be centered about a specific degree, e.g., 22.5 degrees for directional octant I, the directional octants do not need to be centered between any of planes 21, 23, 25, and 27 as shown in FIG. 2A.

In some examples, remanence magnetization 22 may reside along one of planes 21, 23, 25, and 27, instead of within one of the directional octants. If remanence magnetization 22 is along plane 21, e.g., 90 degrees or 270 degrees, remanence magnetization 22 may be defined as longitudinal because the direction of remanence magnetization 22 is parallel to the plane of substrate 12 and magnetic tape 10. Conversely, remanence magnetization 22 aligned along axis 23, e.g., 0 degrees or 180 degrees, may be defined as perpendicular because the direction of remanence magnetization 22 is perpendicular to the plane of substrate 12 and magnetic tape 10.

In other examples, remanence magnetization 22 may be defined as substantially perpendicular or substantially longitudinal with respect to planes 23 or 21, respectfully. Since remanence magnetization 22 may not be exactly aligned with one of planes 21 or 23, the phrases "substantially perpendicular" or "substantially longitudinal" may define ma remanence magnetization 22 within a predetermined angle of each of the planes. For example, remanence magnetization 22 may be substantially perpendicular when remanence magnetization 22 is within approximately 20 degrees of plane 23, e.g., between 20 and 340 degrees or between 160 and 200 degrees. The variation of remanence magnetization 22 from plane 23 to be considered substantially perpendicular may generally be less than a 45 degree variation from plane 23, e.g., between 45 and 135 degrees or between 225 degrees and 315 degree. The variation of remanence magnetization 22 from plane 21 to be considered substantially longitudinal may generally be less than a 45 degree variation from plane 21, e.g., between 315 degrees and 45 degrees or between 135 degrees and 225 degrees. However, a substantially perpendicular or a substantially longitudinal remanence magnetization 22 of magnetic layer 16 may be more specifically within 25 degrees of either of planes 21 or 23.

Figure 2B:
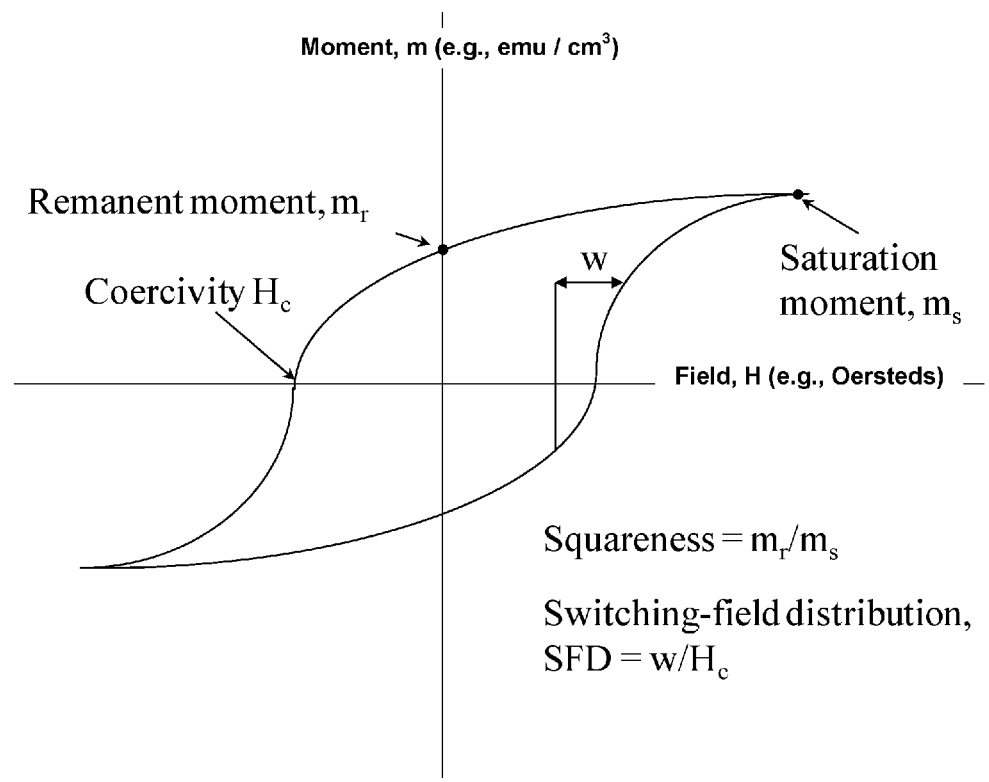
FIG. 2B is a schematic drawing of an example hysteresis curve that defines squareness of a magnetic layer of a magnetic storage medium.

FIG. 2B is a schematic drawing of an example hysteresis curve that defines squareness of a magnetic layer of a magnetic storage medium. An example of an electromagnetic characteristic that may be indicative of magnetic particle deagglomeration is magnetic squareness. The term squareness as used herein refers to the ratio of remanent moment to saturation moment for a magnetic material, which may be measured using a vibrating-sample magnetometer (VSM) with a defined saturation field of 10,000 Oersted. The remanent moment and saturation moment parameters for a magnetic material may be observed on a magnetic hysteresis curve. A hysteresis curve defines how a magnetic material can be magnetically oriented or reoriented in response to application and removal of magnetic fields. In the example of FIG. 2B, remanent moment, $m_r$, refers to the magnetization that remains in a magnetic material after saturation in a strong magnetic field, while saturation moment, $m_s$, refers to the magnetization in the magnetic material when saturated. In addition, coercivity, $H_c$, refers to the field strength applied to a magnetic material after saturation with a strong field in the opposite direction that is just sufficient to reduce the moment, m, to zero. FIG. 2B also illustrates switching field distribution (SFD), which is a measure of the interval of magnetic field strength over which a given magnetization can be completely reversed, normalized by the coercivity, $H_c$. SFD is typically measured as the full width, w, of a hysteresis curve at half the maximum value of the pulse that is calculated by differentiating the hysteresis curve with respect to magnetic field, H.

Magnetic squareness is identified in the example hysteresis curve of FIG. 2B by the ratio of remnant moment, $m_r$, to saturated moment, $m_s$ (i.e., $m_r/m_s$). In some cases, a higher squareness value indicates less magnetic particle agglomeration, or stacking, than a corresponding magnetic material with a lower squareness value. While FIG. 2B identifies the general location of different hysteresis parameters, the curve is only provided for illustration of a general case of squareness and is not intended to represent the hysteresis plot for any particular material contemplated herein.

A hysteresis curve for a magnetic material can be measured in any direction of a magnetic material. For example, a hysteresis curve can be measured in a direction parallel to a recording surface a magnetic recording medium (e.g., a direction parallel to the direction a substrate is transported in a web manufacturing process), perpendicular to a recording surface of a magnetic recording medium, or crosswise to a recording surface of a magnetic recording medium. Further, squareness values can be determined for each hysteresis curve measured in each different direction. In general, an increased squareness value in one direction (e.g., perpendicular to the surface of a magnetic recording medium) correlates with a decreasing squareness in another direction (e.g., parallel to the surface of the magnetic recording medium), and vice versa.

The squareness of a magnetic material may vary depending, for example, on the orientation of magnetic particles in the material or the orientation of the material itself. One orientation of squareness is along a long axis of a recording medium, such as an axis parallel to a length of magnetic tape or an axis parallel to the direction a substrate is transported in a web manufacturing process. Hence, this type of squareness may be referred to as a longitudinal squareness or a magnetic layer with greater longitudinal squareness than perpendicular squareness. A hysteresis curve may be determined by measuring the magnetic characteristics exhibited by the medium when the medium is oriented in the described longitudinal arrangement. A squareness value may subsequently be calculated based on the determined hysteresis curve.

As generally described herein, magnetic layer 16 of FIG. 1 may have a perpendicular squareness greater than 50 percent and a longitudinal squareness less than 50 percent. In other words, magnetic layer 16 may have a greater or large perpendicular squareness that indicates a magnetic media with perpendicular anisotropy. In other examples, magnetic layer 16 may have a perpendicular squareness greater than 75 percent and/or a longitudinal squareness less than 25 percent. In some examples, magnetic layer 16 may have a perpendicular squareness greater than 90 percent and/or a longitudinal squareness less than 10 percent. In any of these examples, a perpendicular squareness greater than 50 percent may allow a remanence magnetization of magnetic layer 16 to be in a direction substantially perpendicular to substrate 12.

Figure 3:
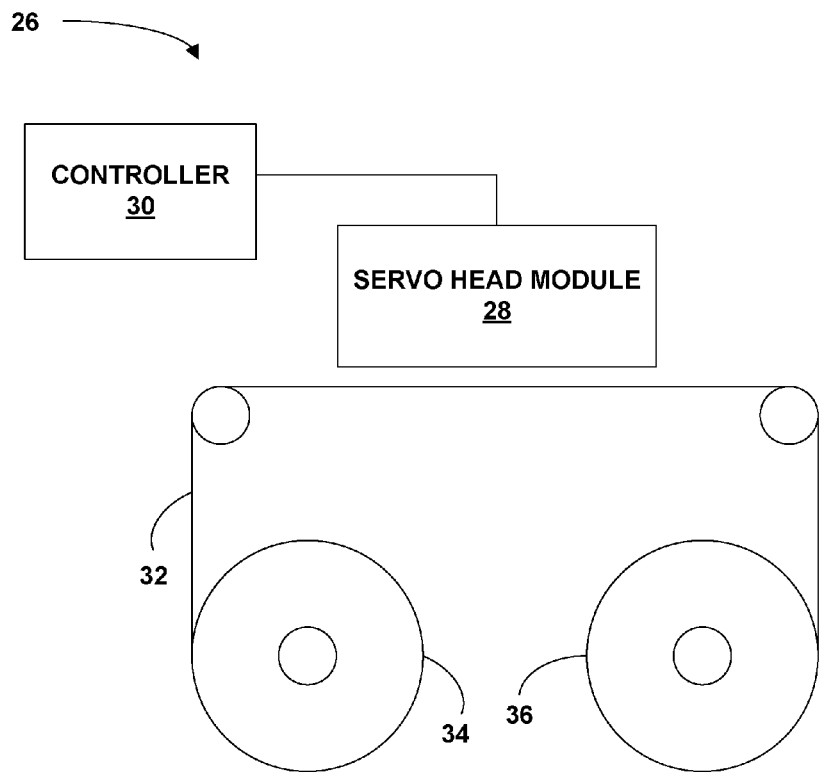
FIG. 3 is a conceptual diagram of an example servowriting system.

FIG. 3 is a conceptual diagram of an example servo writing system 26 that writes pre-recording servo patterns on magnetic tape 32. Magnetic tape 32 may be an example of magnetic tape 10 described in FIGS. 1 and 2. System 26 includes servo head module 28, servo controller 30, and magnetic tape 32 spooled on spools 34 and 36. Servo head module 28 contains one or more servo heads, i.e., magnetic heads, to write servo patterns on magnetic tape 32. Controller 30 controls the magnetic fields applied by the one or more servo heads of servo head module 28. Magnetic tape 32 feeds from spool 34 to spool 36, passing in close proximity, e.g., near or adjacent, to servo head module 28. For example, magnetic tape 32 may contact the one or more servo heads of servo head module 28 during servo recording.

Servo head module 28 comprises electromagnetic elements that generate magnetic fields. In one example, controller 30 may cause a first servo head to write substantially over the full servo band, e.g., one or more servo tracks, associated with magnetic tape 32. Then, controller 30 can cause at least one additional servo head within servo head module 28 to selectively erase servo marks within the prerecorded servo band. Servo head module 28 may write servo patterns in the one or more servo tracks over a pre-created bias in magnetic tape 32. The bias may be created by one or more different bias heads. These different bias heads are magnetic heads that may be independent from system 26, included in system 26 in a different head module, or even as a part of servo head module 28. In some examples, the bias may be created by servo heads within servo head module 28 prior to, or during, writing of the servo patterns.

In a different example, the servo band portion of magnetic tape 32 may be randomly magnetized. Random magnetization of magnetic tape 10 may be a substantially zero bias, or erasure, created with alternating magnetic fields from one or more magnetic heads. Controller 30 may cause at least one servo head within servo head module 28 to write servo marks within a randomly magnetized servo band.

Figure 4:
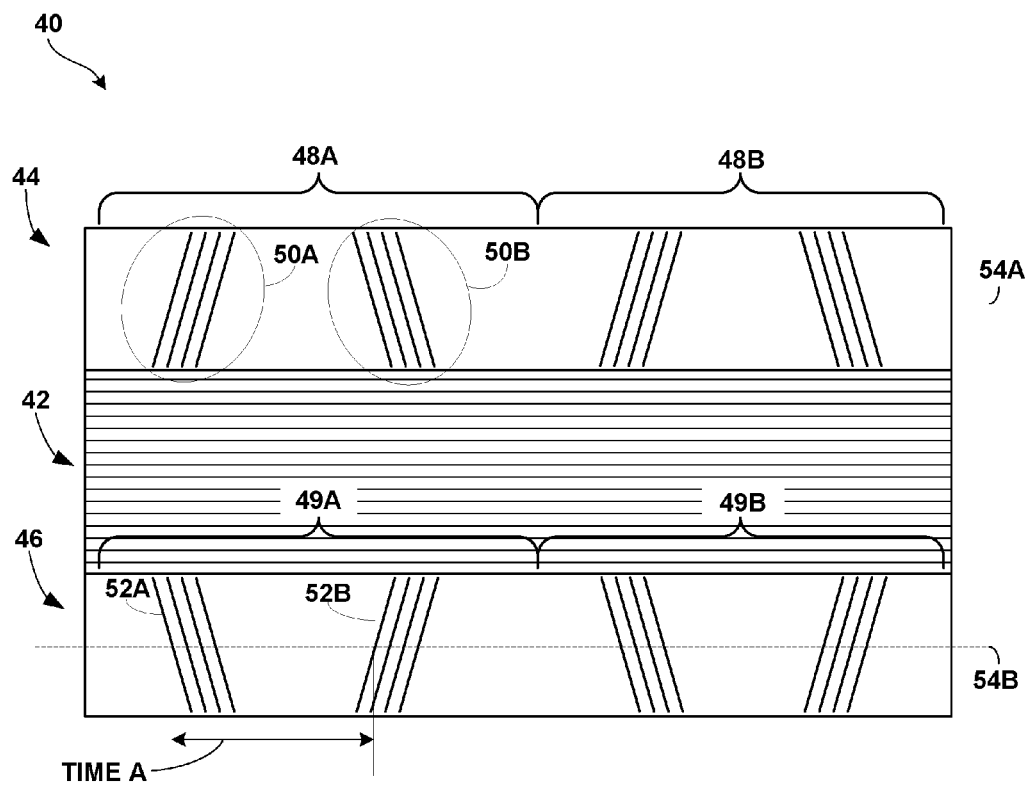
FIG. 4 is a conceptual diagram of example servo patterns within a servo track of a magnetic storage tape.

Generally, a servo head on servo head module 28 writes or creates a servo pattern with at least three servo marks. For example, the servo head may provide a time-based servo pattern that allows a linear position error signal (PES) calculation. In some examples the servo pattern provides a linear relationship between the PES and a ratio of time increments between detection of servo marks in the servo pattern to allow a linear formula to be used in the PES calculation, hereinafter referred to as a "linear PES calculation". Exemplary time-based servo patterns are illustrated in FIG. 4. In other examples, servo head module 28 may include amplitude based servo patterns or other servo patterns provided to allow a read/write head to accurately position itself over one or more data tracks in the magnetic tape 32.

One or both of spools 34 and 36 may be attached to a motor that moves spools 34 and 36 in order to move magnetic tape 32 and pass magnetic tape near servo head module 28. Controller 30, or a different control device, may coordinate the movement of magnetic tape 32 and the generation of magnetic fields with servo head module 28. This coordination may include a speed of magnetic tape 32 and/or timing of magnetic field generation with servo head module 28. System 26 may be configured to move magnetic tape in either direction passed servo head module 28 or only one direction with respect to servo head module 28.

Although system 26 is described as being used to create servo patterns with a plurality of servo marks in magnetic tape, system 26 may also, or alternatively, create a magnetic bias in a magnetic tape. Once the bias is created, servo patterns may be created on the magnetic tape over the magnetic bias. The bias may promote a strong signal-to-noise ratio when transitioning between bias areas and servo patterns in the magnetic tape. Both the bias and the servo patterns may be characterized by a remanence magnetization in a specific direction with respect to the magnetic tape as described in FIG. 2A.

In general, the magnetic heads of servo module 28 may produce a magnetic field of any suitable strength appropriate to achieve a specific magnetic orientation. Factors that may affect a choice of magnetic field strength include, for example, the types magnetic particles in the magnetic layer, the additional types of components in the magnetic layer composition, and the specific equipment used to apply a magnetic field. In some examples, magnetic field strength may be correlated to squareness values of the magnetic layer and adjusted to achieve a desired remanence magnetization from the magnetic field. In some examples, a magnetic field strength between approximately 3000 gauss and approximately 5000 gauss may be applied to a magnetic layer to create a magnetic bias or servo patterns in the magnetic layer of the magnetic tape.

The magnetic fields described herein to create a magnetic bias and/or servo patterns may be applied to a magnetic layer at any suitable point in a manufacturing process or even at multiple points in a manufacturing process. For example, a magnetic field may be applied while a magnetic layer is still wet to allow magnetic particles to rotate within the layer. After being controllably rotated, the magnetic particles may exhibit an appropriate magnetic anisotropy. In some cases, a magnetic field may be applied shortly after a magnetic layer is formed over a substrate. For example, when a magnetic recording medium is manufactured by coating a magnetic layer over a moving web, a magnetic field may be applied shortly after the web exits the coating apparatus that applies the magnetic layer. By applying a magnetic field before the magnetic layer has settled and started to dry, magnetic particles within the magnetic layer may be more susceptible to rotation and magnetic alignment. As a result, a formed magnetic recording medium may exhibit a stronger and more uniform magnetic anisotropy, which may increase the number of magnetic marks (e.g., areas that are used to indicate a bit of information) available on the formed magnetic recording medium for storing data.

FIG. 4 is a conceptual view illustrating data storage tape 40 including data tracks 42, servo track 44 and servo track 46. Data storage tape 40 may be an example of magnetic tape 10 or 32 of FIGS. 1-3. As referred to herein, a servo mark is a continuous shape that can be sensed as a read head passes over a media surface. Time-based servo marks are generally lines, but not necessarily straight lines; e.g., in some examples, time-based servo marks may have zigzag or curved shapes. With respect to magnetic tape, a servo mark is generally written by a single write gap in a servo head with a single electromagnetic pulse. The term servo marks encompasses servo stripes, which are straight, and also includes curved servo marks and servo marks with other shapes, e.g., each servo mark may be a chevron and each servo pattern may be a nested set of chevrons.

A servo pattern includes a plurality of servo marks. The plurality of servo marks in a single time-based servo pattern allows calculation of a PES using time measurements between the detection of servo marks within the pattern by a read head. Generally, all servo marks within a single servo pattern are written using a single electromagnetic pulse so that any inconsistency in tape speed during the servo writing does not affect the spacing of servo marks within a servo pattern. As referred to herein, a servo frame includes at least one servo pattern, although servo frames often include more than one servo pattern. As an example, servo track 44 includes servo frames 48A-48B (collectively "frames 48"). Each of servo frames 48 includes four servo patterns. Servo patterns in servo frames having more than one servo pattern are generally written with the same servo head using one electromagnetic pulse for each servo pattern in the servo frame. For example, each of servo frames 48 was written using four electromagnetic pulses.

Similarly shaped adjacent servo marks of separate servo patterns within a servo frame are generally written using the same write gap. These commonly shaped adjacent servo marks of separate servo patterns within a servo frame are referred to herein as a burst. The term burst is in reference to the signal detected as a head passes over the servo marks that make up a burst. For example, servo frame 48A includes bursts 50A-50B. In some examples, servo frames may overlap, as can servo marks, servo patterns and bursts. For simplicity, no overlapping servo marks, servo patterns, bursts or servo frames are shown in FIG. 4.

Servo frames 48 each include two servo patterns, and each servo pattern includes four servo marks with a single linear mark. For example, the four marks in burst 50A are linear. All of the servo patterns in servo band 44 were written by the same servo write head and are substantially identical. Servo track 46 also includes two servo frames 49A and 49B ("frames 49"). Each of frames 49 also includes two servo patterns. As with servo track 44, all of the servo patterns in servo track 46 are written by the same servo write head and are identical. The servo patterns in servo track 44 are shown as being inverted relative to the servo patterns in servo track 46. However, in other examples, each servo track may have the same or a unique servo pattern.

The servo patterns in servo tracks 44 and 46 facilitate positioning of a read head or data head relative to data tracks 42, which reside a known distance from servo tracks 44 and 46. The location of a read head along one of head paths 54A and 54B ("paths 54") is determined by measuring the time between detection of marks forming each servo pattern. Servo marks 52A-52B ("marks 52") form the servo patterns in servo frame 14A. Servo marks 52 have non-identical geometries in that their geometries differ from one another other than simply being transposed from one another in a down-tape direction. For example, two linear servo marks which are at different angles relative to a cross-tape direction have non-identical geometries, as shown in FIG. 4. Similarly, two non-linear servo marks, e.g., curved servo marks, having the same general shape at different angles relative to a cross-tape direction have non-identical geometries. In contrast, each servo mark of a burst, e.g., the four servo marks of burst 50A, typically has an identical geometry to the other marks in the burst. As data storage tape 40 passes by a read head located along head path 54B, the read head first detects the first servo mark of servo pattern 52A. Then the first servo mark of servo pattern 52B of servo frame 49A is detected by the read head. The time between the detection of the first servo mark in servo pattern 52A and first servo mark of servo pattern 52B is shown as "TIME A" in FIG. 4. From this measurement, the position of the read head within servo track 46 can be determined because the distance between servo patterns 52A and 52B varies as a function of the lateral position of the path of the read head. For example, if head path 54B were closer to data tracks 42, TIME A would be greater. Likewise, if head path 54B were further from to data tracks 42, TIME A would be shorter.

The relationship between the measured TIME A and the position of the read head within servo track 46 is dependent on the tape speed of data storage tape 40 as it passes over the read head. By locating the positions of head paths 16 relative to servo tracks 44 and 46, a PES can be generated to identify lateral positioning error of the read head relative to the data track(s). While PES calculations only require only a single servo pattern, data from multiple servo patterns within a servo track may be combined to improve accuracy of a PES. Each of the servo patterns in servo track 44 is substantially identical to each other, and the servo patterns in servo track 46 are also substantially identical to each other. This means that the same PES calculation formula may be used for every servo pattern in a servo track.

Figure 5:
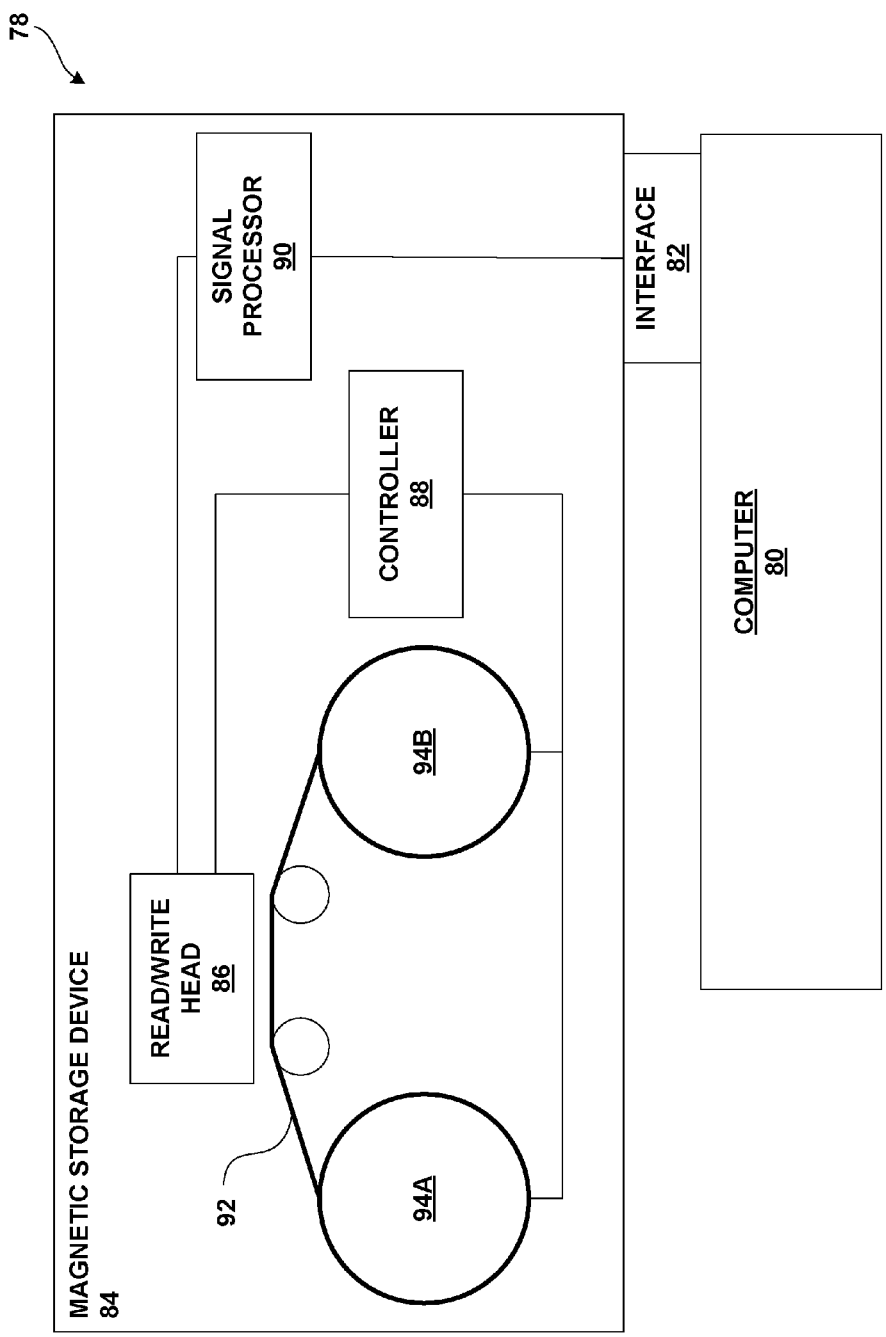
FIG. 5 is a conceptual diagram of an example data storage system using a magnetic storage tape.

FIG. 5 is a conceptual diagram of an example data storage system 78 using magnetic storage tape 92. Magnetic tape 92 is an example of, and may be substantially similar to any of magnetic tapes 10, 32, and 40 described herein. As shown in FIG. 5, magnetic storage device 84 may be used with a configuration of magnetic tape 92, e.g., a magnetic recording medium. Magnetic storage device 84 may comprise a magnetic tape drive, a magnetic tape cartridge drive, or the like. Magnetic tape 92 may be spooled onto one or more spools 94A and 94B (collectively "spools 94"). Spools 94 may be housed in a cartridge, although this disclosure is not limited in that respect.

Magnetic tape 92 may comprise a perpendicular magnetic tape and may include a substrate, an underlayer, a magnetic layer, and other layers. Read/write head 86 is a magnetic head and may be positioned to detect magnetic transitions, i.e., the changes between magnetic orientations of magnetic particles within the magnetic layer, on tape 94. Although magnetic transitions may be detected as a change in read signal from the magnetic orientation changes, read/write head 86 may also be able to detect the magnetic orientation of the magnetic layer based on the detected signals in some examples. A controller 88 controls the positioning of read/write head 86 as well as the movement of tape 92 such as by turning spools 94A and/or 94B to precisely position read/write head 86 relative to tape 92. As described in FIG. 4, controller 88 may utilize detected servo patterns in one or more servo tracks to position read/write head 86 over the data tracks of magnetic tape 92. A signal processor 90 interprets detected magnetic transitions.

Magnetic storage device 84 of FIG. 5 may also be coupled to a computer 80 via an interface 82. Computer 80 may comprise a central processing unit for any of a variety of computer devices, including, for example, a PC, a Macintosh, a computer workstation, a hand-held data terminal, a palm computer, a cell phone, digital paper, a digital television, a wireless device, a personal digital assistant, a laptop computer, a desktop computer, a digital camera, a digital recording device, or the like. Computer 80 may interpret the output signals from signal processor 90 as data and perform additional calculations and processes so that the data stored on magnetic tape 92 is usable by computer 80 and/or a user. The information stored from computer 80 to magnetic tape 92 is often a backup copy of information stored in another storage device (e.g. a hard drive) of computer 80.

Beyond the devices illustrated in FIG. 5, magnetic tape 92 may be configured to function with other types of storage devices. For example, magnetic tape 92 can be configured for use in high density recording applications, such as for use with T10000, LTO3, LTO4, LTO5, Quantum S5, Quantum S6, 3592, or other suitably designed magnetic recording tape drives.

Figure 6A:
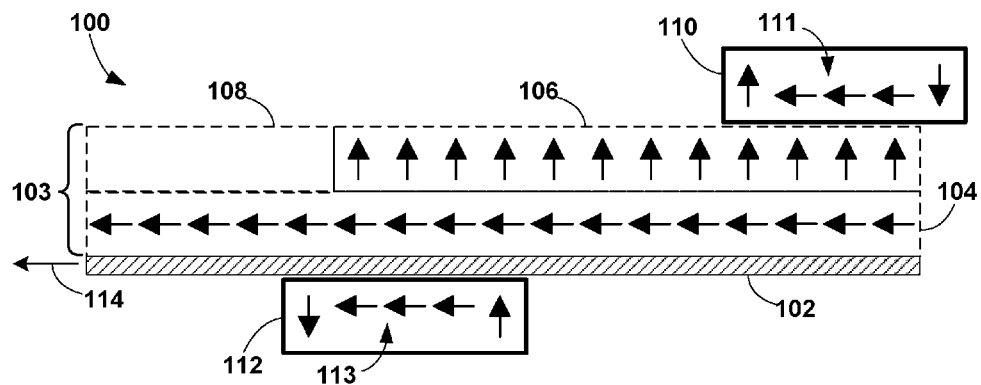
FIGS. 6A and 6B illustrate conceptual diagrams of an example bias and servo pattern in a longitudinal magnetic orientation and a graph of a corresponding read-out signal.
Figure 6B:
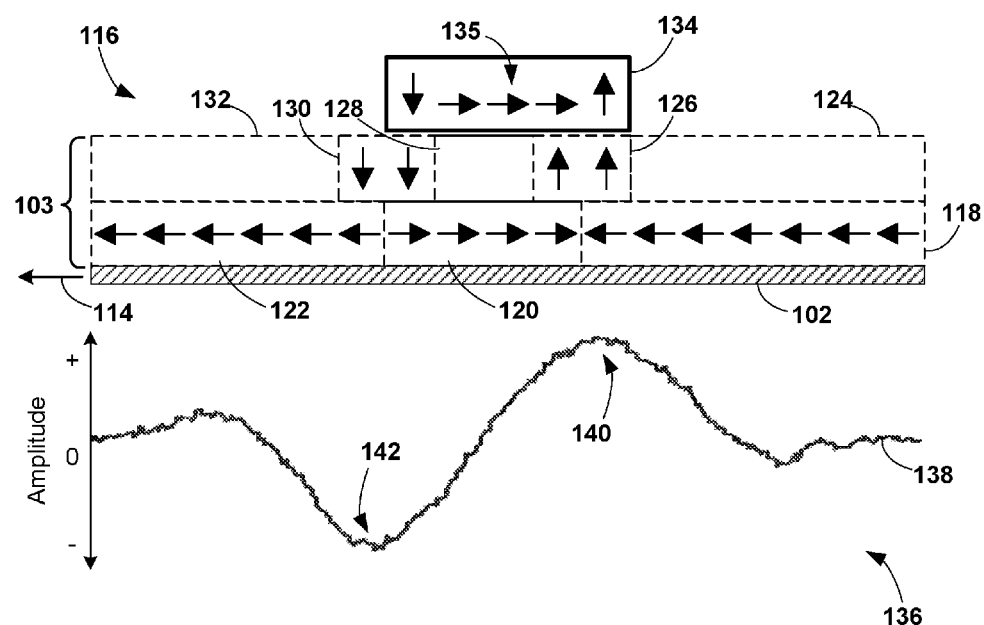

FIGS. 6A and 6B illustrate conceptual diagrams of an example bias in a substantially longitudinal magnetic orientation with a servo mark and a graph of corresponding readout signal 136. Magnetic tapes 100 and 116 are examples of magnetic tape 10, for example. As shown in FIG. 6A, sequential magnetic heads 110 and 112 located on opposing sides of magnetic tape 100 are used to create a substantially longitudinal bias in magnetic tape 100. Magnetic tape 100 includes substrate 102 and magnetic layer 103 with a bias created in magnetic layer 103. As magnetic tape 100 is moved in the direction of arrow 114 to pass near magnetic heads 110 and 112, a bias with a substantially longitudinal magnetic orientation (or remanence magnetization in a substantially longitudinal direction) is created in magnetic layer 103.

All arrows indicating the magnetic orientation in FIG. 6A are limited to perpendicular components and longitudinal components. In other words, the arrows in perpendicular component portion 106 only indicate that the perpendicular component of the magnetic orientation in magnetic layer 103 is directed away from substrate 102, e.g., 0 degrees. Accordingly, the arrows in longitudinal component portion 104 indicate that the longitudinal component of the magnetic orientation in magnetic layer 103 is directed in the same direction as arrow 114, e.g., 90 degrees. Therefore, the overall magnetic orientation within magnetic layer 103 between heads 110 and 112 would be within directional octants I or II, for example. If the magnitude of the perpendicular components are greater than the magnitude of the longitudinal components, then the overall magnetic orientation may be within directional octant I. Conversely, if the magnitude of the longitudinal components are greater than the magnitude of the perpendicular components, then the overall magnetic orientation may be within directional octant II. Separating perpendicular and longitudinal components of the magnetic orientation is used herein to more clearly describe magnetic orientations, or remanence magnetizations, of the magnetic tape.

First, magnetic tape 100 passes by head 110 that is generating magnetic field 111. The arrows of magnetic field 111, also shown using perpendicular and longitudinal components, indicate the general direction of magnetic field 111. The first portion of magnetic field 111 that is applied to magnetic tape 100 is directed toward substrate 102. The middle portion of magnetic field 111 is directed along magnetic tape 100 in the direction of arrow 114. The last portion of magnetic field 111 applied to magnetic tape 100 is directed away from substrate 102. Since this last portion of magnetic field 111 has the last effect on magnetic layer 103, perpendicular component portion 106 indicates that the perpendicular component of the created magnetic orientation is directed away from substrate 102. In addition, magnetic layer 103 includes a longitudinal component created by the middle portion of magnetic field 111, illustrated as longitudinal component portion 104, and remains in the magnetic orientation after magnetic tape 100 passes by head 110.

Second, magnetic tape 100 subsequently passes by head 112 that is generating magnetic field 113. The arrows of magnetic field 113, shown using perpendicular and longitudinal components, indicate the general direction of magnetic field 113. Although magnetic field 113 is applied to the opposite side of magnetic tape 100 from magnetic field 111, magnetic fields 111 and 113 are directed in the same general direction along magnetic tape 100 towards arrow 114. The first portion of magnetic field 113 that is applied to magnetic tape 100 is directed toward substrate 102. The middle portion of magnetic field 113 is directed along magnetic tape 100 in the direction of arrow 114. The last portion of magnetic field 113 applied to magnetic tape 100 is directed away from substrate 102. Since this last portion of magnetic field 113 also has the last effect on magnetic layer 103, perpendicular component portion 108 without any arrows indicates that the perpendicular component is substantially zero. The last portion of magnetic field 113 can be adjusted to oppose the perpendicular component remaining in the magnetic layer 103 after magnetic field 111. In other words, the overall magnetic orientation of magnetic layer 103 after passing through magnetic field 113 is substantially longitudinal in the direction of tape 100 movement, e.g. approximately 90 degrees. Therefore, the bias (e.g., magnetic orientation or remanence magnetization) of magnetic tape 100 after passing by heads 110 and 112 is substantially longitudinal.

In some examples, the positions of magnetic heads 110 and 112 may be switched such that magnetic tape 100 passes near magnetic head 112 before magnetic head 110. In other examples, a longitudinal bias in the opposing direction may be created by switching the direction of both magnetic fields 111 and 113 or moving magnetic tape 100 opposite to arrow 114. Magnetic fields 111 and 113 are simplified with only perpendicular or longitudinal components to illustrate their effect on magnetic layer 103. In practice, magnetic fields 111 and 113 may generally have an arched or horseshoe shape generated by magnetic heads 110 and 112, respectfully. Therefore, magnetic fields 111 and 113 may have an orientation with both perpendicular and longitudinal components through a majority of the fields in some examples.

As shown in FIG. 6B, servo head 134 applies magnetic field 135 to magnetic tape 100 to produce magnetic tape 116 with one or more servo marks. Although servo head 134 (an example of a magnetic head) is positioned on the magnetic layer side of magnetic tape 116, servo head 134 may be positioned on the side of substrate 102 in other examples. Prior to magnetic tape 116 being passed near servo head 134, magnetic tape 116 includes a magnetic orientation with substantially no perpendicular component as shown by perpendicular component portion 124 and only a longitudinal component as shown by longitudinal component portion 118. When servo head 134 applies magnetic field 135 to magnetic layer 103, magnetic field 135 changes the magnetic orientation of some magnetic particles with the previously created bias from FIG. 6A.

As magnetic field 135 is applied to magnetic layer 103 of moving magnetic tape 116, the magnetic orientation, or remanence magnetization, changes in certain areas of magnetic tape 116. The leading edge of magnetic field 135, i.e., the portion of magnetic field 135 directed away from substrate 102 causes the magnetic particles to be directed away from substrate 102 and creates perpendicular component portion 126. The trailing edge of magnetic field 135, i.e., the portion of magnetic field 135 directed toward substrate 102 causes the magnetic particles to be directed toward substrate 102 and creates perpendicular component portion 130. Since the middle of magnetic field 135 has a substantially longitudinal direction, perpendicular component portion 128 remains substantially zero.

The middle of magnetic field 135 with a substantially longitudinal direction opposing the direction of tape movement indicated by arrow 114 changes the direction of the longitudinal component as indicated by longitudinal component portion 120. In other words, the overall magnetic orientation of the written servo mark is approximately 270 degrees and the overall magnetic orientation of the remaining bias in unwritten areas is approximately 90 degrees. For example, longitudinal component portion 122 remains unchanged at approximately 90 degrees and perpendicular component portion 132 remains unchanged at approximately zero magnitude because magnetic field 135 was not applied to this area of magnetic tape 116. Therefore, the servo mark, and the servo pattern that includes the servo mark, has a magnetic orientation substantially opposite the magnetic orientation of the bias on magnetic tape 116. The remaining bias may also be referred to as the non-patterned area of the servo track. In other examples, magnetic field 135 may be applied to magnetic tape 116 for a longer period of time, e.g., longer pulse, so perpendicular component portions 126 and 128 and longitudinal component portions 120 may cover a greater length of magnetic tape 116.

FIG. 6B also illustrates an example read-out signal 136 of the magnetic orientation of magnetic tape 116 detected by a read head. Amplitude 138 of read-out signal 136 varies as the magnetic orientation of particles within magnetic layer 103 change over the length of magnetic tape 116. Pulses 140 and 142 indicate changes in magnetic orientation between the servo mark and the bias of magnetic tape 116. Generally, a greater amplitude between pulses 140 and 142 is desirable to generate a higher signal-to-noise ratio than would otherwise be achieved if there were smaller differences between the pulses.

Figure 7A:
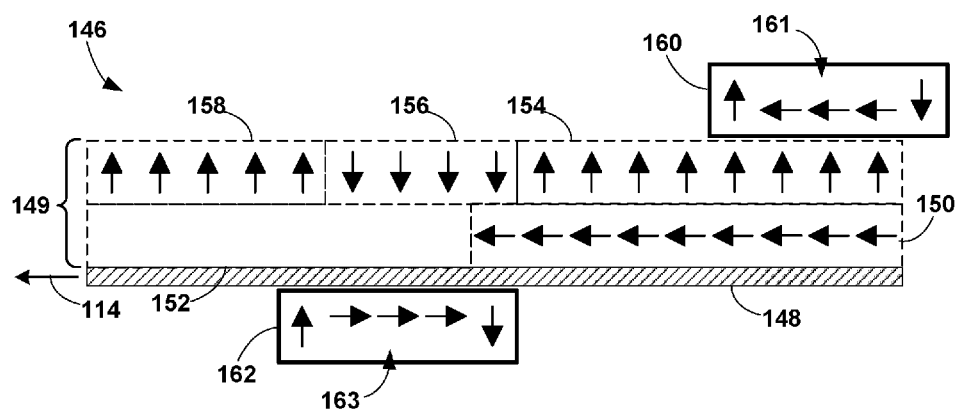
FIGS. 7A and 7B illustrate conceptual diagrams of an example bias and servo pattern in a perpendicular magnetic orientation and a graph of a corresponding read-out signal.
Figure 7B:
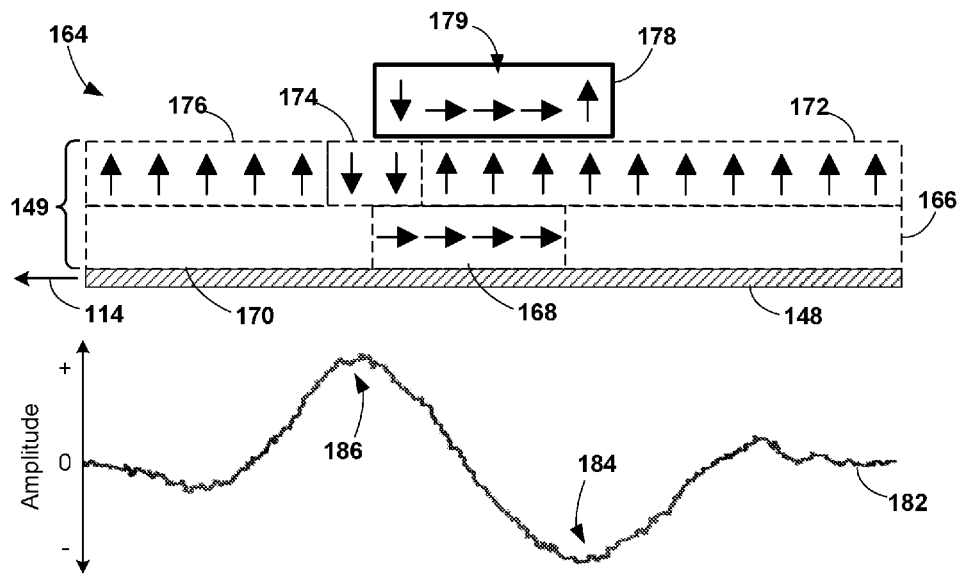

FIGS. 7A and 7B illustrate conceptual diagrams of an example bias and servo pattern in a perpendicular magnetic orientation and a graph of corresponding read-out signal 180. Magnetic tapes 146 and 164 are examples of magnetic tape 10, for example. FIGS. 7A and 7B are similar to FIGS. 6A and 6B, except a perpendicular bias is created instead of a longitudinal bias. As shown in FIG. 7A, sequential magnetic heads 160 and 162 with magnetic fields 161 and 163 in opposing directions are located on opposing sides of magnetic tape 146 to create a substantially perpendicular bias in magnetic tape 146. Magnetic tape 146 includes substrate 148 and magnetic layer 149 with a bias created in magnetic layer 149. As magnetic tape 146 is moved in the direction of arrow 114 to pass near magnetic heads 160 and 162, a bias with a perpendicular magnetic orientation is created in magnetic layer 149.

Similar to FIGS. 6A and 6B, all arrows indicating magnetic orientation in FIG. 7A are limited to perpendicular components and longitudinal components. In other words, the arrows in perpendicular component portion 154 only indicate that the perpendicular component of the magnetic orientation in magnetic layer 149 are directed away from substrate 148, e.g., 0 degrees. Accordingly, the arrows in longitudinal component portion 150 indicate that the longitudinal component of the magnetic orientation in magnetic layer 149 are directed in the same direction as arrow 114, e.g., 90 degrees. Therefore, the overall magnetic orientation within magnetic layer 149 between heads 160 and 162 would be within octants I or II, for example. If the magnitude of the perpendicular components are greater than the magnitude of the longitudinal components, then the overall magnetic orientation may be within directional octant I. Conversely, if the magnitude of the longitudinal components are greater than the magnitude of the perpendicular components, then the overall magnetic orientation may be within directional octant II. Separating perpendicular and longitudinal components of the magnetic orientation is used herein to more clearly describe magnetic orientations, or remanence magnetization of the magnetic tape.

First, magnetic tape 146 passes by head 160 that is generating magnetic field 161. The arrows of magnetic field 161, also shown using perpendicular and longitudinal components, indicate the general direction of magnetic field 161. The first portion of magnetic field 161 that is applied to magnetic tape 146 is directed toward substrate 148. The middle portion of magnetic field 161 is directed along magnetic tape 146 in the direction of arrow 114. The last portion of magnetic field 160 applied to magnetic tape 146 is directed away from substrate 148. Since this last portion of magnetic field 161 has the last effect on magnetic layer 149, perpendicular component portion 154 indicates that the perpendicular component of the created magnetic orientation is directed away from substrate 148. In addition, magnetic layer 149 includes a longitudinal component created by the middle portion of magnetic field 161, illustrated as longitudinal component portion 150, and remains in the magnetic orientation after magnetic tape 146 passes by head 160.

Second, magnetic tape 146 subsequently passes by head 162 that is generating magnetic field 163. The arrows of magnetic field 163, shown using perpendicular and longitudinal components, indicate the general direction of magnetic field 163. Magnetic field 163 is applied to the opposite side of magnetic tape 146 from magnetic field 161, and magnetic field 163 is generally directed along magnetic tape 146 in the opposite direction of magnetic field 161 and opposite of arrow 114. The first portion of magnetic field 163 that is applied to magnetic tape 146 is directed away substrate 148 and creates a perpendicular component towards substrate 148 as indicated by perpendicular portion 156. The middle portion of magnetic field 163 is directed along magnetic tape 146 in the opposite direction of arrow 114. This opposing magnetic field can be adjusted to reduce any longitudinal components to zero, as indicated by no arrows in longitudinal component portion 152. The last portion of magnetic field 163 applied to magnetic tape 146 is directed toward substrate 148. Since this last portion of magnetic field 163 also has the last effect on magnetic layer 149, perpendicular component portion 158 includes arrows pointing away from substrate 148 to indicate that the perpendicular component is directed away from substrate 148. The last portion of magnetic field 163 flipped the perpendicular component created in magnetic layer 149 from the first portion, or leading edge, of magnetic field 163. In other words, the overall magnetic orientation, or remanence magnetization, of magnetic layer 149 after passing through magnetic field 163 is substantially perpendicular in the direction of tape 146 movement, e.g. approximately 0 degrees.

Therefore, the bias (e.g., magnetic orientation or remanence magnetization) of magnetic tape 146 after passing by heads 160 and 162 is substantially perpendicular or oriented in one of octants I or VIII. In some examples, the substantially perpendicular orientation indicates that the longitudinal component of each of the plurality of magnetic particles is substantially smaller than the perpendicular component of each of the plurality of magnetic particles. In other examples, the substantially perpendicular orientation indicates that the longitudinal component of each of the plurality of magnetic particles is substantially zero.

As shown in the example of magnetic tape 164, magnetic orientation 174 of at least a portion of the magnetic particles within the servo pattern is oriented substantially toward the substrate and magnetic orientation 176 of magnetic particles within the non-patterned area of the magnetic bias is oriented substantially away from substrate 148. Alternatively, the magnetic orientation of at least a portion of magnetic particles within the servo pattern may be oriented substantially away from substrate 148 and the magnetic orientation of magnetic particles within the non-patterned area of the magnetic bias may be oriented substantially toward substrate 148. In either example, the magnetic orientations of most of the magnetic particles within magnetic tape 164 may be substantially perpendicular to substrate 148.

As shown in FIG. 7A, the direction of the remanence magnetization, e.g., the bias or direction of magnetic orientation 158, is substantially perpendicular to substrate 148. To be substantially perpendicular with substrate 148, magnetic orientation 158 may form an angle of at least 45 degrees with substrate 148. In other examples, magnetic orientation 158 may form an angle of at least 60 degrees with the substrate. However, any angle formed greater than or equal to 45 degrees may be considered substantially perpendicular.

Alternately, the remanence magnetization of magnetic orientation 158 may have a perpendicular component perpendicular to substrate 148 and a longitudinal component parallel with the substrate. The longitudinal component may be less than 50 percent in magnitude than the perpendicular component, or in other examples, the longitudinal component is less than 25 percent, or even less than 10 percent, in magnitude than the perpendicular component.

In some examples, the positions of magnetic heads 160 and 162 may be switched such that magnetic tape 146 passes near magnetic head 162 before magnetic head 160. In other examples, a perpendicular bias in the opposing direction (e.g., towards substrate 148) may be created by switching the direction of both magnetic fields 161 and 163 or flipping magnetic tape 146 such that substrate 148 passes closer to head 160 instead of head 162.

As shown in FIG. 7B, servo head 178 applies magnetic field 179 to magnetic tape 146 to produce magnetic tape 164 with one or more servo marks. Although servo head 178, a magnetic head, is positioned on the magnetic layer side of magnetic tape 164, servo head 178 may be positioned on the side of substrate 148 in other examples. Prior to magnetic tape 164 being passed near servo head 178, magnetic tape 164 includes a magnetic orientation with substantially no longitudinal component as shown by longitudinal component portion 166 and only a perpendicular component as shown by perpendicular component portion 172. When servo head 178 applies magnetic field 179 to magnetic layer 149, magnetic field 179 changes the magnetic orientation of some magnetic particles with the previously created bias from FIG. 7A.

As magnetic field 179 is applied to magnetic layer 149 of moving magnetic tape 164, the magnetic orientation changes in certain areas of magnetic tape 164. This occurs because the pattern of magnetic field 179 may include different orientations at different locations of magnetic head 178. The leading edge of magnetic field 179, i.e., the portion of magnetic field 179 directed away from substrate 148, causes the magnetic particles to be directed away from substrate 102 and creates perpendicular component portion 126. However, the trailing edge of magnetic field 174, i.e., the portion of magnetic field 179 directed toward substrate 148 causes the magnetic particles to be directed toward substrate 148 and creates perpendicular component portion 174 opposite that of perpendicular component portions 172 and 176. The middle of magnetic field 179 has a substantially longitudinal direction that creates a longitudinal component opposite of arrow 114 as indicated by longitudinal component portion 168.

The trailing edge of magnetic field 179 with a substantially perpendicular direction toward substrate 148 changes the direction of the perpendicular component as indicated by perpendicular component portion 174. In other words, the overall remanence magnetization of the written servo mark includes an orientation at approximately 180 degrees while the overall magnetic orientation of the remaining bias in unwritten areas is approximately 0 degrees. For example, perpendicular component portion 172 remains unchanged at approximately 0 degrees and longitudinal component portion 170 remains unchanged at approximately zero magnitude because magnetic field 179 was not applied to this area of magnetic tape 164. Therefore, the servo mark, and the servo pattern that includes the servo mark, has a magnetic orientation substantially opposite the magnetic orientation of the bias on magnetic tape 164. The remaining bias may also be referred to as the non-patterned area of the servo track. In other examples, magnetic field 179 may be applied to magnetic tape 164 for a longer period of time, e.g., longer pulse, so perpendicular component portion 174 and longitudinal component portion 168 may cover a greater length of magnetic tape 164.

FIG. 7B also illustrates and example read-out signal 180 of the magnetic orientation of magnetic tape 164 detected by a read head. Amplitude 182 of read-out signal 180 varies as the magnetic orientation of particles within magnetic layer 149 change over the length of magnetic tape 164. Pulses 184 and 186 indicate changes in magnetic orientation between the servo mark and the bias of magnetic tape 164. Generally, a greater amplitude between pulses 184 and 186 is desirable to generate a higher signal-to-noise ratio than would otherwise be achieved if there were smaller differences between the pulses.

Figure 8:
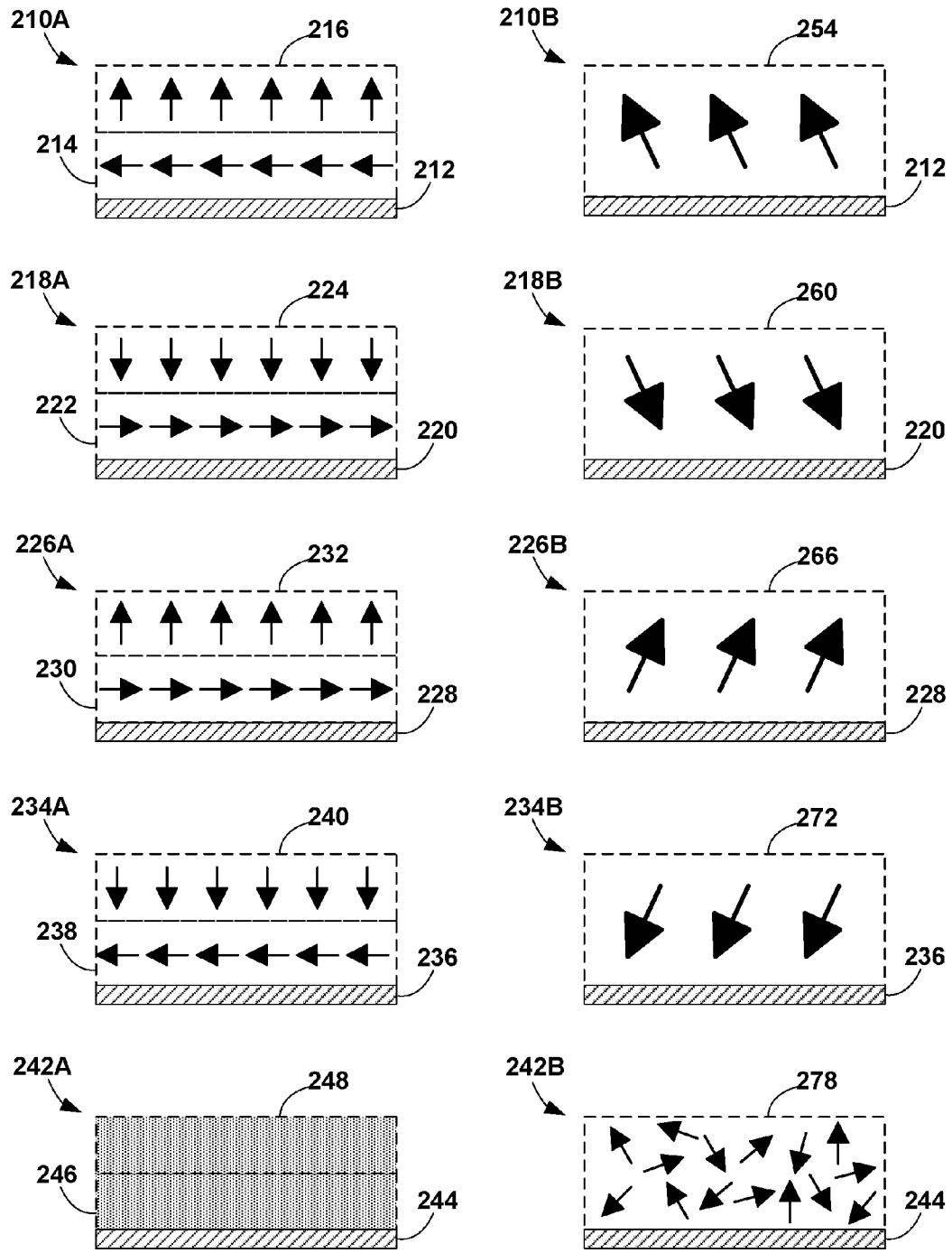
FIG. 8 is an illustration of various directions of remanence magnetization of a bias in a magnetic storage tape.

FIG. 8 is an illustration of various magnetic orientations of a bias that can be created in a portion of magnetic tapes. As shown in FIG. 8, magnetic tapes 210A, 218A, 226A, and 234A illustrate the non-zero perpendicular and longitudinal component values of magnetic biases with remanence magnetization created in one of directional octants I, IV, V, and VIII as described in FIG. 2A. Although the remanence magnetizations of octants I, IV, V, and VIII may have perpendicular components substantially greater than the corresponding longitudinal components, remanence magnetizations in octants II, III, VI, and VII may be created when a greater longitudinal component is desired. Magnetic tapes 210B, 218B, 226B, and 234B illustrate the overall magnetic orientation, or remanence magnetization, of a plurality of magnetic particles within the magnetic layer of the magnetic tape. Magnetic tapes 242A and 242B illustrate a random magnetic orientation, or minimal remanence magnetization, of the magnetic particles using alternating current. All of magnetic tapes 210A, 210B, 218A, 218B, 226A, 226B, 234A, 234B, 242A, and 242B are similar to magnetic tape 10 and described as being driven to the left, or in the 90 degree direction, as described in FIG. 2A. Any of these biases may be created over a substantial portion of the magnetic tape, e.g. over one or more servo tracks, prior to writing one or more servo patterns over the bias.

Magnetic tape 210A includes substrate 212 formed over a magnetic layer having a remanence magnetization in directional octant I. The magnetic orientation of magnetic particles within the magnetic layer is illustrated by longitudinal component portion 214 and perpendicular component portion 216. Longitudinal component portion 214 provides arrows that indicate the longitudinal component is in the 90 degree direction. Perpendicular component portion 216 provides arrows that indicate the perpendicular component is directed away from substrate 212 or in the 0 degree direction. Accordingly, magnetic tape 210B provides magnetic orientation 254 that includes arrows indicating magnetic orientation 254 is in directional octant I.

Magnetic tape 218A includes substrate 220 formed over a magnetic layer having a remanence magnetization in directional octant V. The magnetic orientation of magnetic particles within the magnetic layer is illustrated by longitudinal component portion 222 and perpendicular component portion 224. Longitudinal component portion 222 provides arrows that indicate the longitudinal component is in the 270 degree direction. Perpendicular component portion 224 provides arrows that indicate the perpendicular component is directed towards substrate 220 or in the 180 degree direction. Accordingly, magnetic tape 218B provides magnetic orientation 260 that includes arrows indicating magnetic orientation 260 is in directional octant V.

Magnetic tape 226A includes substrate 228 formed over a magnetic layer having a remanence magnetization in directional octant VIII. The magnetic orientation of magnetic particles within the magnetic layer is illustrated by longitudinal component portion 230 and perpendicular component portion 232. Longitudinal component portion 230 provides arrows that indicate the longitudinal component is in the 270 degree direction. Perpendicular component portion 232 provides arrows that indicate the perpendicular component is directed away from substrate 228 or in the 0 degree direction. Accordingly, magnetic tape 226B provides magnetic orientation 266 that includes arrows indicating magnetic orientation 266 is in directional octant VIII.

Magnetic tape 224A includes substrate 236 formed over a magnetic layer having a remanence magnetization in directional octant IV. The magnetic orientation of magnetic particles within the magnetic layer is illustrated by longitudinal component portion 238 and perpendicular component portion 240. Longitudinal component portion 238 provides arrows that indicate the longitudinal component is in the 90 degree direction. Perpendicular component portion 240 provides arrows that indicate the perpendicular component is directed toward substrate 236 or in the 180 degree direction. Accordingly, magnetic tape 234B provides magnetic orientation 272 that includes arrows indicating magnetic orientation 272 is in directional octant IV.

Magnetic tapes 242A and 242B illustrate a random magnetic orientation of the magnetic particles, or substantially zero remanence magnetization, using alternating current. Magnetic tape 242A includes substrate 244 formed over a magnetic layer having a magnetic orientation randomized in two or more of the directional octants. Since there is no overall remanence magnetization of the magnetic layer, longitudinal component portion 246 and perpendicular component portion 248 are illustrated as a shaded area. Accordingly, magnetic tape 242B provides magnetic orientation 278 that includes arrows indicating the random orientation of magnetic particles within the magnetic layer. Although each arrow may not be representative of each separate magnetic particle, each arrow illustrates the magnetic orientation of at least one magnetic particle in that area of magnetic tape 242B.

Different from the other magnetic tapes of FIG. 8, magnetic orientations of one or more particles may have a non-zero longitudinal or perpendicular component value. The randomized magnetic orientation bias of magnetic tapes 242A and 242B may be used in some examples to write servo patterns in any desired directional octant.

As shown in FIG. 8, magnetic tapes 210B, 218B, 226B, and 234B have a remanence magnetization with a direction that is substantially perpendicular to the substrate. In other words, the remanence magnetization is directed in one of directional octants I, IV, V, or VIII. In this manner, the perpendicular component of remanence magnetization in one of directional octants I, IV, V, or VIII may be greater than the corresponding longitudinal component. In some examples, the perpendicular component may be 75 percent, or even 90 percent, greater than the longitudinal component. Typically, a magnetic bias may be in a generally opposing octant from the octant of the remanence magnetization of a servo mark. In this manner, for example, a magnetic tape may include a magnetic bias in directional octant I and a servo mark with remanence magnetization in either directional octants IV or V.

In other examples, a magnetic tape may utilize substantially longitudinal remanence magnetization with directions in one of directional octants II, III, VI, or VII. In these directional octants, the longitudinal component may be 75 percent, or even 90 percent, greater than the perpendicular component. In this manner, the remanence magnetization of the bias and servo marks may be substantially longitudinal. In one example, a magnetic tape may have a bias with an orientation in directional octant II and a servo mark with a remanence magnetization in opposite directional octant VI. Although these substantially longitudinal magnetizations are contemplated, only remanence magnetizations with substantially perpendicular directions are provided as examples in FIGS. 9A-13B.

Figure 9A:
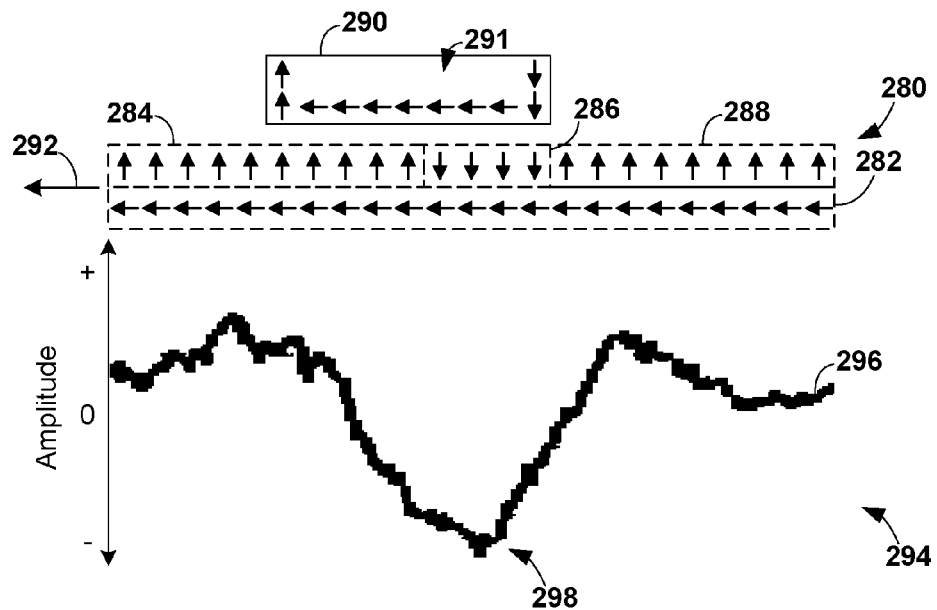
FIGS. 9A and 9B illustrate conceptual diagrams of an example magnetic medium that includes a magnetic bias in directional octant VIII with graphs of a corresponding read-out signal.
Figure 9B:
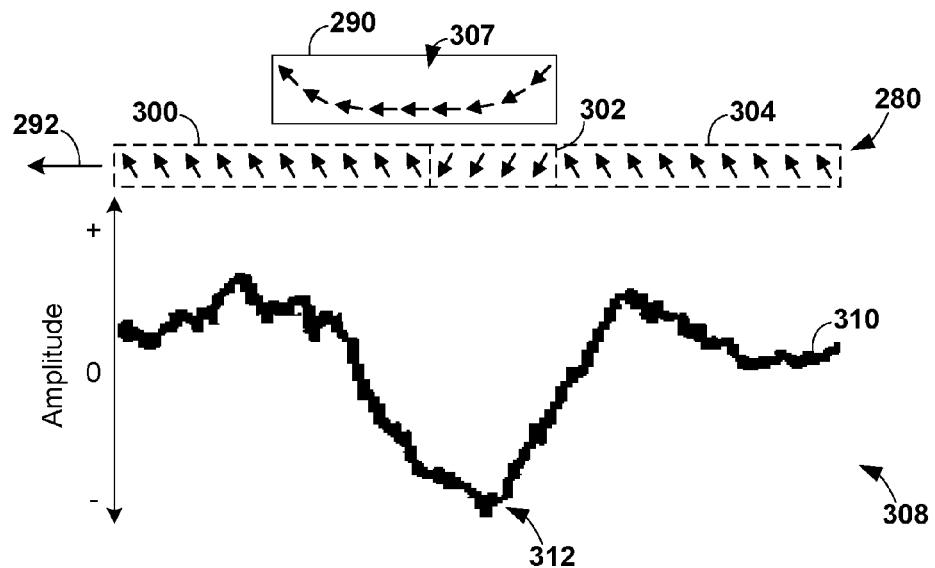

FIGS. 9A and 9B illustrate conceptual diagrams of an example magnetic medium that includes a magnetic bias with a remanence magnetization in directional octant I with graphs of a corresponding read-out signal. As shown in FIG. 9A, magnetic tape 280 is an example of magnetic tape 10. As shown in FIG. 9A, magnetic tape 280 includes one or more servo patterns written to the magnetic bias in directional octant I of magnetic tape 210A from FIG. 8. The one or more servo patterns are written with a remanence magnetization in directional octant IV.

Magnetic head 290, e.g., a servo write head, is used to create servo pattern, i.e., several servo marks, over a magnetic bias previously created in magnetic tape 280. As magnetic tape 280 is moved in the direction of arrow 292 to pass near magnetic head 290, a servo mark is created within the magnetic layer of magnetic tape 280.

All arrows indicating the magnetic orientation in FIG. 9A are limited to perpendicular components and longitudinal components. In other words, the arrows in perpendicular component portion 284 only indicate that the perpendicular component of the magnetic orientation in the magnetic layer is directed away from the substrate, e.g., at 90 degrees. Accordingly, the arrows in longitudinal component portion 282 indicate that the longitudinal component of the magnetic orientation in the magnetic layer is directed in the same direction as arrow 292, e.g., 0 degrees. The overall remanence magnetization in the magnetic layer would in directional octant I in the magnetic bias and directional octant IV in the servo pattern. Separating perpendicular and longitudinal components of the magnetic orientation is used herein to more clearly describe magnetic orientations of the magnetic tape and the magnetic field. However, FIG. 9B illustrates the direction of the overall magnetic direction without using longitudinal and perpendicular components.

To create a servo pattern in magnetic tape 280, magnetic tape 280 is driven past magnetic head 290 that is generating magnetic field 291. The arrows of magnetic field 291, shown using perpendicular and longitudinal components, indicate the general direction of magnetic field 291. Generally, magnetic field 291 is in the same direction as the magnetic field used to create the magnetic bias. The first portion of magnetic field 291 that is applied to magnetic tape 280 is directed toward magnetic tape 280. The middle portion of magnetic field 291 is directed along magnetic tape 280 in the direction of arrow 292. The last portion of magnetic field 291 applied to magnetic tape 280 is directed away from the substrate. Since this last portion of magnetic field 291 has the last effect on magnetic tape 280, perpendicular component portion 284 indicates that the perpendicular component of the magnetic bias is maintained in directional octant I.

As magnetic field 291 is applied to magnetic tape 280, the leading edge of magnetic field 291 switches the perpendicular component of the magnetic particles as shown in perpendicular component portion 286. In this manner, perpendicular component portion 286 defines the different magnetic orientation of the servo mark in directional octant IV. Perpendicular component portion 288 remains on magnetic tape as part of the magnetic bias previously created.

FIG. 9A also illustrates an example read-out signal 294 of the magnetic orientation of magnetic tape 280 detected by a read head. Amplitude 296 of read-out signal 294 varies as the magnetic orientation of particles within the magnetic layer change between the magnetic bias and the servo pattern over the length of magnetic tape 280. Pulse 298, e.g., a unipolar pulse, indicates the change in magnetic orientation between directional octant I of the magnetic bias and directional octant IV of the servo mark.

As shown in FIG. 9B, the overall remanence magnetization of magnetic tape 280 is illustrated instead of using longitudinal and perpendicular components provided in FIG. 9A. In other words, the overall remanence magnetization may be similar to field lines or pattern of a magnetic field. Magnetic tape 280 is shown with the magnetic orientation illustrated in magnetic tape 210B of FIG. 8. Magnetic head 290 generates magnetic field 307 that is applied to magnetic tape 280 as magnetic tape 280 is driven past magnetic head 290 in the direction of arrow 292. Magnetic head 290 may apply magnetic field 307 from the same side of magnetic tape 280 as the magnetic field used to create the magnetic bias. Generally, magnetic field 307 may be described as having an arched or horseshoe shape.

The leading edge of magnetic field 307 creates magnetic orientation 302 in directional octant IV, and the trailing edge of magnetic field 307 generally restores the magnetic orientation 300 of the bias in directional octant I. Magnetic orientation 304 remains in directional octant I since that portion of magnetic tape 280 has not been affected by magnetic field 307. Therefore, the servo mark includes a magnetic orientation in directional octant IV generally opposite of directional octant I of the magnetic bias. In addition, the servo mark illustrated in FIG. 9B may be described as having a first magnetic orientation in directional octant IV and a second magnetic orientation in directional octant I (e.g., the servo mark may include a magnetic orientation or remanence magnetization in substantially the same direction as that of the bias of the non-pattern area. As would be expected, read-out signal 308 is similar to read-out signal 294 of FIG. 9A. Read-out signal 294 includes amplitude 310 and pulse 312 (e.g., a unipolar pulse) corresponding to the changes in the directional octants between the magnetic bias and the servo mark.

According to FIGS. 9A and 9B, magnetic tape 280 includes a substrate and a magnetic layer with a perpendicular squareness greater than 50 percent and a longitudinal squareness less than 50 percent. A servo track of the magnetic layer also includes a servo pattern and a non-pattern area. The servo pattern includes a plurality of servo marks with a pattern remanence magnetization in directional octant IV that borders a perpendicular plane 23 orthogonal to the substrate. The non-pattern area, e.g., the magnetic bias, includes a non-pattern remanence magnetization in directional octant I that also borders perpendicular plane 23. Octants I and IV are on the same side of perpendicular plane 23, octants I and IV are on opposing sides of longitudinal plane 21. In other words, the perpendicular components of octants I and IV are in opposing directions and the longitudinal components of octants I and IV are in the same direction.

Remanence magnetization in octants I and IV may be configured to produce read-out signal 308 (e.g., a servo signal) with a read head to identify each of the servo marks. Signal 308 may include amplitude 310 (e.g., a waveform) with substantially unipolar pulse 312 when the remanence magnetization of magnetic tape 280 has a perpendicular component opposing the bias magnetization perpendicular component and the remanence magnetization has a longitudinal component consistent with, or in the same direction as, the bias magnetization longitudinal component.

Figure 10A:
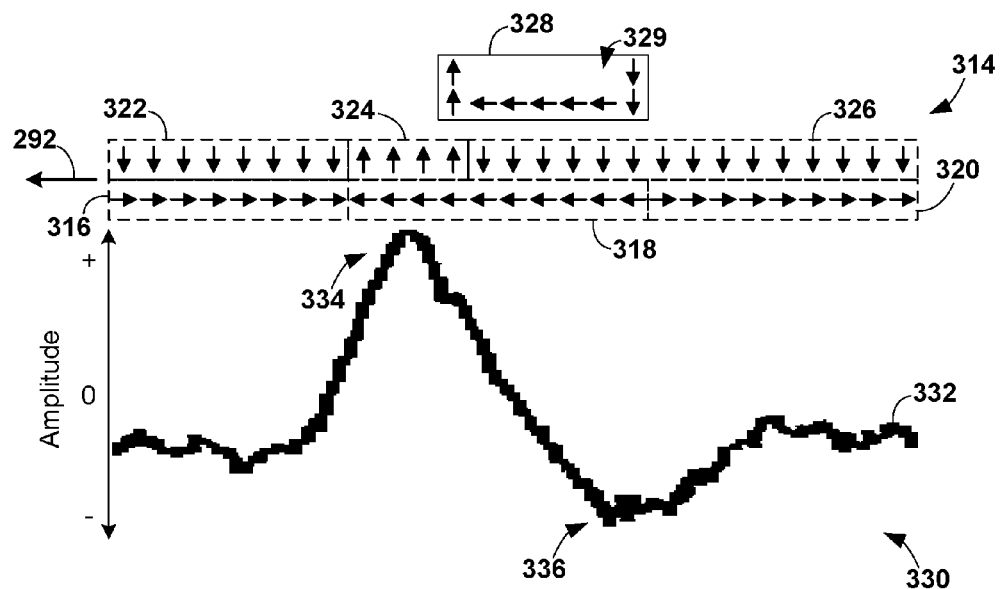
FIGS. 10A and 10B illustrate conceptual diagrams of an example magnetic medium that includes a magnetic bias in directional octant IV with graphs of a corresponding read-out signal.
Figure 10B:
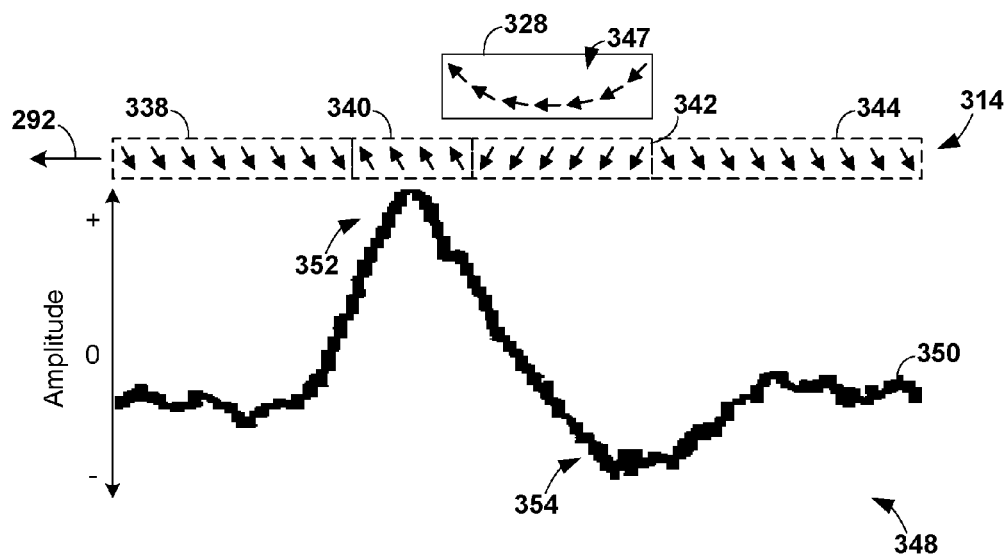

FIGS. 10A and 10B illustrate conceptual diagrams of an example magnetic medium that includes a magnetic bias in directional octant V with graphs of a corresponding read-out signal. As shown in FIG. 10A, magnetic tape 314 is an example of magnetic tape 10. As shown in FIG. 10A, magnetic tape 314 includes one or more servo patterns written to the magnetic bias in directional octant V of magnetic tape 218A from FIG. 8. The one or more servo patterns are written in directional octants I and IV, generally opposite of the directional octant V of the magnetic bias.

Magnetic head 328, e.g., a servo write head, is used to create a servo pattern, i.e., several servo marks, over a magnetic bias previously created in magnetic tape 314. As magnetic tape 314 is moved or driven in the direction of arrow 292 to pass near magnetic head 328, a servo mark is created within the magnetic layer of magnetic tape 314.

Similar to FIG. 9A, all arrows indicating the magnetic orientation in FIG. 10A are limited to perpendicular components and longitudinal components. The arrows in perpendicular component portion 322 only indicate that the perpendicular component of the magnetic orientation in the magnetic layer is directed towards the substrate, e.g., at 270 degrees. Accordingly, the arrows in longitudinal component portion 316 indicate that the longitudinal component of the magnetic orientation in the magnetic layer is directed in the opposite direction as arrow 292, e.g., 180 degrees. Therefore, the overall remanence magnetization in the magnetic layer would be in directional octant V in the magnetic bias and directional octant I in the servo pattern. Separating perpendicular and longitudinal components of the magnetic orientation is used herein to more clearly describe magnetic orientations of the magnetic tape and the magnetic field. However, FIG. 10B illustrates the direction of the overall magnetic direction without using longitudinal and perpendicular components.

To create a servo pattern in magnetic tape 314, magnetic tape 314 is driven past magnetic head 328 that is generating magnetic field 329. The arrows of magnetic field 329, shown using perpendicular and longitudinal components, indicate the general direction of magnetic field 329. Magnetic field 329 may be generated in the opposite direction as the magnetic field used to create the magnetic bias of tape 218A. The first portion of magnetic field 329 that is applied to magnetic tape 314 is directed toward magnetic tape 314. The middle portion of magnetic field 329 is directed along magnetic tape 280 in the direction of arrow 292. The last portion of magnetic field 329 applied to magnetic tape 314 is directed away from the substrate. Since this last portion of magnetic field 329 has the last effect on magnetic tape 314, perpendicular component portion 324 indicates that the perpendicular component of the magnetic orientation is changed such that the overall remanence magnetization is in directional octant I.

As magnetic field 329 is applied to magnetic tape 314, the leading edge of magnetic field 329 maintains perpendicular component portion 326. However, the middle portion of magnetic field 329 switches the longitudinal component in portion 318 from opposing arrow 292 in longitudinal component portion 320 to with arrow 292 in longitudinal component portion 318. In this manner, perpendicular component portion 324 and longitudinal component portion 318 define the different remanence magnetizations of the servo mark in both directional octants IV and I. Perpendicular component portion 322 and longitudinal component portion 316 remain on magnetic tape 314 as part of the magnetic bias previously created.

FIG. 10A also illustrates an example read-out signal 330 of the remanence magnetizations of magnetic tape 314 detected by a read head. Amplitude 322 of read-out signal 330 varies as the magnetic orientation of particles within the magnetic layer change between the magnetic bias and the servo pattern over the length of magnetic tape 314. Pulse 334 provides the greatest change in amplitude from the change in magnetic orientation between directional octant V of the magnetic bias and directional octant I of the servo mark that includes perpendicular component portion 324. Pulse 336 that indicates the change from longitudinal component portion 318 to longitudinal component portion 320, e.g., directional octants V and IV, provides a smaller amplitude change than that of pulse 334. Together, pulses 334 and 336 may be described as a bipolar pulse.

As shown in FIG. 10B, the overall remanence magnetization of magnetic tape 314 is illustrated instead of using longitudinal and perpendicular components provided in FIG. 10A. Magnetic tape 314 is shown with the magnetic orientation illustrated in magnetic tape 218B of FIG. 8. Magnetic head 328 generates magnetic field 347 that is applied to magnetic tape 314 as magnetic tape 314 is driven past magnetic head 328 in the direction of arrow 292. Magnetic head 328 may apply magnetic field 347 from the same side of magnetic tape 314 as the magnetic field used to create the magnetic bias. Generally, magnetic field 347 may be described as having an arched or horseshoe shape.

The leading edge of magnetic field 347 creates magnetic orientation 342 in directional octant IV, and the trailing edge of magnetic field 347 creates the magnetic orientation 340 in directional octant I. Therefore, the entire servo mark created by magnetic field has a remanence magnetization in different octants than that of the magnetic bias. Magnetic orientations 338 and 344 remain in directional octant V since that portion of magnetic tape 314 has not been affected by magnetic field 347. Therefore, the servo mark includes a magnetic orientation in directional octant I opposite the directional octant of the magnetic bias (i.e., directional octant V) and a magnetic orientation in directional octant IV. In addition, the servo mark illustrated in FIG. 10B may be described as having a first magnetic orientation in directional octant I and a second magnetic orientation in a third directional octant, e.g., directional octant IV, different than directional octant V of the bias or non-pattern area. The servo mark may thus include magnetic orientations, or remanence magnetization, in two or more directional octants. As would be expected, read-out signal 348 is similar to read-out signal 330 of FIG. 10A. Read-out signal 348 includes amplitude 350 and pulses 352 and 354 (together a bipolar pulse) corresponding to the changes in the directional octants between the magnetic bias and the servo mark.

According to FIGS. 10A and 10B, magnetic tape 314 includes a substrate and a magnetic layer with a perpendicular squareness greater than 50 percent and a longitudinal squareness less than 50 percent. A servo track of the magnetic layer also includes a servo pattern and a non-pattern area. The servo pattern includes a plurality of servo marks with a pattern remanence magnetization in directional octant I that borders a perpendicular plane 23 orthogonal to the substrate. The non-pattern area, e.g., the magnetic bias, includes a non-pattern remanence magnetization in directional octant V that also borders perpendicular plane 23. Octants I and V are on opposing sides of perpendicular plane 23, and octants I and V are on opposing sides of longitudinal plane 21. In other words, the perpendicular components of octants I and V are in opposing directions and the longitudinal components of octants I and V are in opposing directions.

Remanence magnetization in octants I and V may be configured to produce read-out signal 348 (e.g., a servo signal) with a read head to identify each of the servo marks. Signal 348 may include amplitude 350 (e.g., a waveform) with substantially opposing pulses 352 and 354 when the remanence magnetization of magnetic tape 314 has a perpendicular component opposing the bias magnetization perpendicular component and the remanence magnetization has a longitudinal component also opposing the bias magnetization longitudinal component. Stronger pulse 352 may correspond to a first portion of the remanence magnetization having a perpendicular component opposing the bias magnetization perpendicular component (e.g., perpendicular component portions 322 and 324) and the longitudinal component opposing the bias magnetization longitudinal component (e.g., longitudinal component portions 316 and 318). Weaker pulse 354 may correspond to a second portion of the remanence magnetization having a perpendicular component consistent with the bias magnetization perpendicular component (e.g., perpendicular component portion 326) and the longitudinal component opposing the bias magnetization longitudinal component (e.g., longitudinal component portions 318 and 320). Together, pulses 352 and 354 may be described as a bipolar pulse.

Figure 11A:
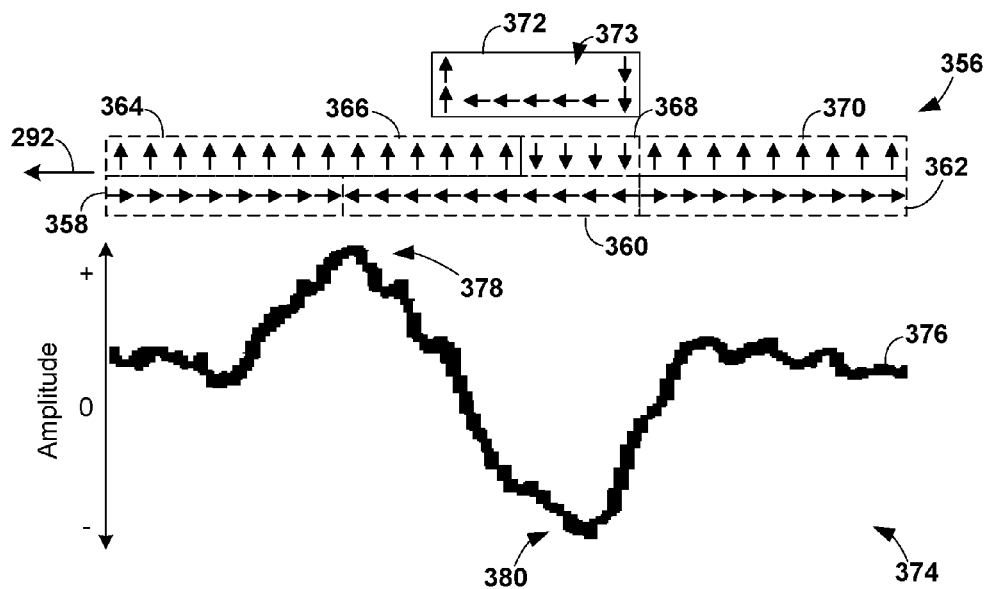
FIGS. 11A and 11B illustrate conceptual diagrams of an example magnetic medium that includes a magnetic bias in directional octant I with graphs of a corresponding read-out signal.
Figure 11B:
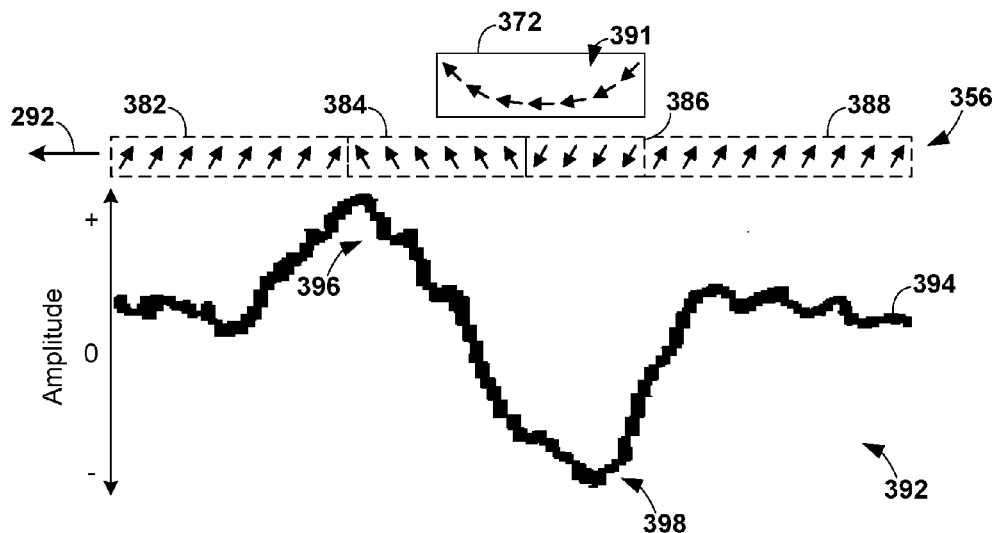

FIGS. 11A and 11B illustrate conceptual diagrams of an example magnetic medium that includes a magnetic bias in directional octant VIII with graphs of a corresponding read-out signal. As shown in FIG. 11A, magnetic tape 356 is an example of magnetic tape 10. As shown in FIG. 11A, magnetic tape 356 includes one or more servo patterns written to the magnetic bias in directional octant VIII of magnetic tape 226A from FIG. 8. The one or more servo patterns are written in directional octants I and IV, generally opposite to directional octant VIII of the magnetic bias.

Magnetic head 372, e.g., a servo write head, is used to create a servo pattern, i.e., several servo marks, over a magnetic bias previously created in magnetic tape 356. As magnetic tape 356 is moved or driven in the direction of arrow 292 to pass near magnetic head 372, a servo mark is created within the magnetic layer of magnetic tape 356.

Similar to FIG. 9A, in FIG. 11A all arrows indicating the remanence magnetization are limited to perpendicular components and longitudinal components. The arrows in perpendicular component portion 364 only indicate that the perpendicular component of the magnetic orientation in the magnetic layer is directed away from the substrate, e.g., at 90 degrees. Accordingly, the arrows in longitudinal component portion 358 indicate that the longitudinal component of the magnetic orientation in the magnetic layer is directed in the opposite direction as arrow 292, e.g., 180 degrees. Therefore, the overall magnetic orientation in the magnetic layer would be in directional octant VIII in the magnetic bias and directional octants I and IV in the servo pattern. Separating perpendicular and longitudinal components of the magnetic orientation is used herein to more clearly describe remanence magnetization of the magnetic tape and the magnetic field. However, FIG. 11B illustrates the direction of the overall magnetic direction without using longitudinal and perpendicular components.

To create a servo pattern in magnetic tape 356, magnetic tape 356 is driven past magnetic head 372, which generates magnetic field 373. The arrows of magnetic field 373, shown using perpendicular and longitudinal components, indicate the general direction of magnetic field 373. Magnetic field 373 may be generated in the opposite direction as the magnetic field used to create the magnetic bias of tape 226A. The first portion of magnetic field 373 that is applied to magnetic tape 356 is directed toward magnetic tape 356. The middle portion of magnetic field 373 is directed along magnetic tape 356 in the direction of arrow 292. The last portion of magnetic field 373 applied to magnetic tape 356 is directed away from the substrate. Since this last portion of magnetic field 373 has the last effect on magnetic tape 356, perpendicular component portion 366 indicates that the perpendicular component of the magnetic orientation is remained unchanged from the magnetic bias.

As magnetic field 373 is applied to magnetic tape 356, the leading edge of magnetic field 373 changes perpendicular component portion 368 from the perpendicular component portion 370 of the magnetic bias. However, the middle portion of magnetic field 373 also switches the longitudinal component in portion 360 from opposing arrow 292 in longitudinal component portion 362 to with arrow 292 in longitudinal component portion 360. In this manner, perpendicular component portion 368 and longitudinal component portion 360 define the different magnetic orientations of the servo mark in both directional octants IV and I. Perpendicular component portion 364 and longitudinal component portion 358 remain on magnetic tape 356 as part of the magnetic bias previously created.

FIG. 11A also illustrates an example read-out signal 374 of the magnetic orientation of magnetic tape 356 detected by a read head. Amplitude 376 of read-out signal 374 varies as the magnetic orientation of particles within the magnetic layer change between the magnetic bias and the servo pattern over the length of magnetic tape 356. Pulse 378 provides a change in amplitude from the change in magnetic orientation between directional octant VIII of the magnetic bias and generally opposite directional octant I of the servo mark that includes longitudinal component portion 360. Pulse 380 indicates an even larger change from longitudinal component portion 362 to longitudinal component portion 360 and perpendicular component portion 360 to perpendicular component portion 368, e.g., opposing directional octants VIII and IV. Together, pulses 378 and 380 may be described as a bipolar pulse.

As shown in FIG. 11B, the overall remanence magnetization of magnetic tape 356 is illustrated instead of using longitudinal and perpendicular components provided in FIG. 11A. Magnetic tape 356 is shown with the magnetic orientation illustrated in magnetic tape 226B of FIG. 8. Magnetic head 372 generates magnetic field 391 that is applied to magnetic tape 356 as magnetic tape 356 is driven past magnetic head 372 in the direction of arrow 292. Magnetic head 372 may apply magnetic field 391 from the same side of magnetic tape 356 as the magnetic field used to create the magnetic bias, but the direction of the magnetic field may have been switched. Generally, magnetic field 391 may be described as having an arched or horseshoe shape.

The leading edge of magnetic field 391 creates magnetic orientation 386 in directional octant IV, and the trailing edge of magnetic field 391 creates the magnetic orientation 384 in directional octant I. Therefore, the entire servo mark created by magnetic field has a remanence magnetization in different octants than that of the magnetic bias. Magnetic orientations 382 and 388 remain in directional octant VIII since that portion of magnetic tape 356 has not been affected by magnetic field 391. Therefore, the servo mark includes a remanence magnetization in directional octant I generally opposing the directional octant of the magnetic bias (i.e., directional octant VIII) and directional octant IV exactly opposite of the directional octant of the magnetic bias (i.e., directional octant VIII). In other words, the servo mark illustrated in FIG. 11B may be described as having a first magnetic orientation in directional octant IV and a second magnetic orientation in a third directional octant, e.g., directional octant I, different than directional octant VIII of the bias or non-pattern area. The servo mark may thus include magnetic orientations, or remanence magnetization, in two or more directional octants. As expected, read-out signal 392 is similar to read-out signal 374 of FIG. 11A. Read-out signal 392 includes amplitude 394 and pulses 396 and 398 (together a bipolar pulse) corresponding to the changes in the directional octants between the magnetic bias and the servo mark.

According to FIGS. 11A and 11B, magnetic tape 356 includes a substrate and a magnetic layer with a perpendicular squareness greater than 50 percent and a longitudinal squareness less than 50 percent. A servo track of the magnetic layer also includes a servo pattern and a non-pattern area. The servo pattern includes a plurality of servo marks with a pattern remanence magnetization in directional octant IV that borders a perpendicular plane 23 orthogonal to the substrate. The non-pattern area, e.g., the magnetic bias, includes a non-pattern remanence magnetization in directional octant VIII that also borders perpendicular plane 23. Octants IV and VIII are on opposing sides of perpendicular plane 23, and octants IV and VIII are on opposing sides of longitudinal plane 21. In other words, the perpendicular components of octants IV and VIII are in opposing directions and the longitudinal components of octants IV and VIII are in opposing directions.

Remanence magnetization in octants IV and VIII may be configured to produce read-out signal 392 (e.g., a servo signal) with a read head to identify each of the servo marks. Signal 392 may include amplitude 394 (e.g., a waveform) with substantially opposing pulses 396 and 398 when the remanence magnetization of magnetic tape 356 has a perpendicular component opposing the bias magnetization perpendicular component and the remanence magnetization has a longitudinal component also opposing the bias magnetization longitudinal component. Stronger pulse 398 may correspond to a first portion of the remanence magnetization having a perpendicular component opposing the bias magnetization perpendicular component (e.g., perpendicular component portions 368 and 370) and the longitudinal component opposing the bias magnetization longitudinal component (e.g., longitudinal component portions 360 and 362). Weaker pulse 396 may correspond to a second portion of the remanence magnetization having a perpendicular component consistent with the bias magnetization perpendicular component (e.g., perpendicular component portions 364 and 366) and the longitudinal component opposing the bias magnetization longitudinal component (e.g., longitudinal component portions 358 and 360). Together, pulses 396 and 398 may be described as a bipolar pulse.

Figure 12A:
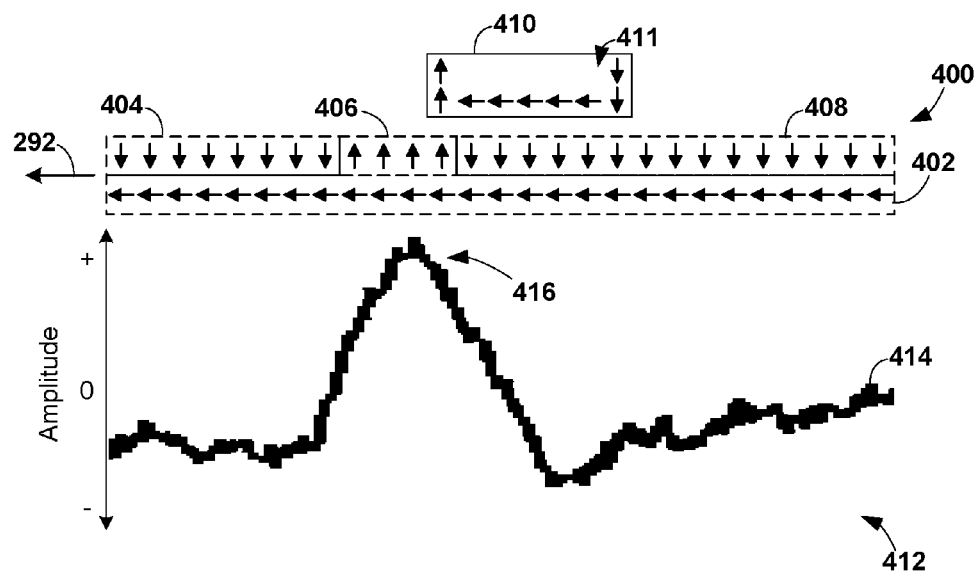
FIGS. 12A and 12B illustrate conceptual diagrams of an example magnetic medium that includes a magnetic bias in directional octant V with graphs of a corresponding read-out signal.
Figure 12B:
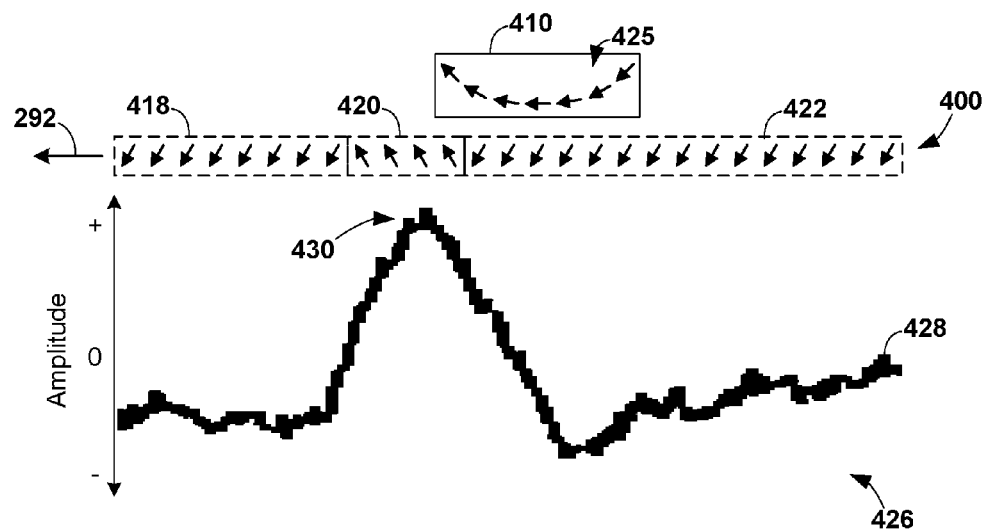

FIGS. 12A and 12B illustrate conceptual diagrams of an example magnetic medium that includes a magnetic bias in directional octant IV with graphs of a corresponding read-out signal. As shown in FIG. 12A, magnetic tape 400 is an example of magnetic tape 10. As shown in FIG. 12A, magnetic tape 400 includes one or more servo patterns written to the magnetic bias in directional octant IV of magnetic tape 234A from FIG. 8. The one or more servo patterns are written in directional octant I, generally opposite of directional octant IV of the magnetic bias.

Magnetic head 410, e.g., a servo write head, is used to create a servo pattern, i.e., several servo marks, over a magnetic bias previously created in magnetic tape 400. As magnetic tape 400 is moved or driven in the direction of arrow 292 to pass near magnetic head 410, a servo mark is created within the magnetic layer of magnetic tape 400.

Similar to FIG. 9A, in FIG. 12A all of the arrows indicating the magnetic orientation of the magnetic particles are limited to perpendicular components and longitudinal components. The arrows in perpendicular component portion 404 only indicate that the perpendicular component of the remanence magnetization in the magnetic layer is directed toward the substrate, e.g., at 270 degrees. Accordingly, the arrows in longitudinal component portion 402 indicate that the longitudinal component of the remanence magnetization in the magnetic layer is directed in the same direction as arrow 292, e.g., 0 degrees. Therefore, the overall magnetic orientation in the magnetic layer would be in directional octant IV in the magnetic bias and directional octant I in the servo pattern. Separating perpendicular and longitudinal components of the magnetic orientation is used herein to more clearly describe magnetic orientations of the magnetic tape and the magnetic field. However, FIG. 12B illustrates the direction of the overall remanence magnetization without using longitudinal and perpendicular components.

To create a servo pattern in magnetic tape 400, magnetic tape 400 is driven past magnetic head 410 that is generating magnetic field 411. The arrows of magnetic field 411, shown using perpendicular and longitudinal components, indicate the general direction of magnetic field 411. Magnetic field 411 may be generated in the same direction as the magnetic field used to create the magnetic bias of tape 234A. The first portion of magnetic field 411 that is applied to magnetic tape 400 is directed toward magnetic tape 400. The middle portion of magnetic field 411 is directed along magnetic tape 400 in the direction of arrow 292. The last portion of magnetic field 411 applied to magnetic tape 400 is directed away from the substrate. Since this last portion of magnetic field 411 has the last effect on magnetic tape 356, perpendicular component portion 406 indicates that the perpendicular component of the magnetic orientation is changed from the magnetic bias illustrated in perpendicular component portions 408 and 404.

As magnetic field 411 is applied to magnetic tape 400, the leading edge of magnetic field 411 changes perpendicular component portion 406 from the perpendicular component portion 408 of the magnetic bias. The middle portion of magnetic field 411 remains aligned with the longitudinal direction as shown by longitudinal component portion 402 in the same direction as arrow 292. In this manner, perpendicular component portion 406 defines the different magnetic orientations of the servo mark in directional octant I, adjacent to directional octant IV of the magnetic bias.

FIG. 12A also illustrates an example read-out signal 412 of the magnetic orientation of magnetic tape 400 detected by a read head. Amplitude 414 of read-out signal 412 varies as the magnetic orientation of particles within the magnetic layer change between the magnetic bias and the servo pattern over the length of magnetic tape 400. Pulse 416 (e.g., a unipolar pulse) provides a change in amplitude from the change in remanence magnetization between directional octant IV of the magnetic bias and generally opposing directional octant I of the servo mark that includes perpendicular component portion 406.

As shown in FIG. 12B, the overall remanence magnetization of magnetic tape 400 is illustrated instead of using longitudinal and perpendicular components provided in FIG. 12A. Magnetic tape 400 is shown with the magnetic orientation illustrated in magnetic tape 234B of FIG. 8. Magnetic head 410 generates magnetic field 425 that is applied to magnetic tape 400 as magnetic tape 400 is driven past magnetic head 410 in the direction of arrow 292. Magnetic head 410 may apply magnetic field 425 from a different side of magnetic tape 356 as the magnetic field used to create the magnetic bias. Generally, magnetic field 425 may be described as having an arched or horseshoe shape.

The leading edge of magnetic field 425 retains magnetic orientation 422 in directional octant IV, and the trailing edge of magnetic field 425 creates the magnetic orientation 420 in directional octant I. Therefore, only a portion of the servo mark created by magnetic field 425 has a remanence magnetization in a different directional octant than that of the magnetic bias. Magnetic orientations 418 and 422 remain in directional octant IV since that portion of magnetic tape 400 has not been changed by magnetic field 425. Therefore, the servo mark includes a remanence magnetization in directional octant I generally opposite of the directional octant IV of the magnetic bias. In addition, the servo mark illustrated in FIG. 12B may be described as having a first magnetic orientation in directional octant I and a second magnetic orientation in directional octant IV (e.g., the servo mark may include a magnetic orientation or remanence magnetization in substantially the same direction as that of the bias of the non-pattern area. As expected, read-out signal 426 is similar to read-out signal 412 of FIG. 12A. Read-out signal 426 includes amplitude 428 and pulse 430 (e.g., a unipolar pulse) corresponding to the changes in generally opposing directional octants between the magnetic bias and the servo mark.

According to FIGS. 12A and 12B, magnetic tape 400 includes a substrate and a magnetic layer with a perpendicular squareness greater than 50 percent and a longitudinal squareness less than 50 percent. A servo track of the magnetic layer also includes a servo pattern and a non-pattern area. The servo pattern includes a plurality of servo marks with a pattern remanence magnetization in directional octant I that borders a perpendicular plane 23 orthogonal to the substrate. The non-pattern area, e.g., the magnetic bias, includes a non-pattern remanence magnetization in directional octant IV that also borders perpendicular plane 23. Octants I and IV are on the same side of perpendicular plane 23, but octants I and IV are on opposing sides of longitudinal plane 21. In other words, the perpendicular components of octants I and IV are in opposing directions and the longitudinal components of octants I and IV are in the same direction.

Remanence magnetization in octants I and IV may be configured to produce read-out signal 426 (e.g., a servo signal) with a read head to identify each of the servo marks. Signal 426 may include amplitude 428 (e.g., a waveform) with substantially unipolar pulse 430 when the remanence magnetization of magnetic tape 400 has a perpendicular component opposing the bias magnetization perpendicular component and the remanence magnetization has a longitudinal component consistent with, or in the same direction as, the bias magnetization longitudinal component.

Figure 13A:
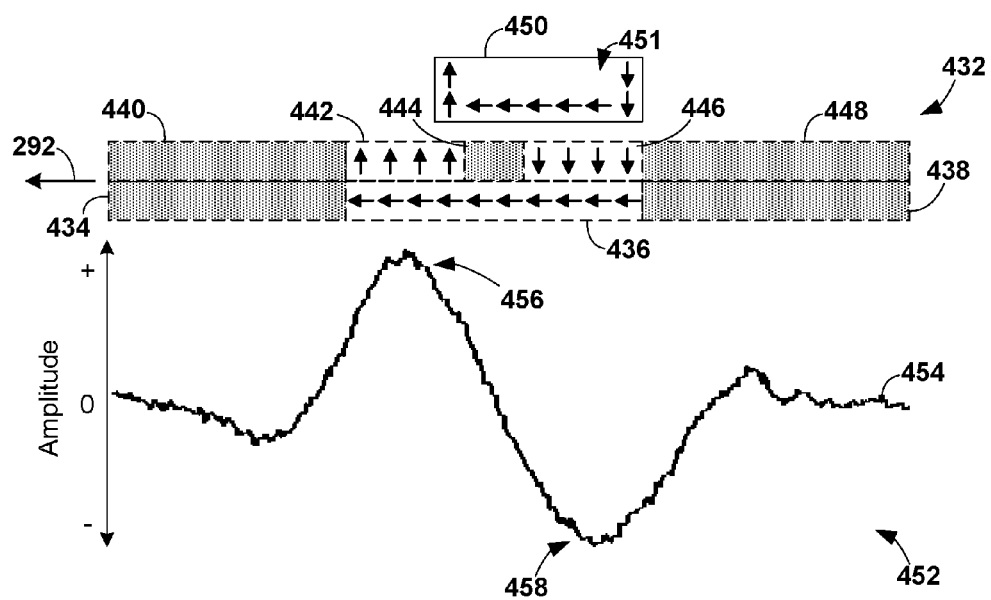
FIGS. 13A and 13B illustrate conceptual diagrams of an example magnetic medium that includes substantially no magnetic bias from randomized magnetic particles with graphs of a corresponding read-out signal.
Figure 13B:
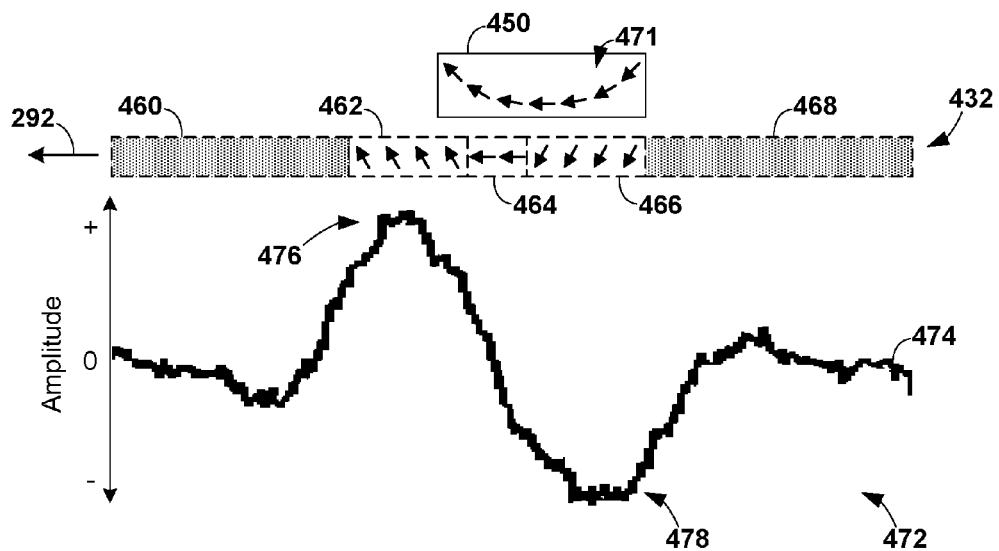

FIGS. 13A and 13B illustrate conceptual diagrams of an example magnetic medium that includes a magnetic bias in random directional octants with graphs of a corresponding read-out signal. As shown in FIG. 13A, magnetic tape 432 is an example of magnetic tape 10. As shown in FIG. 13A, magnetic tape 432 includes one or more servo patterns written to the random magnetic bias of magnetic tape 242A from FIG. 8. The one or more servo patterns are written in directional octants I and IV within the randomized bias, or unwritten areas. The randomized magnetic bias may result in a substantially zero overall remanence magnetization.

Magnetic head 450, e.g., a servo write head, is used to create a servo pattern, i.e., several servo marks, over the random magnetic bias previously created in magnetic tape 432. The random magnetic bias may be created with alternating current or other techniques to eliminate any discernable signal from the magnetic layer of magnetic tape 432. As magnetic tape 432 is moved or driven in the direction of arrow 292 to pass near magnetic head 450, a servo mark is created within the magnetic layer of magnetic tape 432.

Similar to FIG. 9A, all arrows indicating the magnetic orientation in FIG. 13A are limited to perpendicular components and longitudinal components. The arrows in perpendicular component portion 442 only indicate that the perpendicular component of the magnetic orientation in the magnetic layer is directed away from the substrate, e.g., at 90 degrees. Accordingly, the arrows in longitudinal component portion 436 indicate that the longitudinal component of the magnetic orientation in the magnetic layer is directed in the same direction as arrow 292, e.g., 0 degrees. Perpendicular component portions 440, 444, and 448 and longitudinal component portions 434 and 438 do not include arrows because these shaded portions of magnetic tape 432 indicate that the magnetic orientations of magnetic particles have been randomized. Therefore, there is no overall remanence magnetization in the magnetic bias, but the servo pattern may contain a magnetic orientation in directional octants I and IV. FIG. 13B illustrates the direction of the overall magnetic direction without using longitudinal and perpendicular components.

To create a servo pattern in magnetic tape 432, magnetic tape 432 is driven past magnetic head 450 that is generating magnetic field 451. The arrows of magnetic field 451, shown using perpendicular and longitudinal components, indicate the general direction of magnetic field 451. Magnetic field 451 will be generated in a single direction, contrary to the alternating magnetic fields used to create the random bias of tape 242A. The first portion of magnetic field 451 that is applied to magnetic tape 432 is directed toward magnetic tape 432. The middle portion of magnetic field 451 is directed along magnetic tape 432 in the direction of arrow 292. The last portion of magnetic field 451 applied to magnetic tape 432 is directed away from the substrate. Since this last portion of magnetic field 451 has the last effect on magnetic tape 432, perpendicular component portion 442 indicates that the perpendicular component of the magnetic orientation is changed from the random magnetic bias illustrated in perpendicular component portions 444 and 448.

As magnetic field 451 is applied to magnetic tape 432, the leading edge of magnetic field 451 changes perpendicular component portion 446 from the perpendicular component portion 448 of the random magnetic bias. The middle portion of magnetic field 451 also changes longitudinal component portion 436 from the random bias of longitudinal component portion 438 to the same direction as arrow 292. In this manner, perpendicular component portions 446 and 442 and longitudinal component portion 436 define the different remanence magnetization of the servo mark in directional octants I and IV. It is also noted that a substantially longitudinal direction will be created in the servo mark unless magnetic field 451 is applied for a longer period of time than shown in FIG. 13A.

FIG. 13A also illustrates an example read-out signal 452 of the magnetic orientation of magnetic tape 432 detected by a read head. Amplitude 454 of read-out signal 452 varies as the magnetic orientation of particles within the magnetic layer change between the random magnetic bias and the different directional octants of the servo mark over the length of magnetic tape 432. Pulse 456 provides a change in amplitude from random orientations to directional octant I and pulse 458 provides a change in amplitude from random orientations to directional octant IV. Together, pulses 456 and 458 may be described as a bipolar pulse or even a substantially symmetrical bipolar pulse.

As shown in FIG. 13B, the overall magnetic orientation of magnetic tape 432 is illustrated instead of using longitudinal and perpendicular components provided in FIG. 13A. Magnetic tape 432 is shown with the magnetic orientation illustrated in magnetic tape 242B of FIG. 8. Magnetic head 450 generates magnetic field 471 that is applied to magnetic tape 432 as magnetic tape 432 is driven past magnetic head 450 in the direction of arrow 292. Magnetic head 450 may apply magnetic field 471 from the same or different side of magnetic tape 432 as the magnetic fields used to create the randomized magnetic bias. Generally, magnetic field 471 may be described as having an arched or horseshoe shape.

The leading edge of magnetic field 471 creates a magnetic orientation 466 in directional octant IV from randomized magnetic orientation 468. The trailing edge of magnetic field 471 creates the magnetic orientation 462 in directional octant I. The middle of magnetic field 471 creates substantially longitudinal orientation 464. Therefore, the entire servo mark created by magnetic field 471 has a magnetic orientation in different directional octants than that of the randomized magnetic bias. Magnetic orientations 468 and 460 remain randomized and unchanged by magnetic field 471. Therefore, the servo mark includes a magnetic orientation in directional octants I and IV. As expected, read-out signal 472 is similar to read-out signal 452 of FIG. 13A. Read-out signal 472 includes amplitude 474 and pulses 476 and 478 corresponding to the changes in the directional octants between the randomized magnetic bias and the written servo mark. Together, pulses 476 and 478 may be described as a bipolar pulse or even a substantially symmetrical bipolar pulse. The bipolar pulse may be completely symmetrical, but generally the bipolar pulse may be substantially symmetrical when pulses 476 and 478 are approximately of similar (but opposite) amplitude and similar width.

According to FIGS. 13A and 13B, magnetic tape 432 includes a substrate and a magnetic layer with a perpendicular squareness greater than 50 percent and a longitudinal squareness less than 50 percent. A servo track of the magnetic layer also includes a servo pattern and a non-pattern area. The servo pattern includes a plurality of servo marks with a pattern remanence magnetization in directional octants I and IV.

However, the non-pattern area, e.g., the magnetic bias, includes a non-pattern remanence magnetization that is substantially zero. This minimal remanence magnetization is due to the generally random magnetic orientations of magnetic particles within magnetic tape 432.

Remanence magnetization of the servo mark is different than the substantially servo magnetization of the bias. This configuration of magnetic tape 432 may be configured to produce read-out signal 472 (e.g., a servo signal) with a read head to identify each of the servo marks. Signal 472 may include amplitude 474 (e.g., a waveform) with substantially symmetrical opposing pulses 476 and 478 when the bias magnetization has perpendicular and longitudinal components substantially randomized. However, a servo pattern with different directional octants may produce slightly different pulse shapes. As described above, pulses 476 and 478 may be described collectively as a bipolar pulse. This bipolar pulse may be substantially symmetrical.

As with any of the servo signals of FIGS. 9A-13B, the illustrated servo signal is non-processed from the read head. In other words, the signal detected from the remanence magnetization of the magnetic tape may be substantially equivalent to the illustrated example waveforms. Although post-processing may be capable of reproducing similar types of waveforms or pulses from magnetic tape with any remanence magnetization, none of this processing, other than amplification, is needed to detect similar waveforms from described remanence magnetization in a magnetic tape.

Although FIGS. 9A-13B are generally described with regard to remanence magnetization with a direction substantially perpendicular to the substrate, bias and servo marks may be created with remanence magnetization with a direction substantially parallel with the substrate. For example, a magnetic tape may include a substrate and a magnetic layer with a perpendicular squareness greater than 50 percent and a longitudinal squareness less than 50 percent. The tape may also include a servo track of the magnetic layer, and a non-pattern area. The servo pattern includes a plurality of servo marks with a pattern remanence magnetization in directional octant II. However, the non-pattern area, e.g., the magnetic bias, includes a non-pattern remanence magnetization in directional octant VI. In this manner, the servo marks and non-pattern area may have opposing, but substantially longitudinal, remanence magnetization. Other combinations of servo marks and non-pattern area having directional octants with substantially longitudinal and opposing remanence magnetizations may include octants VI and II, III and VII, and VII and III, respectively.

Figure 14:
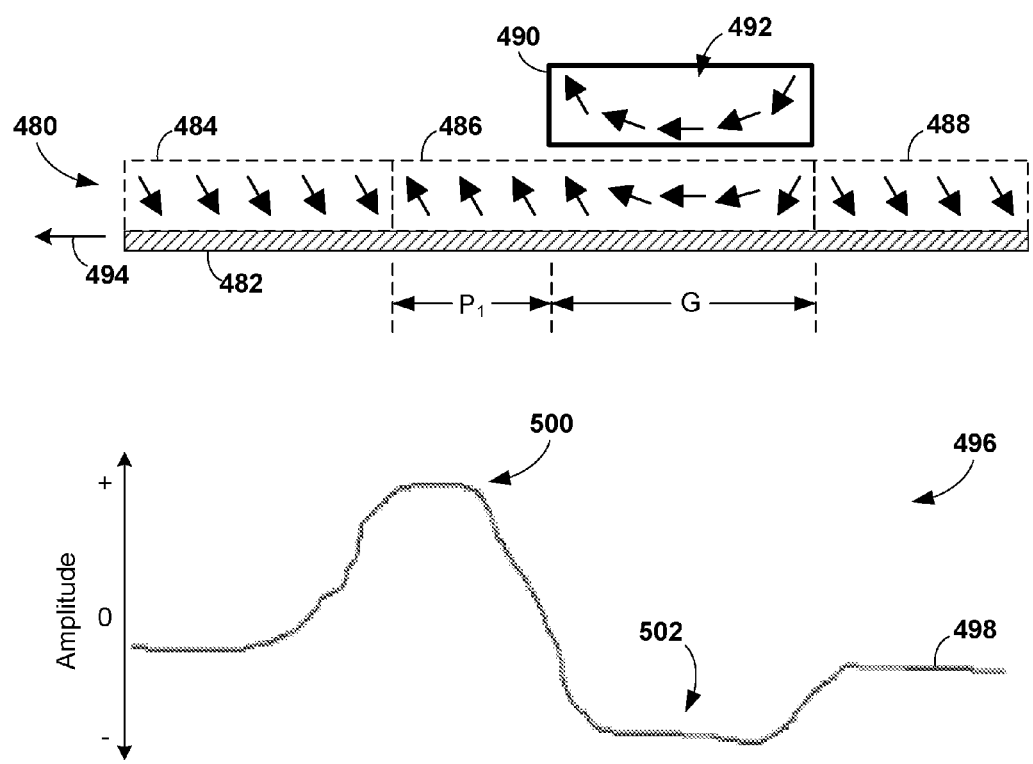
FIG. 14 is a conceptual diagram of an example magnetic medium that includes a remanence magnetization of a servo mark due to a leading edge and a trailing edge of a magnetic field and a graph of a corresponding read-out signal.

FIG. 14 is a conceptual diagram of an example magnetic medium that includes a magnetic orientation of magnetic particles within a servo mark due to a leading edge and a trailing edge of a magnetic field and a graph of a corresponding read-out signal. As shown in FIG. 14, magnetic tape 480 includes a magnetic layer illustrated as magnetic orientations 484, 486, and 488 and formed over substrate 482. Magnetic orientations 484 and 488 indicate the remanence magnetization of the magnetic bias in the non-pattern area of the servo track and substantially perpendicular toward substrate 482. However, in other examples, magnetic orientations 484 and 488 may be defined as within a directional octant, e.g., directional octant V. The magnetic bias of magnetic orientations 484 were created prior to the servo mark of magnetic orientation 486. In other words, servo marks and servo patterns are separated by the non-pattern area of the magnetic bias. Although servo marks are described herein, in other examples, various areas or marks of magnetic orientations may be used to store data in a data track (e.g., magnetic orientations may determine a bit of information such as a "1" or a "0").

Magnetic orientation 486 indicates the direction of the remanence magnetization of one servo mark in a servo pattern. Magnetic orientation 486 is created by applying magnetic field 492 generated from servo magnetic head 490 to magnetic tape 480 as magnetic tape 480 moves passed head 490 in the direction of arrow 494. The leading edge of magnetic field 492 is in a direction toward substrate 482 and the trailing edge of magnetic field 492 is in a direction away from substrate 482. Since magnetic field 492 is applied to magnetic tape during an electrical current pulse in head 490, the entire servo mark of magnetic orientation 486 is created by the movement of magnetic tape 480 a distance of $P_1$ during the pulse and the gap length G of magnetic field 492.

A portion of the servo mark has a magnetic orientation opposite the orientation of the magnetic bias, e.g. the magnetic layer over $P_1$ that is directed substantially away from substrate 494. However, the rest of the servo mark over gap length G is not oriented substantially perpendicular to and away from substrate 482. Instead, the portion of magnetic orientation 486 over gap length G is variable according to the shape of magnetic field 492. Magnetic orientation 486 of the servo mark is thus variable and not entirely opposing the direction of the magnetic bias. However, the trailing edge of magnetic field 492 leaves a remanence magnetization in a direction of opposing directional octant I. This magnetic orientation variability is due to magnetic field 492 being applied to an already created bias. When magnetic field 492 is turned off, there is no trailing edge to remove the leading portions of magnetic field 492. The magnetic bias of magnetic orientations 484 and 488 are immediately adjacent to the servo mark, both before and after the servo mark along the length of magnetic tape 480.

Read-out signal 496 illustrates the amplitude 498 produced by the interfaces between changing magnetic orientations over magnetic tape 480. Pulse 500 indicates a strong increase in amplitude due to the opposite and substantially perpendicular magnetic orientations between the magnetic bias and the trailing end of the servo mark. However, plateau 502 is created from the slowly changing magnetic orientation over gap length G. Plateau 502 may result in a relatively weak signal-to-noise ratio for the servo mark created by magnetic field 492.

Various magnetic orientations herein are generally described as creating a magnetic bias or a servo mark (e.g., several servo marks create a servo pattern). Therefore, magnetic bias and servo marks may be recorded as a magnetic transition along the magnetic tape. However, in other examples, a mark that includes a certain magnetic orientation may be used to define a bit of information (e.g., a "1" or a "0"). The magnetic transitions between marks may then be used to indicate stored information on the magnetic tape. In this manner, techniques used here for servo marks and servo patterns may also be applicable to data tracks.

Figure 15:
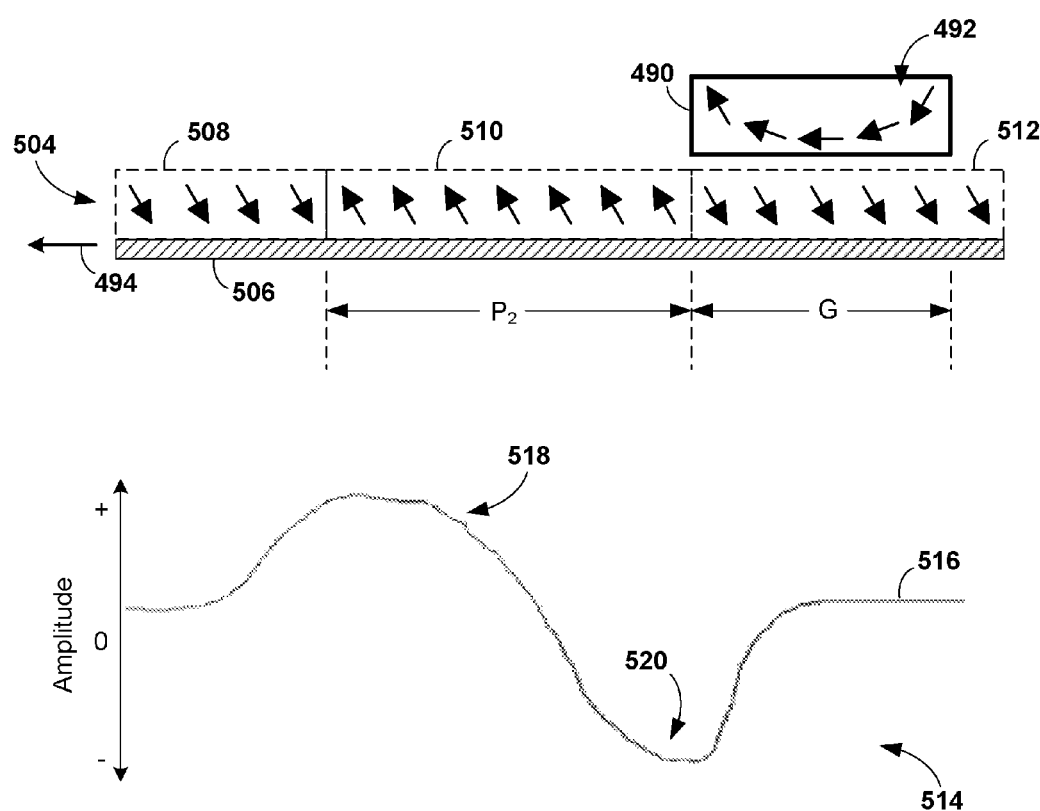
FIG. 15 is a conceptual diagram of an example magnetic medium that includes a remanence magnetization of a servo mark due to continuous writing a trailing edge of a magnetic field and a graph of a corresponding read-out signal.

FIG. 15 is a conceptual diagram of an example magnetic medium that includes a magnetic orientation of magnetic particles within a servo mark due to continuous writing a trailing edge of a magnetic field and a graph of a corresponding read-out signal. As shown in FIG. 15, servo magnetic head 490 and magnetic field 492 of FIG. 14 are used to create a servo mark. However, magnetic head 490 writes the servo mark with magnetic field 492 and then switches the direction of magnetic field 492 to create the magnetic bias with a remanence magnetization in a direction opposing the magnetic orientation 510 of the servo mark.

Magnetic tape 504 includes a magnetic layer illustrated as magnetic orientations 508, 510, and 512 and formed over substrate 506. Magnetic tape may be similar to magnetic tape 10. Magnetic orientations 508 and 512 indicate a magnetic bias in the non-pattern area of the servo track and substantially perpendicular toward substrate 506. However, in other examples, magnetic orientations 508 and 512 may be defined as within a directional octant, e.g., directional octant V. Magnetic orientations 508 and 512 of the magnetic bias and magnetic orientation 510 of the servo mark were created sequentially without stopping the movement of magnetic tape 504 in the direction of arrow 494. Servo marks and servo patterns of magnetic tape 504 are separated by the non-pattern area of the magnetic bias.

Magnetic orientation 510 indicates the magnetic orientation of one servo mark in a servo pattern. Magnetic orientation 510 is created by applying magnetic field 492 generated from servo magnetic head 490 to magnetic tape 504 as magnetic tape 504 moves passed head 490 in the direction of arrow 494. Only the trailing edge of magnetic field 492, orientated substantially away from substrate 506, is used to create magnetic orientation 510 of the servo mark. In other words, Magnetic field 492 is applied to magnetic tape 504 during an electrical current pulse in head 490 spanning the entire distance $P_2$ of the servo mark. The gap length G extends into non servo mark area (non-pattern area) of magnetic tape 504, but magnetic head 490 switches, or reverses, magnetic field 492 such that the new trailing edge aligns with the direction magnetic orientation 512 of the magnetic bias.

Using this alternating magnetic field technique, the trailing edge of magnetic field 492 creates an entire servo mark with magnetic orientation 510 substantially perpendicular to substrate 506 and opposite magnetic orientations 508 and 512 of the magnetic bias. In other words, the remanence magnetization of magnetic field 510 has a direction in directional octant I and opposite the magnetic bias of directional octant V. Therefore, the magnetic bias of magnetic orientations 508 and 512 are immediately adjacent to the remanence magnetization of the servo mark of magnetic orientations 510, both before and after the servo mark along the length of magnetic tape 504. Also, the transitions between magnetic orientations 508 and 512 of non-pattern area and magnetic orientation 510 of a servo pattern only comprise remanence magnetizations of two directions, e.g., in two opposing octants. In the example of magnetic tape 504, the transitions include orientations substantially perpendicular to substrate 506, both towards and away from the substrate.

Read-out signal 514 illustrates the amplitude 516 produced by the interfaces between changing magnetic orientations over magnetic tape 504. Pulse 518 indicates a strong increase in amplitude due to the opposite and substantially perpendicular magnetic orientations between the magnetic bias and the servo mark. In addition, the transition from the servo mark to the magnetic bias also provides a large change in amplitude as indicated by pulse 520. By alternating between magnetic fields to continuously create a magnetic bias and a servo mark, the signal-to-noise ratio for the servo mark of FIG. 15 may be greater than that of the servo mark of FIG. 14.

FIGS. 16A and 16B are conceptual diagrams of a single magnetic head that alternates the direction of a magnetic field to write a servo pattern. Magnetic tape 522 may be similar to magnetic tape 504 described in FIG. 15. Generally, magnetic head 534 is stationary and produces magnetic fields 536A and 536B (collectively "magnetic fields 536") of opposing directions in an alternating fashion as magnetic tape 522 passes near magnetic head 534. This alternation of magnetic fields 536 allows a magnetic bias (e.g. a non-pattern area) to be created continuously with servo marks of a servo pattern. The alternating fields, or switching between fields, may be timed to correspond with predetermined lengths of servo marks and non-pattern bias areas of magnetic tape 522.

As magnetic tape 522 moves in the direction of arrow 538 passed magnetic head 534, either of magnetic fields 536 are applied to magnetic tape 522. As shown in FIG. 16A, the magnetic bias, e.g., a remanence magnetization, having magnetic orientation 526 has already been created on magnetic tape 522. The direction of magnetic orientation 526 is substantially perpendicular to substrate 524 and toward the substrate. After magnetic orientation 526 was created, magnetic head 534 switched to magnetic field 536A. Magnetic field 536A is directed generally along the length of magnetic tape 522 in the same direction of arrow 538. Magnetic field 536A is generated so that the trailing edge of magnetic field 536A is applied to magnetic tape 522 over length $P_3$. $P_3$ also corresponds to the electrical current pulse used to create magnetic field 536A. Therefore, magnetic orientation 528 of the servo mark is created between transitions A and B.

Before magnetic head 534 alternate to magnetic field having a different direction, magnetic field 536A creates magnetic orientation 530 that mimics the varying orientations of magnetic field 536A. The remaining portion of magnetic tape 522 shown in FIG. 16A has not been affected by a magnetic field from magnetic head 534. Therefore, magnetic orientation 532 may include various random magnetic directions of the magnetic particles. In other examples, magnetic orientation 532 may have some uniformity in magnetic direction from the construction of magnetic tape 522.

Once transition B of continuously moving magnetic tape 522 reaches the trailing end of magnetic field 536A, e.g., the servo mark of magnetic orientation 528 is completed, magnetic head 534 alternates to switch from the direction of magnetic field 536A to the direction of magnetic field 536B. As shown in FIG. 16B, magnetic head 534 generates magnetic field 536B once the trailing edge of the magnetic field gets to transition B. Magnetic field 536B may be generated with an electrical current that switches direction, as controlled by controller 30 of servo writing system 26 from FIG. 3, for example. In some examples, the electrical current may be an alternating current modulated, or controlled, for the time needed to create desired lengths of servo marks and non-pattern bias areas in magnetic tape 522.

Magnetic field 536B is applied to magnetic tape 522 over length $P_4$ to crate magnetic orientation 540 of the magnetic bias, e.g., non-pattern area. $P_4$ also corresponds to the electrical current pulse used to create magnetic field 536B. Magnetic orientation 540 stretches along the length of magnetic tape 522 between transition B and transition C. After transition C, magnetic head 534 may again alternate to magnetic field 536A to create another servo mark of the servo pattern. Similar to magnetic orientation 530 of FIG. 16A, magnetic orientation 542 mimics the direction of magnetic field 536B until the trailing edge of magnetic field 536A changes the orientation.

Magnetic tape 522 includes magnetic bias, e.g., non-pattern area, immediately adjacent to servo marks. In this manner, the transitions A, B, and C include only a substantially perpendicular orientation toward substrate 524 and an opposing substantially perpendicular orientation away from substrate 524. Continuously writing a magnetic bias and servo patterns with alternating magnetic fields may allow greater signal-to-noise ratios in the servo tracks of perpendicular media. In addition, writing servo patterns and the bias in one continuous step may reduce the amount of time needed to create a user-ready magnetic storage tape and the number of systems required to produce the tape.

Figure 17A:
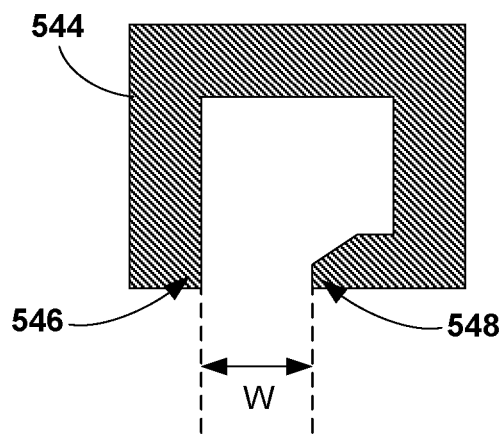
FIGS. 17A and 17B are conceptual diagrams of a gap width of a magnetic head and a servo mark with a length approximately equal to the gap width.
Figure 17B:
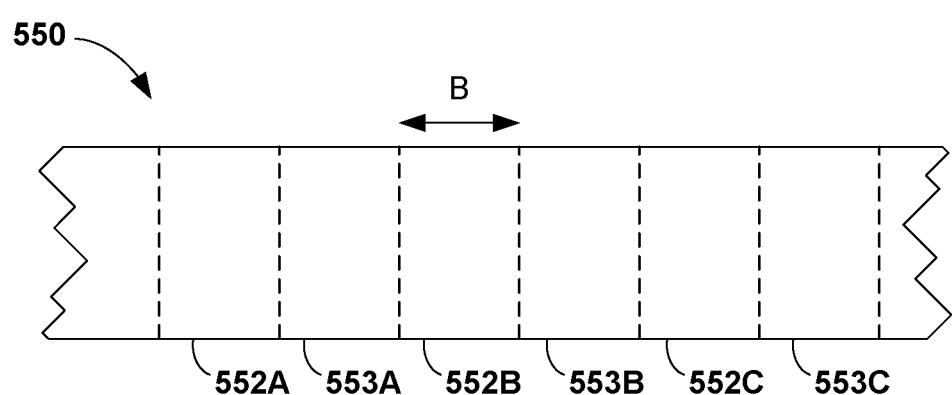
Figure 18A:
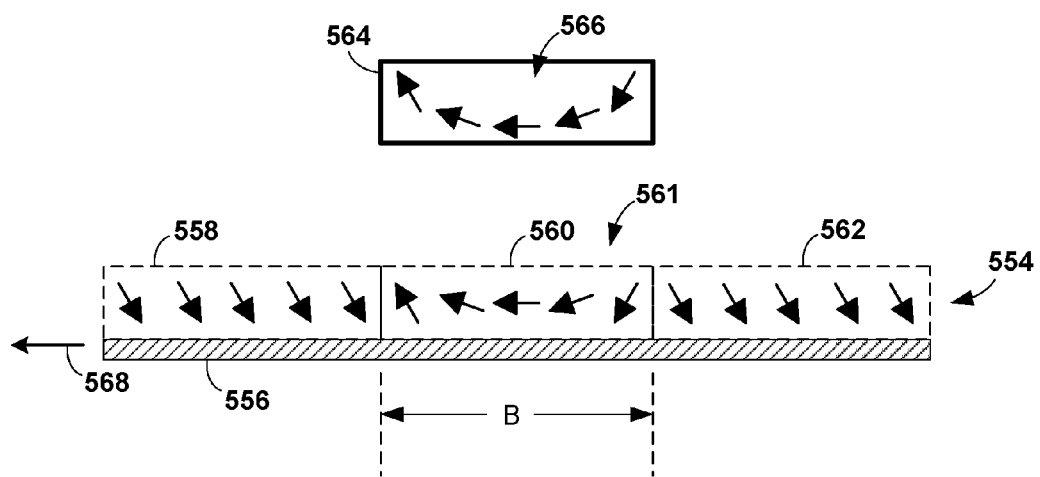
FIG. 18A is a conceptual diagram of a magnetic head that creates a symmetrical servo mark with a magnetic field matched to the length of the symmetrical servo mark.

FIGS. 17A and 17B are conceptual diagrams of gap width W of magnetic head 544 and each servo mark 552 with a length W approximately equal to the gap width W. As shown in FIG. 18A, magnetic head 544 includes a gap created by gap ends 546 and 548. The distance between gap end 546 and 548 is gap width W. The magnetic field used to bias magnetic tape and write servo patterns and data is generated between gap ends 546 and 548.

Typically, gap width W is approximately 1.4 µm in length. In addition, the length of a servo mark is approximately 2.1 µm. Therefore, the magnetic field is applied to the magnetic layer for a pulse timed such that the gap width is applied to the magnetic tape for approximately 0.7 µm of movement in the magnetic tape. The gap width W and the resulting movement of magnetic tape results in an overall mark length of approximately 2.1 µm.

Instead of relying on tape movement during the application of the magnetic field, the gap width W may be sized to the approximate length of the servo mark. Magnetic head 544 may be constructed with the desired gap width W or magnetic head 544 may be adjustable to the desired length of the servo mark. Since adjusting the gap width W may affect the geometry of the magnetic field, electrical current and/or distance between magnetic head 544 and the magnetic tape may be adjusted to achieve the desired magnetic orientation of the servo mark in the magnetic tape.

Figure 18B:
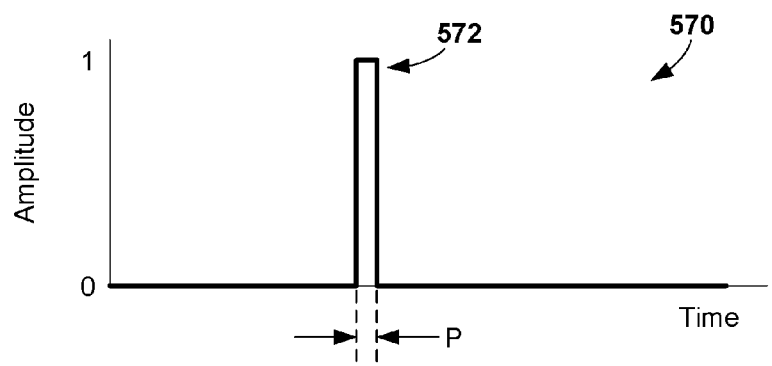
FIG. 18B is a timing diagram of an electrical current pulse that generates the magnetic field used to create a symmetrical servo mark.

As shown in FIG. 18B, cross-sectional side view of magnetic tape 550 includes servo marks 552A-C (collectively "servo marks 552") and non-pattern areas 553A-C (collectively "non-pattern areas 553"). Magnetic tape 550 may have been passed near magnetic head 544 to create servo marks 552 having a mark length B approximately equal to the gap width W of magnetic head 544. Since the mark length is approximately equal to the gap width W, the magnetic field may be generated by magnetic head 544 for a very short time, e.g., an instantaneous pulse of electrical current. Even though magnetic tape 550 is moving when the magnetic field is applied to write servo marks 552, the magnetic field is applied for a sufficiently short period of time such that mark length B remains approximately equal to gap width W. As shown in the example of FIG. 18B, each of servo marks 552 (e.g., an area of magnetic tape 550) is separated by non-patterned areas 553 (e.g., a bias remaining over the space between servo marks 552). In other examples, servo marks 552 and/or non-pattern areas 553 may represent data, e.g., magnetic head 544 may use the magnetic field to create data marks in a data track of magnetic tape 550 instead of servo marks 552.

The short current pulse may occur during a short period of generally between 10 nanoseconds and 50 nanoseconds. In one example, the short period may be approximately 30 microseconds or less. The short period may be at least partially dependent upon the speed at which the magnetic tape passes by the magnetic head, e.g., faster tape speeds may require shorter current pulses. Generally, mark length B and gap width W may be approximately equal to 2.1 µm. Other example dimensions are also contemplated, such as a mark length of approximately 1.0 µm. For example, mark length B and gap with W may generally be between approximately 0.1 µm and 20 µm. More specifically, mark length B may be between approximately 0.5 µm and 3.0 µm. As long as mark length B and gap width W are approximately equal, any dimensions may be possible.

FIG. 18A is a conceptual diagram of magnetic head 564 that creates symmetrical servo mark 561 created with magnetic field 566 matched to the mark length B of symmetrical servo mark 561. As shown in FIG. 18A, symmetrical servo mark 561 is created by applying magnetic field 566 for a short time period that prevents moving magnetic tape 554 from substantially moving through magnetic field 566. Magnetic tape 544 may be similar to magnetic tape 10. Magnetic tape 544 includes substrate 556 and a magnetic layer illustrated by magnetic orientations 558, 560, and 562. Magnetic tape 544 is driven, or moved, passed magnetic head 564 (e.g., a write head). Upon the generation of magnetic field 556, magnetic orientation 560 is switched from that of the magnetic bias shown in magnetic orientations 558 and 562 to that of magnetic orientation 560.

As described in FIGS. 17A and 17B, the mark length B is approximately equal to the gap length G of magnetic head 564. If mark length B was greater than gap length G, then magnetic orientation 560 of symmetrical servo mark 561 may no longer be symmetrical because the trailing edge of the magnetic field would create longer trailing edge orientation in the servo mark. Magnetic orientation 560 is the orientation of symmetrical servo mark 561. Symmetrical servo mark 561 includes a varying magnetic orientation 560 that changes along mark length B. Magnetic orientation 560 may be approximately equal to the direction of magnetic field 566 and linearly symmetrical.

Magnetic head 564 may generate magnetic field 566 with field lines having certain characteristics. For example, magnetic field 566 may include a first field pattern region at a leading edge of magnetic field 566 that is substantially perpendicular to and directed toward the magnetic tape at a first end of the symmetrical servo mark (e.g., adjacent to magnetic orientation 562). Magnetic field 566 may also include a second field pattern region at a trailing edge of magnetic field that is substantially perpendicular to and directed away from the magnetic tape at a second end of the symmetrical servo mark (e.g., adjacent to magnetic orientation 558). In addition, magnetic field 566 may include a third field pattern region substantially parallel with the magnetic tape between the first end and the second end (e.g., the middle of magnetic field 566).

Generally, the angle between the first field pattern region (at the leading edge) and substrate 556 may be approximately equal to the angle between the second field pattern region (at the trailing edge) and substrate 556. 17. In one example, the magnetic direction of both the first field pattern region and the second field pattern region may form an angle with substrate 556 that is greater than approximately 45 degrees. In other examples, the magnetic direction of both the first field pattern region and the second field pattern region may form an angle with substrate 556 that is greater than approximately 75 degrees. However, in some examples, the angle between both the first field pattern region and the second field pattern region and substrate 556 may be approximately 90 (e.g., perpendicular to substrate 556).

Magnetic field 566 may create a similarly oriented symmetrical servo mark 561. Within magnetic orientation 560, one end of symmetrical servo mark 561 includes a magnetic orientation substantially perpendicular to and directed toward substrate 556, the other end of symmetrical servo mark 561 includes a magnetic orientation substantially perpendicular to and directed away from substrate 556, and the middle of symmetrical servo mark 561 between the two ends include a magnetic orientation substantially parallel with substrate 556.

FIG. 18B is a timing diagram of electrical current pulse 572 that generates the magnetic field used to create symmetrical servo mark 561 of magnetic tape 554 described in FIG. 19. As shown in FIG. 18B, timing diagram 570 illustrates the electrical current used to generate a magnetic field for creating a symmetrical servo mark in a magnetic tape. Pulse 572 has a pulse width P that is very short. Pulse 572 may be produced and/or controlled by controller 30 of FIG. 3, for example. Pulse width P may be provided as short as possible. Ideally, pulse width P may approach a substantially zero value such that pulse 572 is close to instantaneous. Pulse width P may be generally between 10 nanoseconds and 50 nanoseconds in duration. In one example, the short period of the pulse width P may be approximately 30 microseconds or less. The short period may be at least partially dependent upon the speed at which the magnetic tape passes by the magnetic head, e.g., faster tape speeds may require shorter current pulses.

In some examples, pulse 572 may be a substantially square wave. In other examples, pulse 572 may have more complicated geometries. For example, controller 30 may ramp up the electrical current amplitude of pulse 572 as fast as possible. Controller 30 may subsequently cut off, or stop, the electrical current once the current amplitude reaches a predetermined threshold value. Alternatively, controller 30 may ramp up the current amplitude of pulse 572 once the short period has elapsed or terminated. Therefore, the delivery of the short pulse may be controlled by an threshold amplitude or a timed period. In any case, pulse 572 is relatively instantaneous with respect to the speed of magnetic tape 554 moving near magnetic head 564.

Figure 19A:
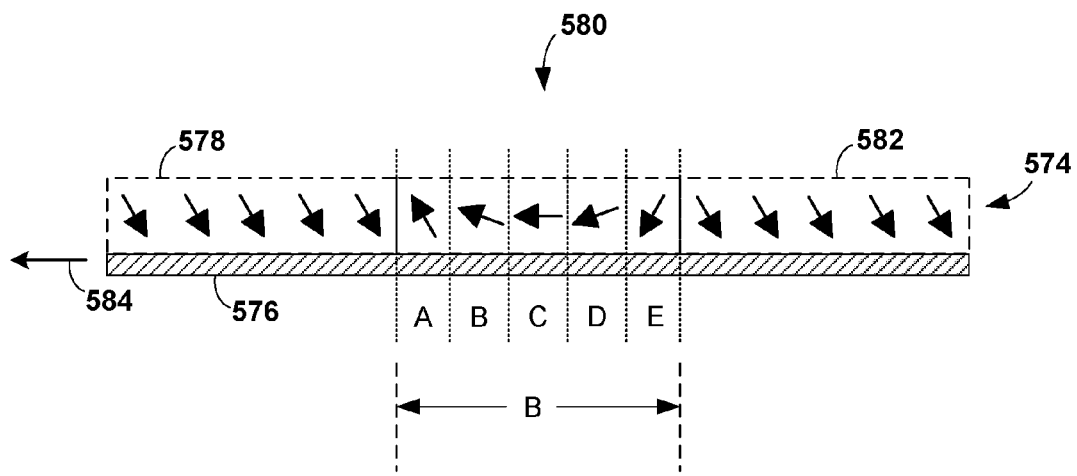
FIGS. 19A and 19B illustrate a conceptual diagram of a magnetic medium with a symmetrical servo mark created on a bias and a corresponding read-out signal.
Figure 19B:
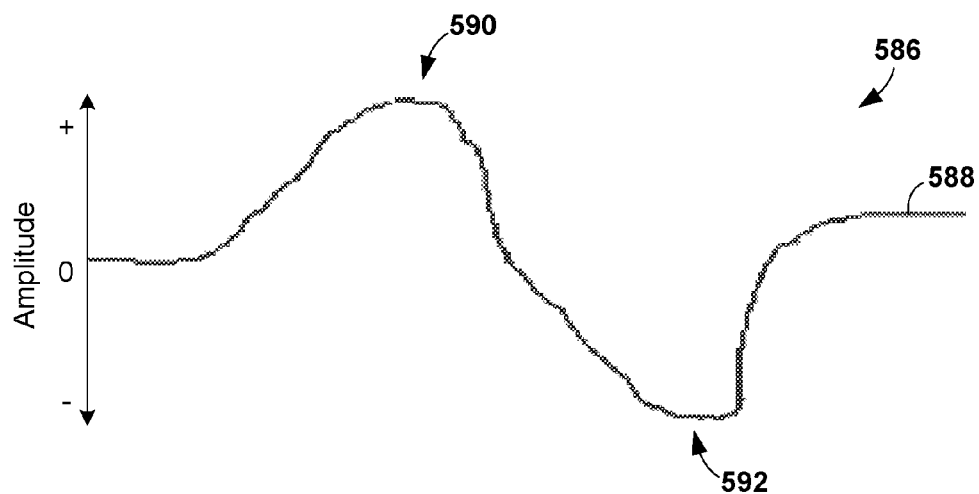

FIGS. 19A and 19B illustrate a conceptual diagram of a magnetic medium with a symmetrical servo mark created on a bias and a corresponding read-out signal. As shown in FIG. 19A, magnetic tape 574 includes substrate 576, magnetic orientations 578 and 582, and symmetrical servo mark 580. Magnetic tape 574 and symmetrical servo mark 580 may be substantially similar to magnetic tape 554 and symmetrical servo mark 561, respectively, of FIG. 18A. For example, symmetrical servo mark 580 may be created with a magnetic field similar to that of magnetic field 566 of FIG. 18A. Generally, magnetic tape 554 may include one or more servo tracks that each contain a plurality of symmetrical servo marks 580 that create a servo pattern in the respective servo track. However, one or more data tracks may also include data marks that are similarly symmetrical.

Magnetic orientations 578 and 582 illustrate the general magnetic orientation of magnetic particles in those specific locations of magnetic tape 574. Magnetic orientations 578 and 582 also illustrate the direction of the bias provided in magnetic tape 574. The magnetic bias of magnetic orientations 578 and 582 may be created prior to the creation of symmetrical servo mark 580. The bias of magnetic orientations 578 and 582 is illustrated as in directional octant III, with relation to the direction of tape movement indicated by arrow 584. In this manner, the magnetic bias created by magnetic orientations 578 and 582 in non-pattern areas of the servo track may be defined by both a perpendicular component and a longitudinal component (e.g., a non-zero perpendicular component and a non-zero longitudinal component). However, other examples of a magnetic bias may include magnetic orientations that are either fully perpendicular (a zero longitudinal component) or fully longitudinal (a zero perpendicular component).

Symmetrical servo mark 580 includes segments A, B, C, D, and E. These segments are used to illustrate the magnetic features of symmetrical servo mark 580. The changes to magnetic orientation of the magnetic particles within symmetrical servo mark 580 may be generally continuous from one end of symmetrical servo mark 580 to the other. For example, the magnetic orientation at the rear of symmetrical servo mark 580 (segment E) may begin at approximately 170 degrees and progressively change to 90 degrees at the middle of segment C. The magnetic orientation at the middle of segment C may then progressively change to approximately 10 degrees at the front of symmetrical servo mark 580 (segment A). However, the five segments A, B, C, D, and E illustrated in FIG. 19A provide generalized changes to the magnetic orientation of magnetic particles within symmetrical servo mark 580. The coordinate system described in FIG. 2A, as defined by axis 21 and 23, will be used to describe the changing magnetic orientations.

Symmetrical servo mark 580 may be described as symmetrical because the angle formed between substrate 576 and the magnetic orientation is substantially mirrored from the front of the servo mark to the rear of the servo mark. For example, segment A indicates that the front of symmetrical servo mark 580 has a magnetic orientation at approximately 10 degrees (with respect to FIG. 2A). Accordingly, the magnetic orientation of segment A forms an approximate 80 degree angle above substrate 576. Segment E indicates that the rear of symmetrical servo mark 580 has a magnetic orientation at approximately 170 degrees (with respect to FIG. 2A). However, this 170 degree orientation also forms an approximately 80 degree angle below substrate 576. In this manner, the angles formed by the magnetic orientations of segments A and E are approximately equal. Generally, the magnetic orientations of segments A and E may form angles approximately equal to or greater than 45 degrees with substrate 576. In other examples, the magnetic orientations of segments A and E may form angles approximately equal to or greater than 75 degrees with substrate 576. Although the magnetic orientations of respective segments A and E are not directly opposite each other (e.g., segments A and E would have exactly opposing magnetic orientations if the magnetic orientations were 180 degrees apart), symmetrical servo mark 580 is still described as symmetrical because the angles that the magnetic orientations form with regard to substrate 576 are substantially similar between the front of the servo mark and the rear of the servo mark.

Similar to segments A and E, segments B and D are also symmetrical. For example, segment B indicates that the front-middle of symmetrical servo mark 580 has a magnetic orientation at approximately 60 degrees. Accordingly, the magnetic orientation of segment B forms an approximate 30 degree angle above substrate 576. Segment D indicates that the rear-middle of symmetrical servo mark 580 has a magnetic orientation at approximately 120 degrees. However, this 330 degree orientation also forms an approximately 30 degree angle below substrate 576. Therefore, the magnetic orientations of segments B and D are substantially symmetrical. Segment C has a magnetic orientation of approximately 90 degrees, which is symmetrical at the middle of symmetrical servo mark 580.

In some examples, the magnetic orientations of segments A, B, C, D, and E may at least partially define field lines within symmetrical servo mark 580 of magnetic tape 574. These field lines may correspond to the field lines generated by the magnetic field used to produce the magnetic orientations of magnetic particles within mark length B of symmetrical servo mark 580. Generally, the field lines that are at least partially defined by the magnetic orientations of symmetrical servo mark 580 may form an arched shape across the entire length of symmetrical servo mark 580 (e.g., over the full mark length B). This arched shape may have different radii of curvature based on the magnetic field used to create symmetrical servo mark 580.

In other examples, the specific angles of magnetic orientations within symmetrical servo mark 580 may vary. In other words, the angle of the magnetic orientations within segments A and E may be closer to 0 degrees in other examples. Although the exact angles with substrate 576 that are created by the magnetic orientations of symmetrical servo mark 580 may vary, the magnetic orientations between the front and rear of symmetrical servo mark 580 may remain substantially symmetrical.

Symmetrical servo mark 580 may have remanence magnetization different than what is shown in FIG. 19A. For example, symmetrical servo mark 580 may be created with a first portion of a magnetic field pattern substantially perpendicular in one direction and a second portion of the magnetic field pattern substantially perpendicular in an opposite direction. The middle portion of servo mark 580 may retain similar remanence magnetization to that of the previous magnetic bias. This type of symmetrical servo mark 580 may be present in a bias that has been ac erased, e.g., the magnetic orientations have been randomized such that the remanence magnetization is substantially zero.

As shown in FIG. 19B, read-out signal 586 illustrates the amplitude 588 produced by the interfaces between changing magnetic orientations over the length of magnetic tape 574 illustrated in FIG. 19A. Pulse 590 indicates a strong increase in amplitude due to the opposite and substantially perpendicular magnetic orientations between the magnetic bias of magnetic orientation 578 and segment A of symmetrical servo mark 580 of the servo mark. In addition, the transition from segment E of symmetrical servo mark 580 to the magnetic bias of magnetic orientation 578 also provides a large change in amplitude as indicated by pulse 592. The changing magnetic orientation within symmetrical servo mark 580 generates the change in amplitude illustrated between pulses 590 and 592.

Figure 20:
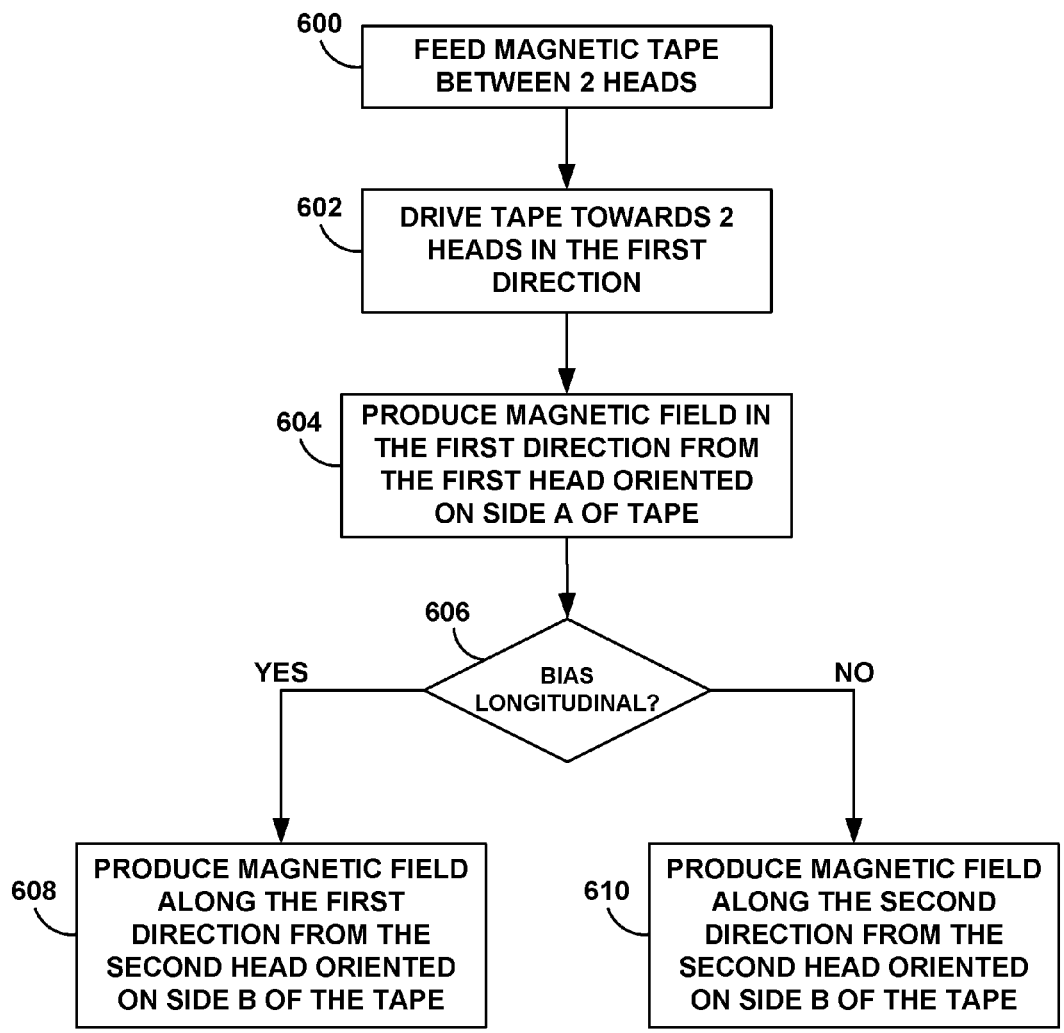
FIG. 20 is a flow diagram illustrating an example technique for creating a substantially longitudinal or perpendicular bias in a magnetic tape with greater perpendicular squareness.

FIG. 20 is a flow diagram illustrating an example technique for creating either one of a longitudinal or perpendicular bias, e.g., a substantially perpendicular or longitudinal remanence magnetization, in a magnetic tape using two magnetic heads. In the example of FIG. 20, system 26 and magnetic tape 32 will be described. However, a longitudinal or perpendicular bias may be created in any of the example magnetic tapes described herein that has a greater perpendicular squareness (e.g., magnetic tape 10).

As shown in FIG. 20, magnetic tape 32 is fed between two magnetic heads (e.g., two heads within servo head module 28) (600). System 26 then drives magnetic tape 32 towards both of the magnetic heads in a first direction (602). The first head produces a magnetic field from one side (side A) of magnetic tape 32, and the magnetic field is generally oriented along magnetic tape 32 in the first direction (604). An example of the first head is magnetic head 110 that produces magnetic field 111 as shown in FIG. 6A. This magnetic field may create a magnetic orientation similar to the trailing edge of the magnetic field.

If magnetic bias is to be longitudinal ("YES" branch of block 606), the second magnetic head produces a magnetic field from the other side (side B) of magnetic tape 32, and the magnetic field is generally oriented along magnetic tape 32 in the first direction (608). An example of this second head is magnetic head 112 that produces magnetic field 113 as shown in FIG. 6A. The resulting magnetic bias created in magnetic tape 32 after step 608 is a substantially longitudinal magnetic bias. In other words, the perpendicular component of the magnetic orientation in the bias is approximately zero.

If magnetic bias is to be perpendicular ("NO" branch of block 606), the second magnetic head produces a magnetic field from the other side (side B) of magnetic tape 32, and the magnetic field is generally oriented along magnetic tape 32 in a second direction opposite the first direction (610). An example of this second head is magnetic head 162 that produces magnetic field 163 as shown in FIG. 7A. The resulting magnetic bias created in magnetic tape 32 after step 610 is a substantially perpendicular magnetic bias. In other words, the longitudinal component of the magnetic orientation in the bias is approximately zero.

After the magnetic bias is created in magnetic tape 32 with the magnetic field of one of steps 608 or 610, magnetic tape 32 may be further prepared for data storage. For example, one or more servo patterns may be created in a servo track of magnetic tape 32. This servo writing process may proceed according to any of the various techniques described herein.

Figure 21:
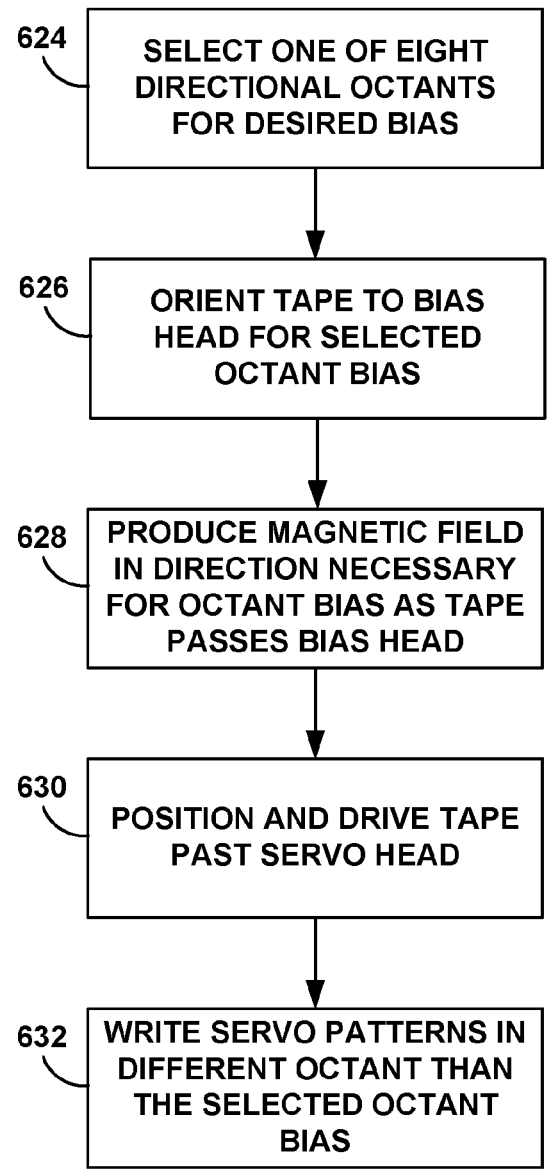
FIG. 21 is a flow diagram illustrating an example technique for creating a bias in one directional octant and creating a servo mark with a remanence magnetization in a different directional octant than the bias.

FIG. 21 is a flow diagram illustrating an example technique for creating a bias in one directional octant and creating a servo pattern in a different directional octant than the bias. The technique of FIG. 21 is directed to the example servo marks created with the magnetic fields of FIGS. 9A-13B. For example purposes, FIG. 21 will be descried with respect to the magnetic bias and servo mark described in FIG. 9B using magnetic head 290 and magnetic field 307 to write servo marks into magnetic tape 280. Although different magnetic heads are described as producing the bias and the servo marks, the same magnetic head may be used in other examples.

As shown in FIG. 21, the user may select the desired directional octant for the magnetic bias (624). The selection of the directional octant for the magnetic bias may be based on any number of factors, e.g., an expected signal-to-noise ratio of completed servo patterns, the magnetic fields capable of being produced, or the specific composition of the magnetic tape. In the example of FIG. 21, the selected directional octant for the magnetic bias may be directional octant I as indicated in FIG. 9B.

Magnetic tape 280 is then oriented to the bias head (a magnetic head) to allow the magnetic bias to be created in directional octant I (626). The bias head then produces a magnetic field in the direction necessary (e.g., the same direction as the movement of magnetic tape) to create the magnetic bias in directional octant I (628). Therefore, after magnetic tape 280 passes near the bias head, magnetic tape 280 includes a magnetic bias in directional octant I. As shown in FIG. 9B, the magnetic bias may include magnetic orientation 304.

Next, magnetic tape 280 is positioned and driven past magnetic head 290 (e.g., a servo head) for the creation of servo patterns using multiple servo marks (630). In the example of FIG. 9B, the substrate of magnetic tape 280 would be positioned away from magnetic head 290. Magnetic head 290 then writes servo marks to create servo patterns in a different directional octant than the previously created magnetic bias (632). In the example of FIG. 9B, magnetic head 290 produces magnetic field 307 in the direction of magnetic tape 280 movement to create servo marks that include a remanence magnetization in directional octant IV, generally opposite to the orientation of the bias in octant I. Each time magnetic field 307 is produced and applied to magnetic tape 280, a new servo mark will be created with a different magnetic orientation than the bias.

Generally, the remanence magnetization of the bias (e.g., non-pattern area) and the plurality of servo marks have directions in opposing directional octants. Opposing octants, such as the octants described in FIGS. 9-12, may not need to be fully opposite of each other. Fully opposite octants, e.g., octant pairs I and V or VIII and IV, have three other octants separating them. Octants that are separated by at least two other octants, e.g., octant pairs I and IV or V and VIII, may still be referred to as generally opposing each other. In other words, both the longitudinal components and perpendicular components of octants I and V, for example, are in opposite directions from each other. In octant pair I and IV, the perpendicular components are in opposing directions, but the longitudinal components share a common direction.

Figure 22:
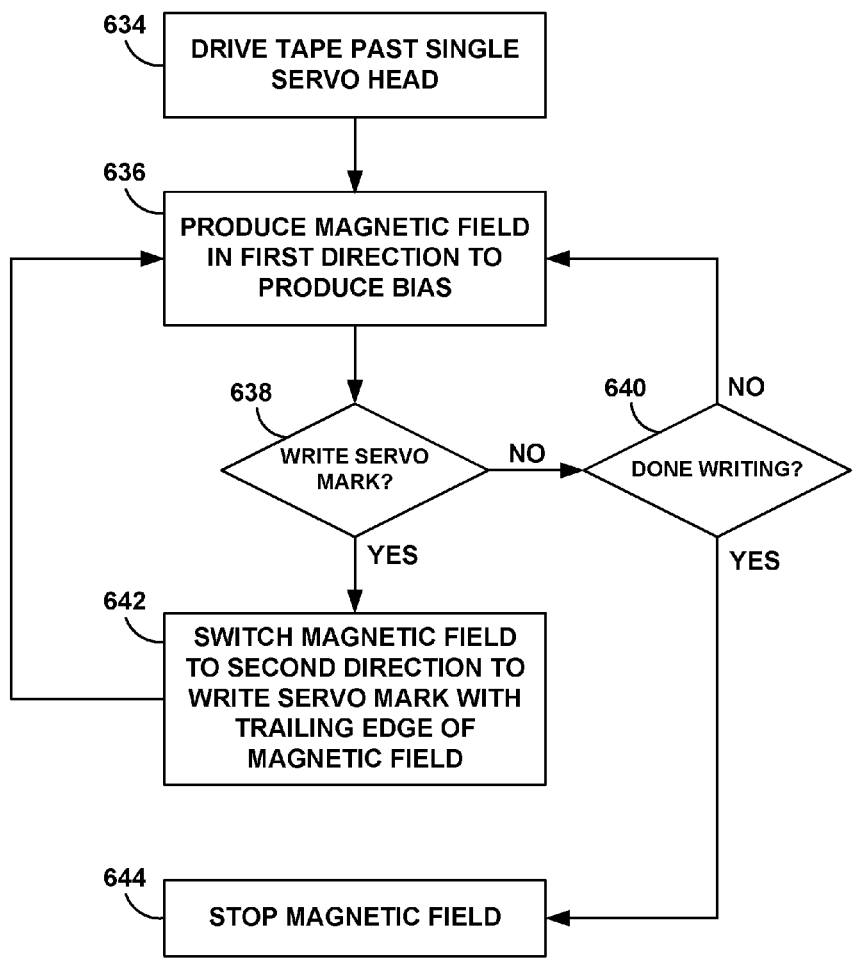
FIG. 22 is a flow diagram illustrating an example technique for continuously biasing and writing servo marks by alternating the direction of the magnetic field.

FIG. 22 is a flow diagram illustrating an example technique for continuously biasing and writing servo patterns by alternating the direction of the magnetic field. FIG. 22 is generally described with magnetic head 534, magnetic fields 536, and magnetic tape 522 of FIGS. 16A and 16B. However, this technique may also be used to create a bias and servo patterns in other magnetic tapes (e.g., magnetic tape 10).

As shown in FIG. 22, the servo writing system (e.g., system 26 of FIG. 3), drives magnetic tape 522 past the single magnetic head 534 (634). As magnetic tape 522 is moving, magnetic head 534 produces magnetic field 536B in a first direction to create the magnetic bias in magnetic tape 522 (636). If magnetic head 534 is to write a servo mark of a servo pattern ("YES" branch of block 638), magnetic head 534 switches the magnetic field to produce magnetic field 536A in a second direction to write the servo mark with the trailing edge of magnetic field 536A (642). Since magnetic head 534 switched the direction of magnetic field 536B, the second direction is opposite the first direction. In this manner, the magnetic orientation of the magnetic bias is substantially opposite of the servo mark magnetic orientation. After writing the servo mark (642), magnetic head 534 again switches from magnetic field 536A to magnetic field 536B for creating the magnetic bias (636). In this manner, magnetic head 534 may continually alternate or switch the direction of the magnetic field to produce either a magnetic bias or a servo mark on a continual basis.

If magnetic head 534 is not to write a servo mark ("NO" branch of block 638), and the write process is not complete ("NO" branch of block 640), magnetic head 534 continues to produce magnetic field 534B (636). However, if magnetic head 534 is not to write a servo mark ("NO" branch of block 638), and the write process is complete ("YES" branch of block 640), then magnetic head 534 stops the magnetic field production (644).

Figure 23:
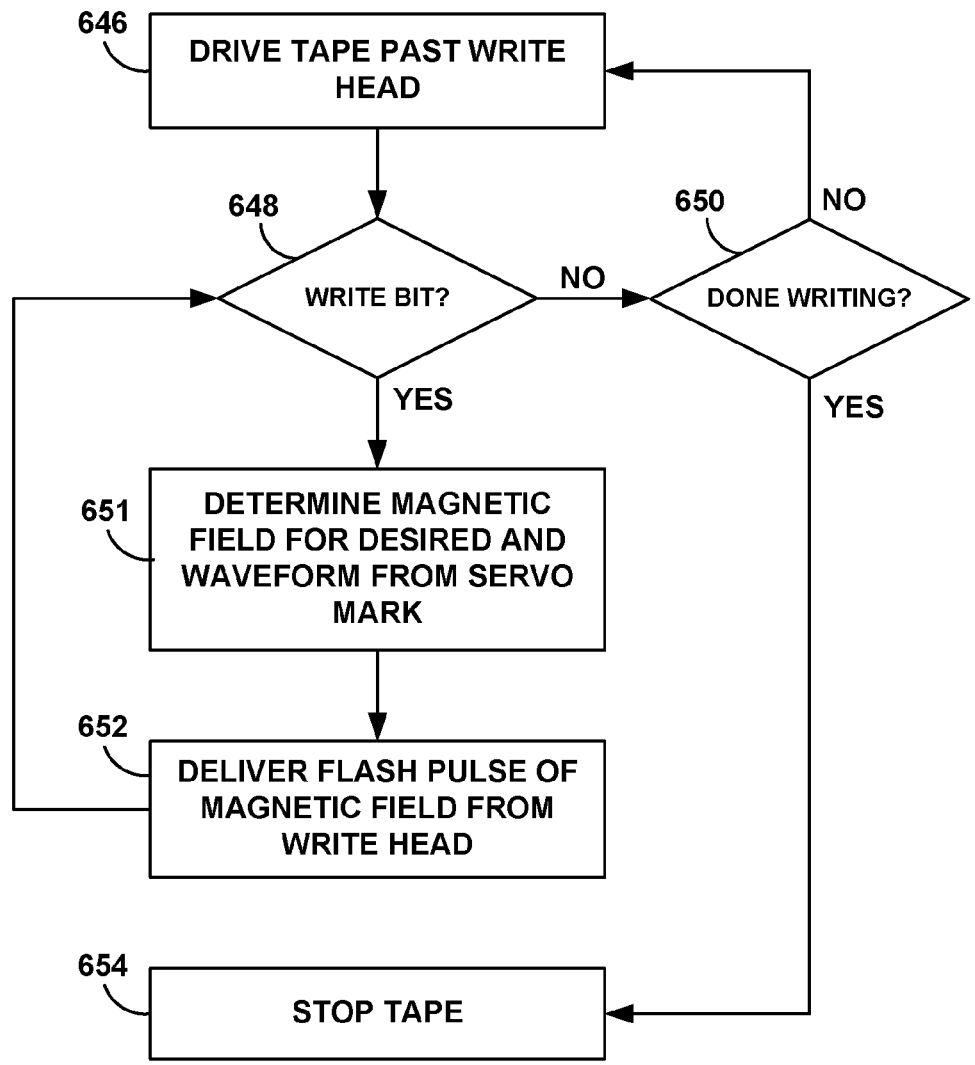
FIG. 23 is a flow diagram illustrating an example technique for creating a symmetrical servo mark in a magnetic storage tape.

FIG. 23 is a flow diagram illustrating an example technique for creating a symmetrical servo mark in a magnetic storage tape. FIG. 23 is generally described with magnetic head 564, magnetic fields 566, and magnetic tape 554 of FIG. 18A. However, this technique may also be used to create symmetrical servo marks in other magnetic tapes (e.g., magnetic tape 10). Although the technique is directed to writing symmetrical servo marks for servo patterns, a symmetrical servo mark may also be written as a data mark within a data track.

As shown in FIG. 23, the servo writing system (e.g., system 26 of FIG. 3), drives magnetic tape 554 past the single magnetic head 564 (646). Magnetic tape 554 may already have a magnetic bias created on the tape. If magnetic head 564 is to write a servo mark ("YES" branch of block 648), controller 30 may determine the appropriate magnetic field to apply (e.g., direction of the magnetic field) to create the desired remanence magnetization of achieve the desired waveform from the servo mark (651). In this manner, the servo mark may be written with a magnetic field to achieve a specific remanence magnetization in an octant as described herein. Based on the bias magnetization in magnetic tape 554, the resulting servo mark may achieve a specific waveform when read by a read head. Next, magnetic head 564 delivers a flash pulse of magnetic field 566 for a short period of time (652). In other words, magnetic field 566 is created for such a short time that magnetic field 566 is not applied to magnetic tape 554 as the tape is moving. As described herein, the short period of time may be generally between approximately 10 nanoseconds and 50 nanoseconds or even less. Magnetic field 566 this creates a magnetic orientation over the entire length of the servo mark in magnetic tape 554 that is substantially symmetrical.

If magnetic head 564 is not to write a servo mark ("NO" branch of block 648), but more servo marks are to be written to magnetic tape 554, then the system keeps driving magnetic tape 544 to continue writing servo marks as symmetrical servo marks. If magnetic head 564 is not to write a servo mark ("NO" branch of block 648), and no more servo marks are to be written to magnetic tape 554, then the system stops magnetic tape 544 because the servo writing process is complete (654).

In other examples, symmetrical servo marks for servo patterns may be written with multiple magnetic heads lined up sequentially along the tape path. Then, the flash pulse of magnetic fields may be delivered by all magnetic heads simultaneously to create symmetrical servo marks with the same spacing of the magnetic heads. In this manner, multiple servo marks of a servo pattern may be written simultaneously.

A variety of different biasing and servo writing techniques are described herein in relation to a magnetic recording medium that defines a greater perpendicular squareness. Each of these techniques may be used alone or in any combination to create remanence magnetization of a desired direction. Each of the example magnetic tapes described herein are also only portions of an entire magnetic tape, and each portion is described as an example portion within the magnetic tape.

Various examples have been described. These and other examples are within the scope of the following claims.

The invention claimed is:

1. A data storage tape comprising:
   a substrate; and
   a magnetic layer formed over the substrate and comprising:
      a perpendicular squareness greater than 50 percent and a longitudinal squareness less than 50 percent, and
      a remanence magnetization in a direction substantially perpendicular to the substrate;
   wherein the remanence magnetization comprises a perpendicular component perpendicular to the substrate and a longitudinal component parallel with the substrate; and
   wherein the longitudinal component is less than 50 percent in magnitude than the perpendicular component.

2. The data storage tape of claim 1, wherein the direction of the remanence magnetization substantially perpendicular to the substrate forms an angle of at least 45 degrees with the substrate.

3. The data storage tape of claim 2, wherein the direction of the remanence magnetization forms an angle of at least 60 degrees with the substrate.

4. The data storage tape of claim 1, wherein the longitudinal component is less than 25 percent in magnitude than the perpendicular component.

5. The data storage tape of claim 1, wherein the direction of the remanence magnetization is oriented one of away from the substrate or towards the substrate.

6. The data storage tape of claim 1, further comprising at least one servo track in the magnetic layer, wherein:
   the servo track comprises a plurality of servo marks and a non-patterned area, and the direction of the remanence magnetization of the non-patterned area is substantially opposite of the direction of a remanence magnetization of the plurality of servo marks.

7. The data storage tape of claim 6, further comprising at least one data track within the magnetic layer, wherein the plurality of servo tracks are configured to facilitate data head positioning relative to the at least one data track.

8. A method comprising:
passing a magnetic tape through at least one magnetic field, wherein the magnetic tape comprises a substrate and a magnetic layer comprising a perpendicular squareness greater than 50 percent and a longitudinal squareness less than 50 percent; and
with the at least one magnetic field, creating a remanence magnetization in the magnetic layer in a direction substantially perpendicular to the substrate;
wherein creating the remanence magnetization comprises creating the remanence magnetization with a perpendicular component perpendicular to the substrate and a longitudinal component parallel with the substrate; and
wherein the longitudinal component is less than 50 percent in magnitude than the perpendicular component and the perpendicular component is oriented one of away from the substrate or towards the substrate.

9. The method of claim 8, wherein the direction of the remanence magnetization forms an angle of at least 45 degrees with the substrate.

10. The method of claim 8, wherein the longitudinal component is less than 25 percent in magnitude than the perpendicular component.

11. The method of claim 8, wherein passing the magnetic tape through the at least one magnetic field further comprises:
driving the magnetic tape in a first direction;
passing the magnetic tape through a first magnetic field pattern of a first magnetic head; and
subsequent to the first magnetic field pattern, passing the magnetic tape through a second magnetic field pattern of a second magnetic head, wherein a longitudinal component of the first magnetic field pattern is substantially opposite of a longitudinal component of the second magnetic field pattern.

12. The method of claim 11, further comprising:
applying the first magnetic field pattern to the magnetic tape from a first side of the magnetic tape; and
applying the second magnetic field pattern to the magnetic tape from a second side of the magnetic tape opposite the first side.

13. A system comprising:
a magnetic tape comprising a perpendicular squareness greater than 50 percent and a longitudinal squareness less than 50 percent;
a tape drive configured to move the magnetic tape in a first direction; and
at least one magnetic head, wherein the at least one magnetic head is configured to create a remanence magnetization in a direction substantially perpendicular to the magnetic tape;
wherein the wherein the remanence magnetization comprises a perpendicular component perpendicular to a substrate of the magnetic tape and a longitudinal component parallel with the substrate; and
wherein the longitudinal component is less than 50 percent in magnitude than the perpendicular component.

14. The system of claim 13, wherein the longitudinal component is less than 25 percent in magnitude than the perpendicular component.

15. The system of claim 13, wherein the at least one magnetic head comprises:
a first magnetic head configured to apply a first magnetic field pattern to the magnetic tape with a longitudinal component of the first magnetic field pattern is substantially in a first direction; and
a second magnetic head after the first magnetic head and configured to apply a second magnetic field pattern to the magnetic tape with a longitudinal component of the second magnetic field pattern is substantially in a second direction opposite the first direction.

16. The system of claim 15, wherein the first magnetic head is positioned on a first side of the magnetic tape and the second magnetic head is positioned on a second side of the magnetic tape opposite the first side.

17. The system of claim 13, wherein the at least one magnetic head is configured to create the remanence magnetization as a bias magnetization prior to writing a plurality of servo marks in at least one servo track, and wherein the plurality of servo marks have a remanence magnetization with a secondary direction different than a primary direction of the bias magnetization.

\* \* \* \* \*

UNITED STATES PATENT AND TRADEMARK OFFICE
CERTIFICATE OF CORRECTION

PATENT NO. : 8,817,415 B2
APPLICATION NO. : 13/159287
DATED : August 26, 2014
INVENTOR(S) : Larold L. Olson, Douglas W. Johnson and Michael P. Sharrock It is certified that error appears in the above-identified patent and that said Letters Patent is hereby corrected as shown below:

In the Specification

At Column 10, Line 40,
"by the ratio of remnant moment"

should read:
--by the ratio of remanent moment--

Signed and Sealed this
Twenty-third Day of December, 2014

Michelle K. Lee
*Deputy Director of the United States Patent and Trademark Office*